United States Patent
Toma et al.

(10) Patent No.: US 9,818,446 B2
(45) Date of Patent: Nov. 14, 2017

(54) FILE PRODUCING METHOD, FILE PRODUCING DEVICE, AND RECORDING MEDIUM

(71) Applicant: Panasonic Intellectual Property Management Co., Ltd., Osaka (JP)

(72) Inventors: Tadamasa Toma, Osaka (JP); Tomoki Ogawa, Osaka (JP); Hiroshi Yahata, Osaka (JP); Masayuki Kozuka, Osaka (JP); Kaoru Murase, Nara (JP); Masaya Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/003,745

(22) Filed: Jan. 21, 2016

(65) Prior Publication Data
US 2016/0155470 A1   Jun. 2, 2016

Related U.S. Application Data

(63) Continuation of application No. PCT/JP2015/000007, filed on Jan. 5, 2015.
(Continued)

(30) Foreign Application Priority Data
Dec. 17, 2014 (JP) .................. 2014-255477

(51) Int. Cl.
*H04N 5/917* (2006.01)
*G11B 20/12* (2006.01)
(Continued)

(52) U.S. Cl.
CPC .......... *G11B 20/1217* (2013.01); *G11B 20/10* (2013.01); *G11B 27/031* (2013.01);
(Continued)

(58) Field of Classification Search
CPC . G11B 20/1217; G11B 27/3036; G11B 20/10; G11B 27/031; G11B 27/329;
(Continued)

(56) References Cited

U.S. PATENT DOCUMENTS 8,305,860 B2 * 11/2012 Hattori ............. G11B 20/00086
369/84
9,402,107 B2 * 7/2016 Gonder ................ H04L 65/605
(Continued)

FOREIGN PATENT DOCUMENTS

EP   1 408 687   4/2004
JP   11-205750   7/1999
(Continued)

OTHER PUBLICATIONS

International Search Report of PCT application No. PCT/JP2015/000007 dated Apr. 7, 2015.
(Continued)

*Primary Examiner* — Mishawn Hunter
(74) *Attorney, Agent, or Firm* — Wenderoth, Lind & Ponack, L.L.P.

(57) ABSTRACT

A method according to one aspect of the present disclosure includes the steps of: acquiring a play list including identification information indicating each of a plurality of elementary streams; selecting an elementary stream indicated by predetermined identification information from the acquired play list; acquiring a difference file including data that is not included in the selected elementary stream; and converting the selected elementary stream into an MP4 file format by combining data included in the difference file and data included in the selected elementary stream based on a manifest file corresponding to the selected elementary stream, the manifest file being necessary for the conversion of a file format based on a predetermined rule.

13 Claims, 44 Drawing Sheets

Related U.S. Application Data

(60) Provisional application No. 61/944,280, filed on Feb. 25, 2014, provisional application No. 61/925,699, filed on Jan. 10, 2014.

(51) Int. Cl.

| | | |
|---|---|---|
| *H04N 5/85* | (2006.01) | |
| *H04N 21/4402* | (2011.01) | |
| *H04N 21/432* | (2011.01) | |
| *H04N 9/82* | (2006.01) | |
| *H04N 21/482* | (2011.01) | |
| *G11B 27/30* | (2006.01) | |
| *G11B 27/32* | (2006.01) | |
| *G11B 20/10* | (2006.01) | |
| *G11B 27/031* | (2006.01) | |
| *H04N 9/804* | (2006.01) | |
| *H04N 9/806* | (2006.01) | |
| *H04N 21/236* | (2011.01) | |
| *H04N 21/262* | (2011.01) | |
| *H04N 21/84* | (2011.01) | |
| *H04N 21/854* | (2011.01) | |

(52) U.S. Cl.
CPC ........ *G11B 27/3036* (2013.01); *G11B 27/329* (2013.01); *H04N 5/85* (2013.01); *H04N 9/806* (2013.01); *H04N 9/8042* (2013.01); *H04N 9/8205* (2013.01); *H04N 9/8211* (2013.01); *H04N 9/8233* (2013.01); *H04N 21/236* (2013.01); *H04N 21/26258* (2013.01); *H04N 21/4325* (2013.01); *H04N 21/4402* (2013.01); *H04N 21/4825* (2013.01); *H04N 21/84* (2013.01); *H04N 21/85406* (2013.01)

(58) Field of Classification Search
CPC ........ H04N 5/85; H04N 9/8042; H04N 9/806; H04N 9/8205; H04N 9/8211; H04N 9/8233; H04N 21/236; H04N 21/26258
USPC .................................................. 386/239, 248
See application file for complete search history.

(56) References Cited

U.S. PATENT DOCUMENTS

| | | | |
|---|---|---|---|
| 2003/0091342 | A1 | 5/2003 | Shibutani et al. |
| 2006/0245729 | A1* | 11/2006 | Itoh ................. G11B 20/10009 386/241 |
| 2007/0280351 | A1* | 12/2007 | Takamura ........... H04N 19/176 375/240.11 |
| 2010/0232504 | A1* | 9/2010 | Feng .................... H04N 19/176 375/240.13 |
| 2011/0164111 | A1* | 7/2011 | Karaoguz ................. G06F 3/14 348/43 |
| 2012/0008479 | A1 | 1/2012 | Hattori et al. |
| 2012/0023251 | A1 | 1/2012 | Pyle et al. |

FOREIGN PATENT DOCUMENTS

| | | |
|---|---|---|
| JP | 2003-151215 | 5/2003 |
| JP | 2003-199057 | 7/2003 |
| JP | 2012-175608 | 9/2012 |
| JP | 2013-093755 | 5/2013 |
| JP | 2013-93755 | 5/2013 |
| WO | 2015/083354 | 6/2015 |

OTHER PUBLICATIONS

The Extended European Search Report dated Oct. 12, 2016 for the related European Patent Application No. 15735544.7.

* cited by examiner

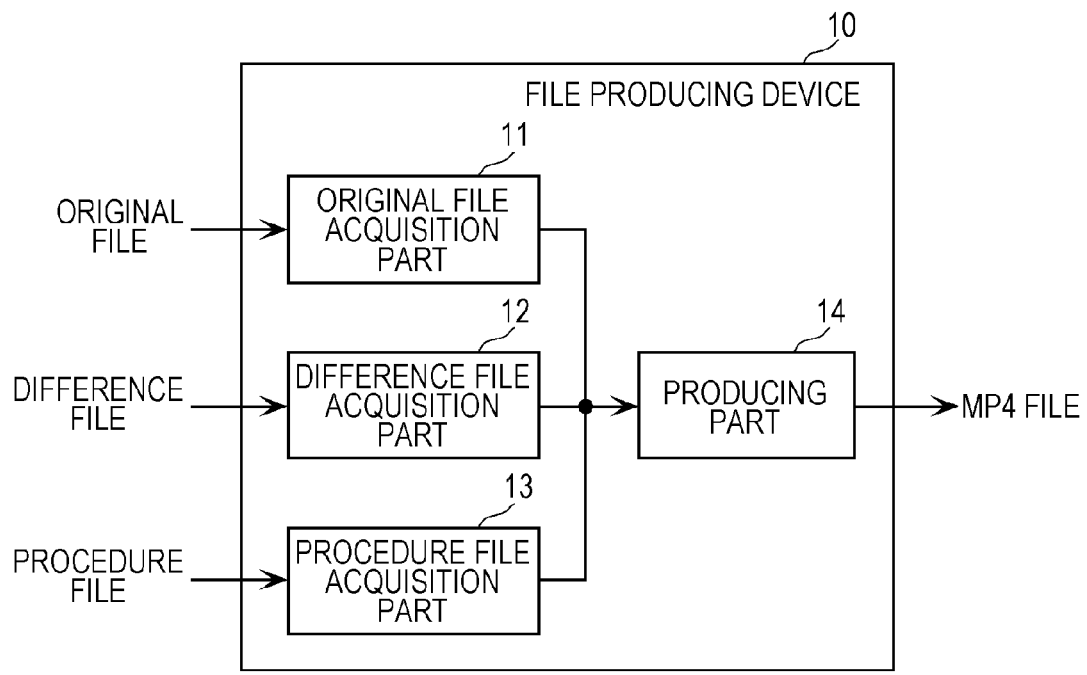

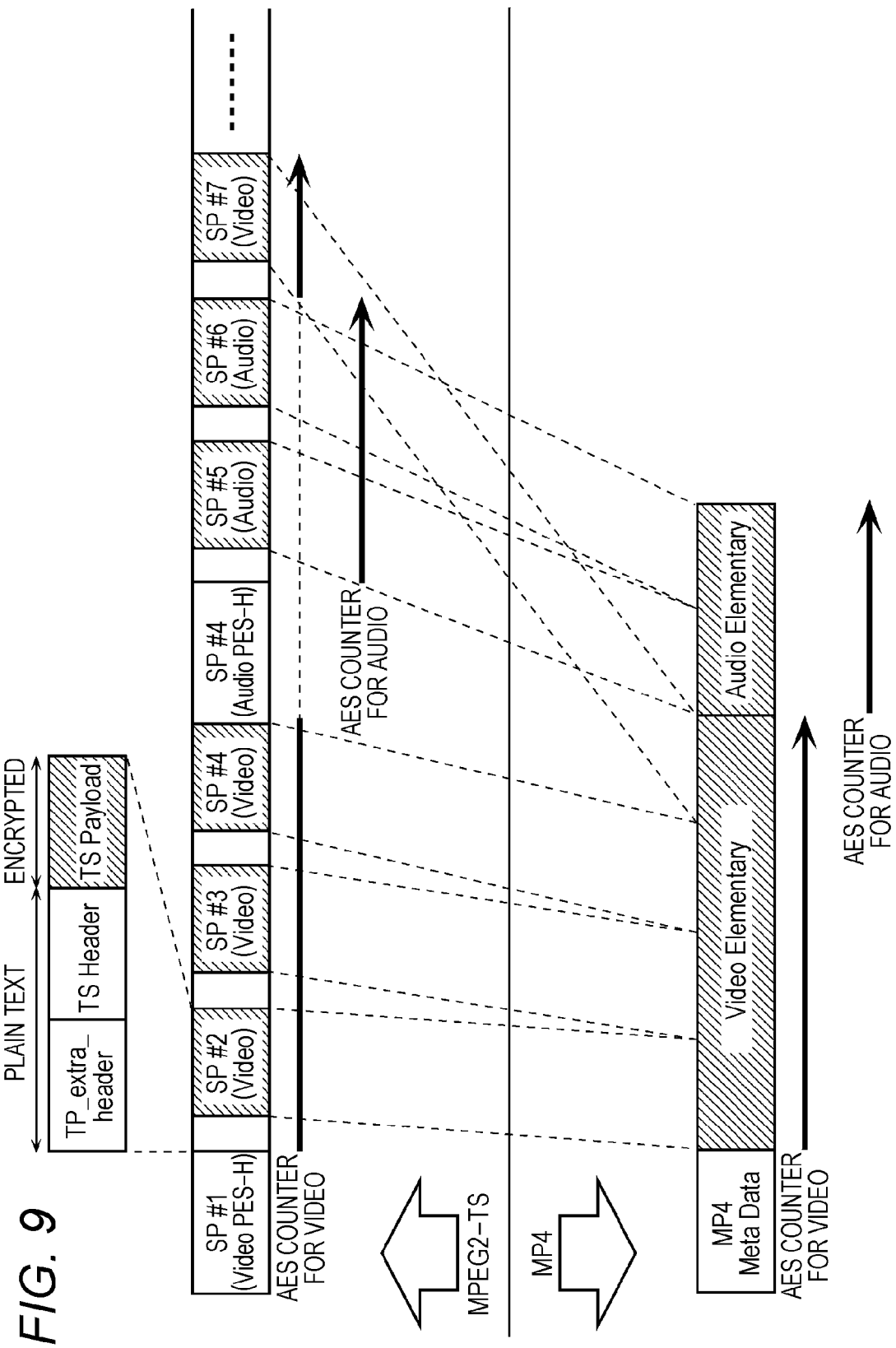

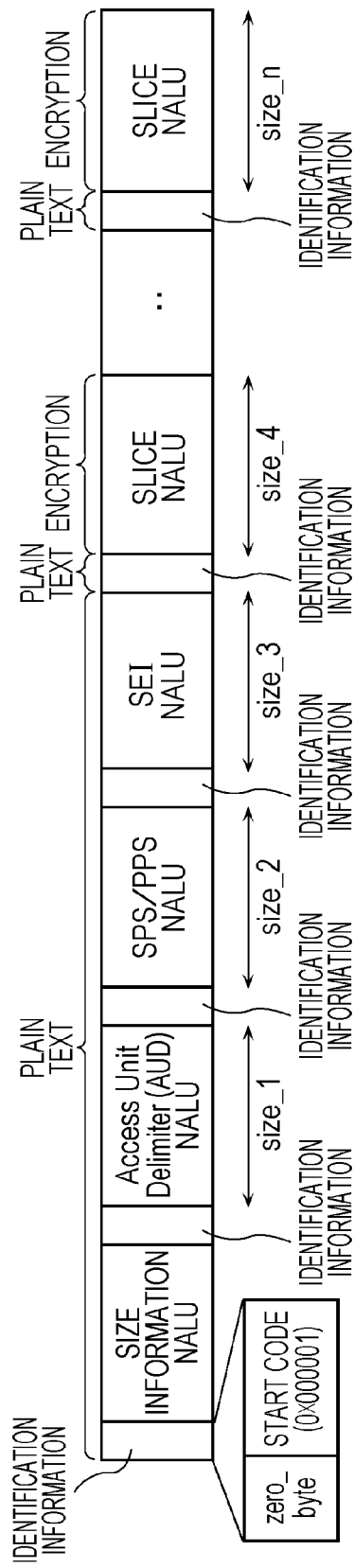
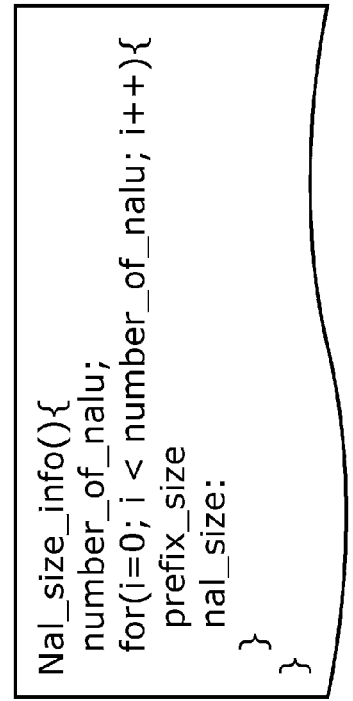
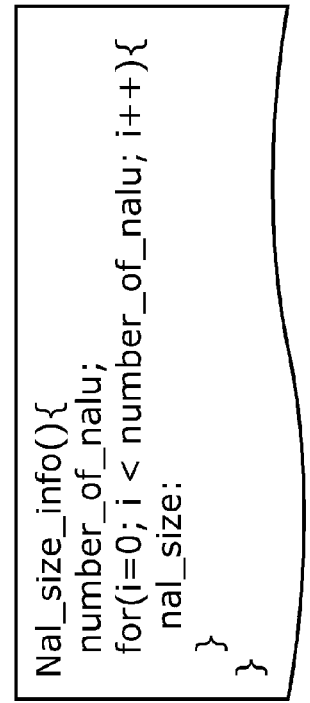
FIG. 16A
FIG. 16C
FIG. 16B

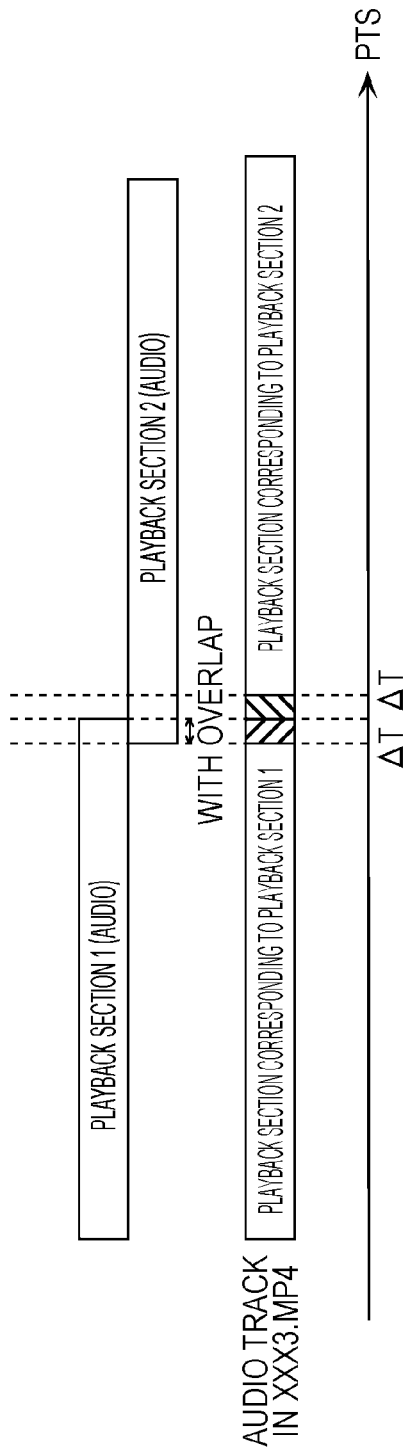

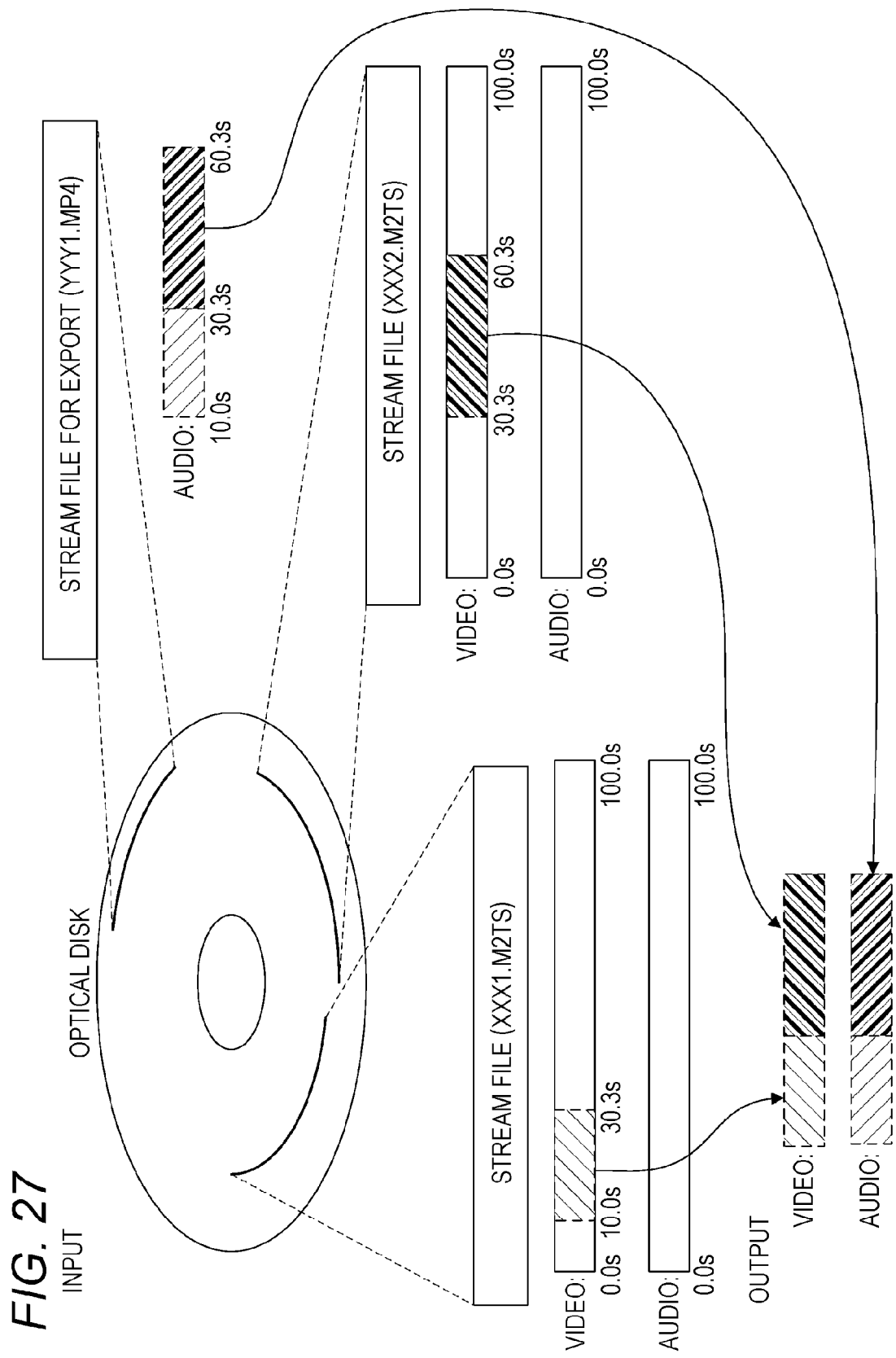

FIG. 28A

```
PLAY LIST EXAMPLE 1
  PlayItem1: XXX1.M2TS
            Video: PID=1
                  PTS_begin=10.0s, PTS_end=30.3s
            YYY1.MP4, start_adr=201345, out_mux=true
            Audio: TrackID=1
                  PTS_begin=10.0s, PTS_end=30.3s PlayItem2: XXX2.M2TS
            Video: PID=1
                  PTS_begin=30.3s, PTS_end=60.3s
            YYY2.MP4, start_adr=201345, out_mux=true
            Audio: TrackID=1
                  PTS_begin=30.3s, PTS_end=60.3s PLAY LIST EXAMPLE 2
  ELEMENTARY STREAM IN M2TS FILE
  PlayItem1: XXX1.M2TS
            Video: PID=1
                  PTS_begin=10.0s, PTS_end=30.3s
  PlayItem2: XXX2.M2TS
            Video: PID=1
                  PTS_begin=30.3s, PTS_end=60.3s
  ELEMENTARY STREAM IN MP4 FILE
  PlayItem1: YYY1.MP4, start_adr=201345, out_mux=true
            Audio: TrackID=1
                  PTS_begin=10.0s, PTS_end=60.3s PLAY LIST EXAMPLE 3
  ELEMENTARY STREAM IN M2TS FILE
  PlayItem1: XXX1.M2TS
            Video: PID=1
                  PTS_begin=10.0s, PTS_end=30.3s
  PlayItem2: XXX2.M2TS
            Video: PID=1
                  PTS_begin=30.3s, PTS_end=60.3s
  ELEMENTARY STREAM IN MP4 FILE
  Audio: YYY1.MP4, start_adr=201345, , out_mux=true
         PTS_begin=10.0s, PTS_end=60.3s
```

FIG. 28B

COPY MANIFEST FILE

Output File: XXXXX.MP4
Output File Size: 1234567890 bytes
ATTRIBUTE: HEVC 4K, AAC 5.1ch (English)
MP4 DECODER BUFFER SIZE: 234567 bytes Input File A: XXX1.M2TS
MANIFEST for Movie Fragment:
...: SUCH AS PTS AND DTS OF HEADER SAMPLE OF Movie fragment
MANIFEST for Video stream:
PTS11, DTS11, size_11, size12, PTS12, DTS12, size13, size14, ..., size_1n, ..., PTS1m, DTS1m, size_1n+1, size_1n+2, ..., size_1N+1

Input File B: XXX2.M2TS
MANIFEST for Movie Fragment:
...: SUCH AS PTS AND DTS OF HEADER SAMPLE OF Movie fragment
MANIFEST for Video stream:
PTS21, DTS21, size_21, size22, PTS22, DTS22, size23, size24, ..., size_2n, ..., PTS2m, DTS2m, size_2n+1, size_2n+2, ..., size_2N+1

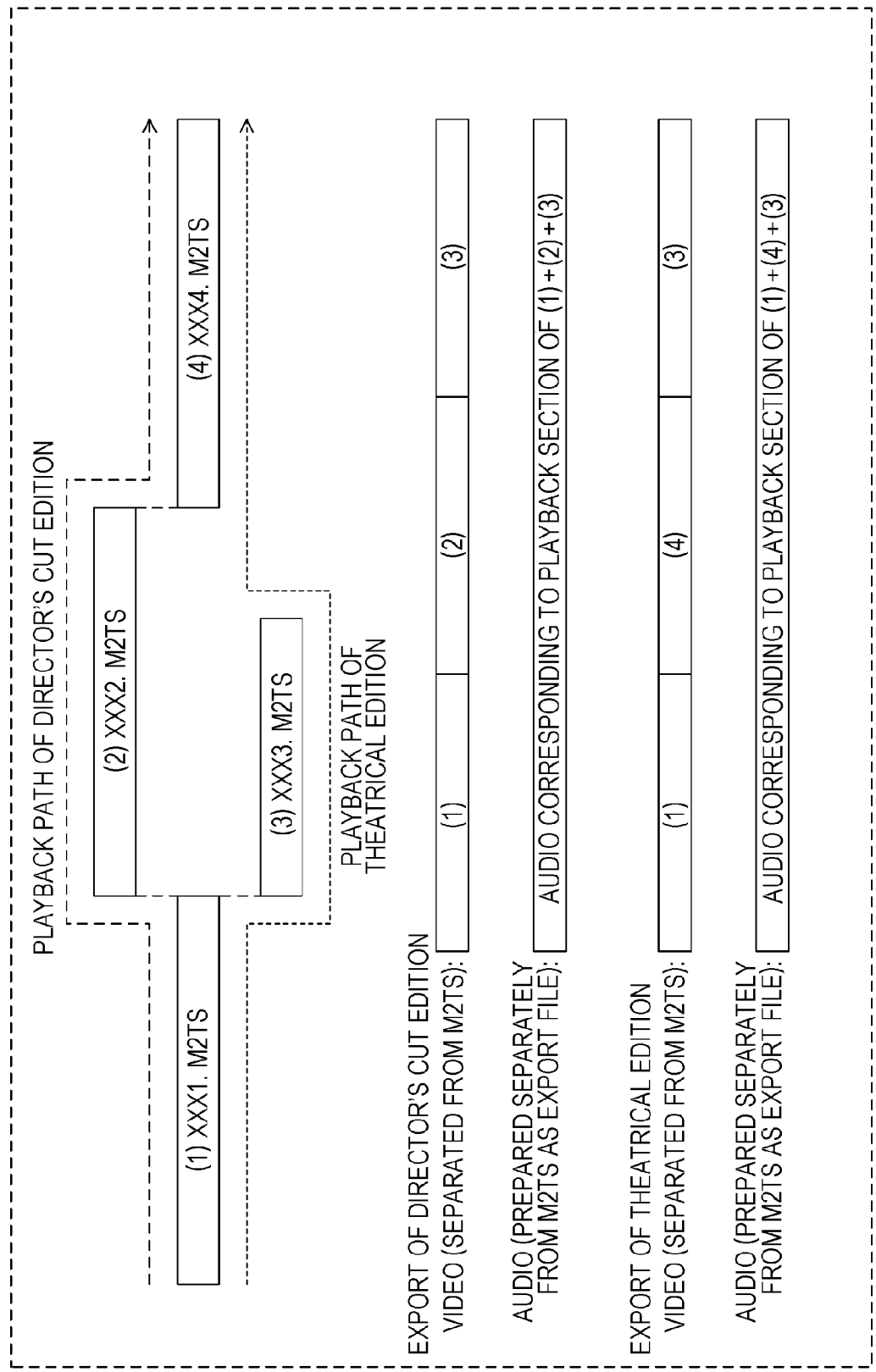

FIG. 29B

COPY MANIFEST FILE

```
Output File: XXXXX.MP4
Output File Size: 1234567890 bytes
ATTRIBUTE: HEVC 4K, AAC 5.1ch (English)
MP4 DECODER BUFFER SIZE: 234567 bytes
Input File A: XXX1.M2TS
COPY MANIFEST:
210-354, 577-286, ....
Input File B: XXX2.M2TS
COPY MANIFEST:
 750-292, 1055-256, ....
Input File C: XXX4.M2TS
COPY MANIFEST:
 1670-324, 2077-206, ....
```

FIG. 30

EXPORT OF DIRECTOR'S CUT EDITION
VIDEO (SEPARATED FROM M2TS): (1) (2) (3)
AUDIO (PREPARED SEPARATELY FROM M2TS AS EXPORT FILE): CORRESPONDING TO PLAYBACK SECTION OF (1) | CORRESPONDING TO PLAYBACK SECTION OF (2) | CORRESPONDING TO PLAYBACK SECTION OF (3)

EXPORT OF THEATRICAL EDITION
VIDEO (SEPARATED FROM M2TS): (1) (4) (3)
AUDIO (PREPARED SEPARATELY FROM M2TS AS EXPORT FILE): CORRESPONDING TO PLAYBACK SECTION OF (1) | CORRESPONDING TO PLAYBACK SECTION OF (4) | CORRESPONDING TO PLAYBACK SECTION OF (3)

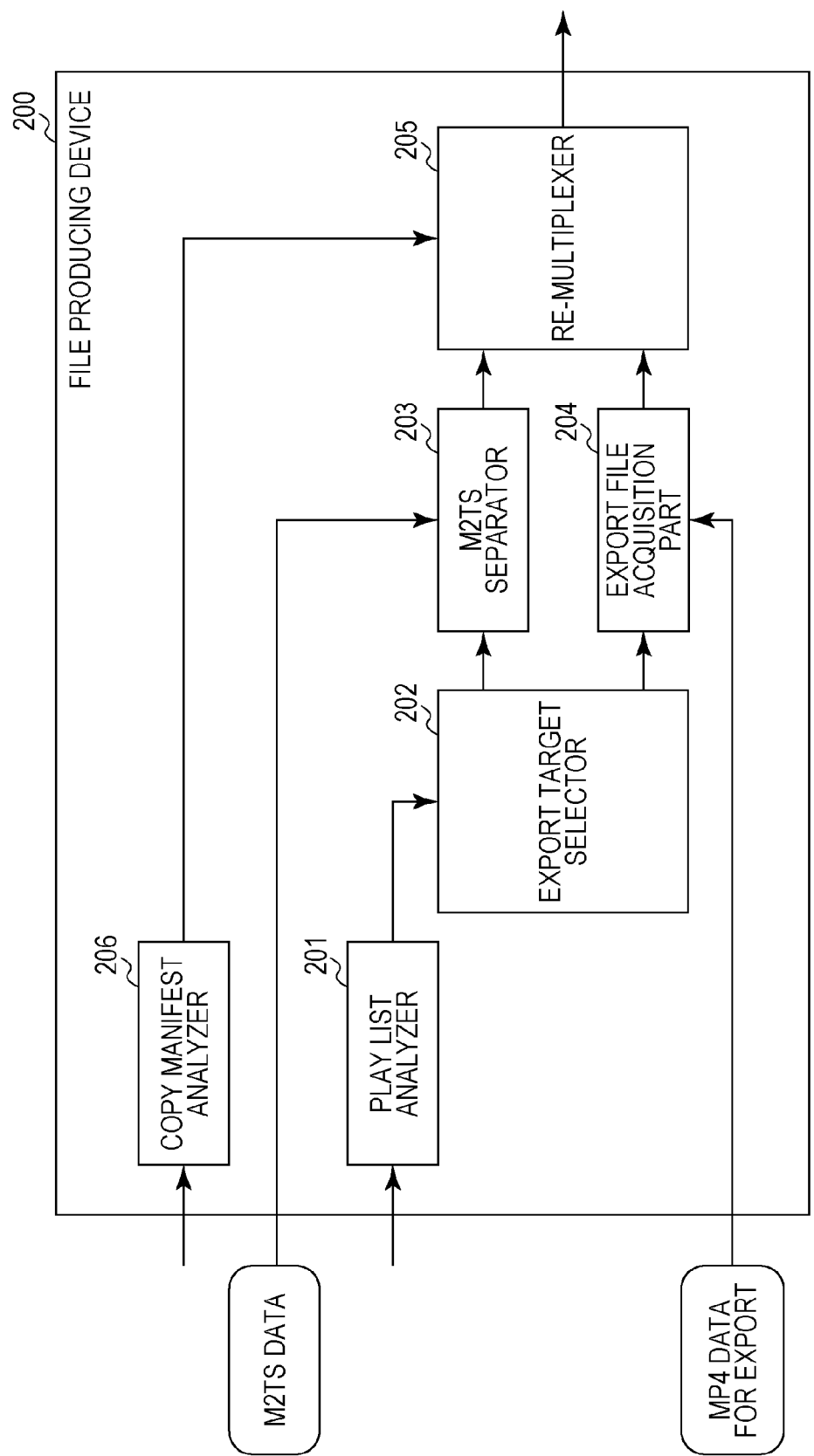

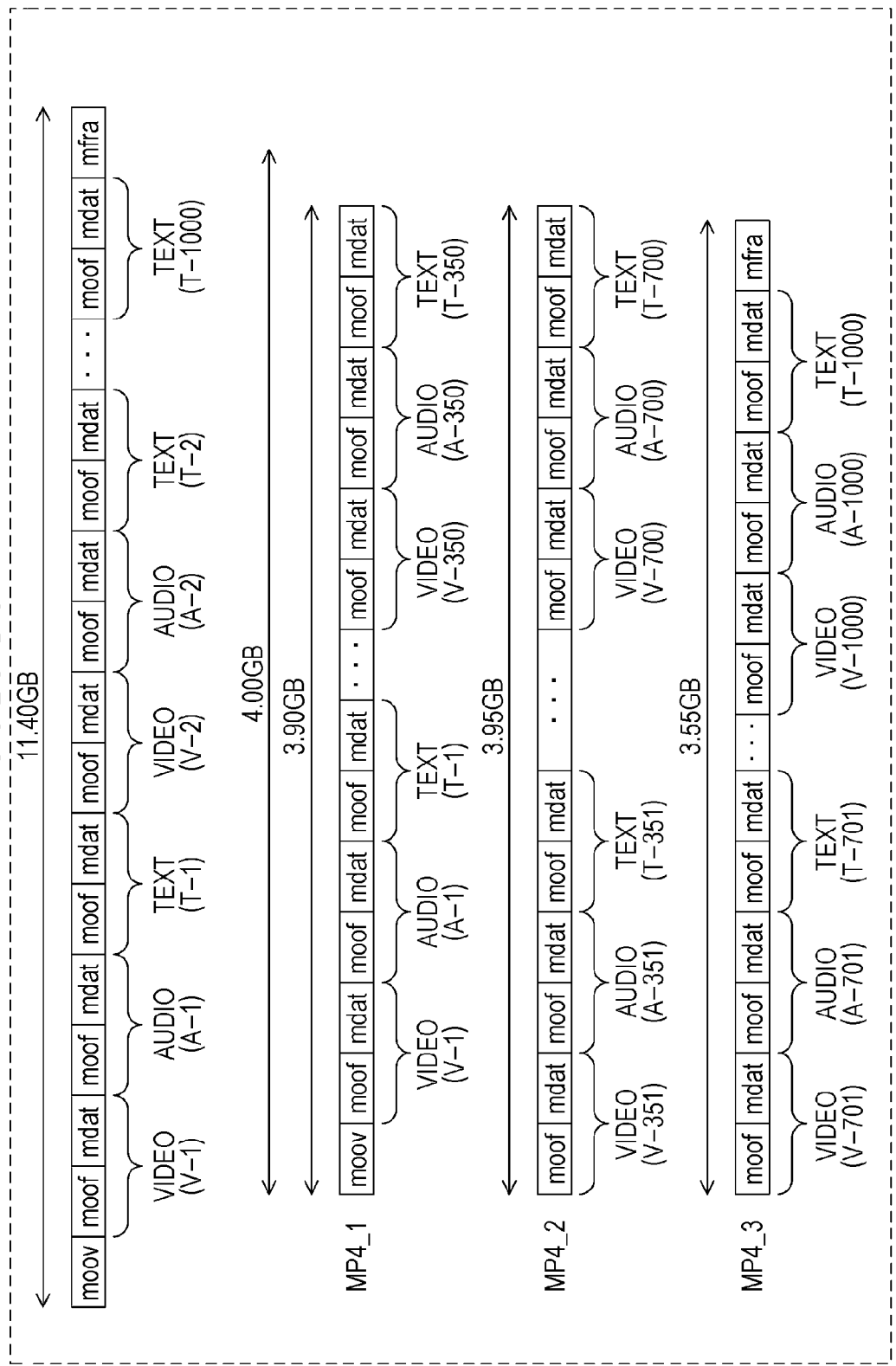

FIG. 38

(a) PLAY LIST EXAMPLE 1 (SIZE OF ELEMENTARY STREAM)

ELEMENTARY STREAM IN M2TS FILE
PlayItem1: XXX1.M2TS
   Video: PID=1
      PTS_begin=10.0s, PTS_end=30.3s
      video_es_size=12048822byte
   Audio: PID=2
      audio_es_size=326032byte PlayItem2: XXX2.M2TS
   Video: PID=1
      PTS_begin=30.3s, PTS_end=60.3s
      video_es_size=12048822byte
   Audio: PID=2
      audio_es_size=426048byte ELEMENTARY STREAM IN MP4 FILE
PlayItem1: YYY1.MP4, start_adr=201345, out_mux=true
   Audio: TrackID=1
      PTS_begin=10.0s, PTS_end=60.3s
      audio_es_size=225848byte (b) PLAY LIST EXAMPLE 2
(CORE AND EXTENSION ARE DISTINGUISHED FROM EACH OTHER)

ELEMENTARY STREAM IN M2TS FILE
PlayItem1: XXX1.M2TS
   Video: PID=1
      PTS_begin=10.0s, PTS_end=30.3s
      video_es_size=12048822byte
   Audio: PID=2
      audio_es_size=326032byte PlayItem2: XXX2.M2TS
   Video: PID=1
      PTS_begin=30.3s, PTS_end=60.3s
      video_es_size=12048822byte
   Audio: PID=2
      audio_es_size_full=426048byte
      audio_es_size_core=66048byte ELEMENTARY STREAM IN MP4 FILE
PlayItem1: YYY1.MP4, start_adr=201345, out_mux=true
   Audio: TrackID=1
      PTS_begin=10.0s, PTS_end=60.3s
      audio_es_size=225848byte

FIG. 39

PLAY LIST EXAMPLE (CONNECTION CONDITION OF PLAY LIST)

```
ELEMENTARY STREAM IN M2TS FILE
 PlayItem1: XXX1.M2TS
         Video: PID=1
                 PTS_begin=10.0s, PTS_end=30.3s
                 video_es_size=12048822byte
         Audio: PID=2
                 audio_es_size=326032byte PlayItem2: XXX2.M2TS
         Video: PID=1
                 PTS_begin=30.3s, PTS_end=60.3s
                 video_es_size=12048822byte
         Audio: PID=2
                 audio_es_size=426048byte connection_condition=seamless_w_gap
             gap_duraion=20msec ELEMENTARY STREAM IN MP4 FILE
  PlayItem1: YYY1.MP4, start_adr=201345,
out_mux=true
         Audio: TrackID=1
                 PTS_begin=10.0s, PTS_end=60.3s
                 audio_es_size=225848byte
```

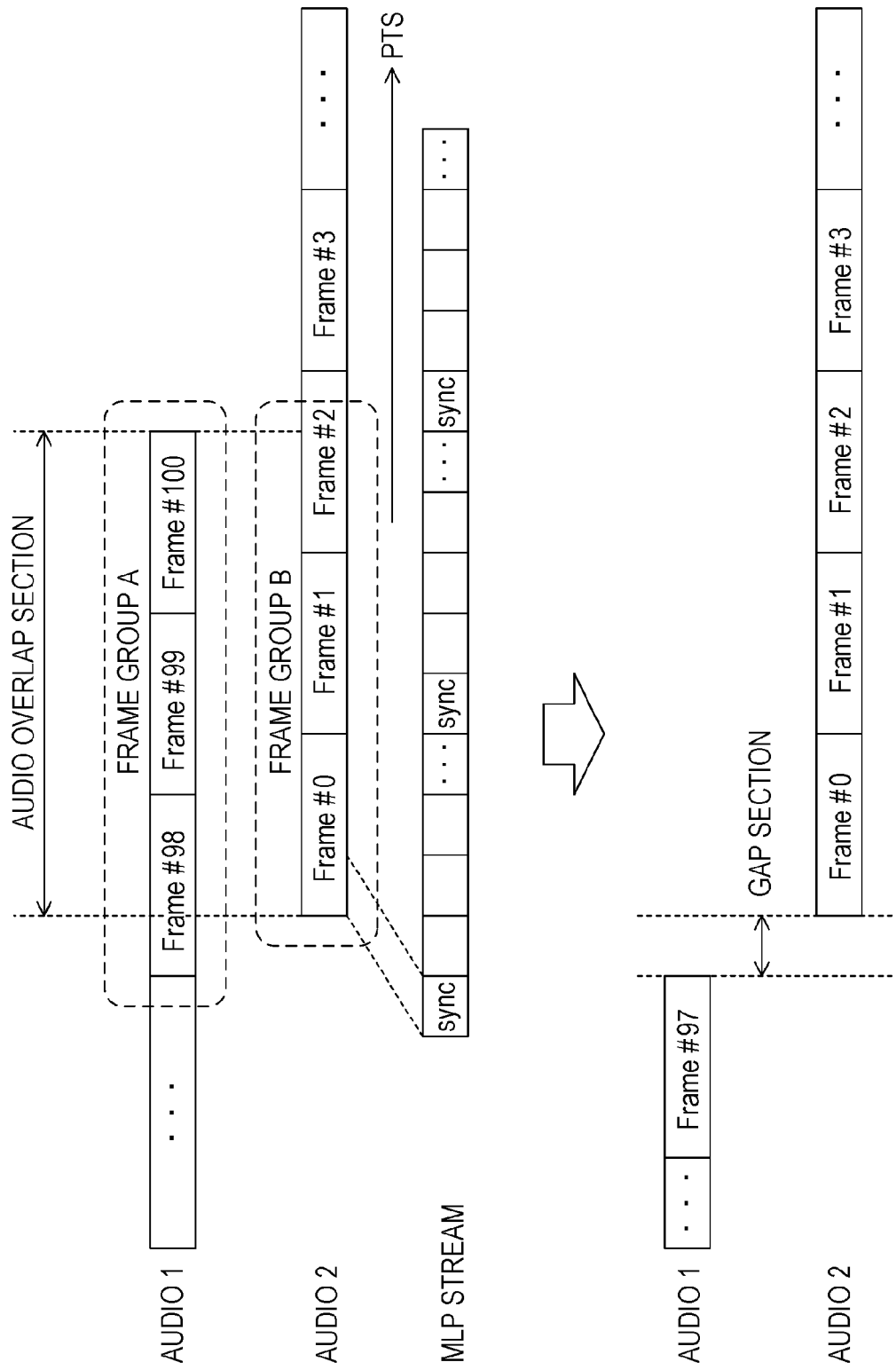

FIG. 40B

PLAY LIST EXAMPLE (SPECIFICATION OF EXPORT RANGE)

```
ELEMENTARY STREAM IN M2TS FILE
PlayItem1: XXX1.M2TS
          Video: PID=1
                 PTS_begin=10.0s, PTS_end=30.3s
                 video_es_size=12048822byte
          Audio: PID=2
                 audio_es_size=326032byte
                 last_frame_pts=30.1s
PlayItem2: XXX2.M2TS
          Video: PID=1
                 PTS_begin=30.3s, PTS_end=60.3s
                 video_es_size=12048822byte
          Audio: PID=2
                 audio_es_size=426048byte
```

FILE PRODUCING METHOD, FILE PRODUCING DEVICE, AND RECORDING MEDIUM

BACKGROUND

1. Technical Field

The present disclosure relates to a file producing method for producing an MP4 file.

2. Description of the Related Art

A file format used in a conventional optical disk is an MPEG2-TS (MPEG-2 Transport Stream) system specified by ISO/IEC 138181-1. Hereinafter, the MPEG2-TS system is simply referred to as MPEG2-TS. A file constructed by multiplexing a video stream, an audio stream, and a caption stream in an MPEG2-TS file format is recorded in the optical disk. Specifically, in the MPEG2-TS, each of the video stream, the audio stream, and the caption stream is multiplexed while divided into a plurality of 188-byte TS packets, and recorded in the optical disk. The MPEG2-TS is optimized for a medium, such as broadcasting and the optical disk, which transmits or records data sequentially read and processed. Accordingly, a stream is efficiently read, decrypted, and played back even by a consumer product having a relatively small buffer capacity.

On the other hand, a nowadays file format that is increasingly used in content distribution through a network is an MP4 system specified by ISO/IEC 14496-12. Hereinafter, the MP4 system is simply referred to as MP4. The MP4 adopts an extremely flexible data structure on the assumption of application to a randomly accessible medium such as an HDD (Hard Disk Drive) and a flash memory. In a general use form of the MP4, the stream such as the video stream, the audio stream, and the caption stream is divided in units of several-second fragments, and the fragments are sequentially arrayed to construct one file.

From a viewpoint of bit unit cost, it is considered that frequently the optical disk is used as the medium to distribute high-quality content, such as 4K content, which is expected to grow. On the other hand, although a smartphone and a tablet do not include an optical disk drive, the smartphone and the tablet are used as a terminal receiving and playing back the content distribution in the network by utilizing high portability, a large screen size, and a finer image. For this reason, the smartphone and the tablet have many functions and pieces of processing compatible with the MP4, and the adoption of the function and processing compatible with the MPEG2-TS is not progressing very much.

Sometimes the file format of the content of an MPEG2-TS file distributed as the optical disk is converted into the MP4 when the content is copied in the smartphone and the tablet (for example, see PTL 1). An MP4 file that is of a file of the MP4 is produced by the conversion.

CITATION LIST

Patent Literature

PTL 1: Unexamined Japanese Patent Publication No. 2012-175608

SUMMARY

In one general aspect, the techniques disclosed here feature a method including: acquiring a play list including identification information indicating each of a plurality of elementary streams; selecting an elementary stream indicated by predetermined identification information included in the acquired play list; acquiring a difference file including data that is not included in the selected elementary stream; and converting the selected elementary stream into an MP4 file format by combining data included in the difference file and data included in the elementary stream based on a manifest file corresponding to the selected elementary stream, the manifest file being necessary for the conversion of a file format based on a predetermined rule.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 4 is a view illustrating a method for producing an actual elementary stream from a plurality of TS payloads;

FIG. 5 is a block diagram illustrating a configuration of a file producing device in a first exemplary embodiment;

FIG. 9 is a view illustrating a file producing method in a first modification of the first exemplary embodiment;

FIG. 16A is a view illustrating a configuration example of an access unit in a transport stream in the second modification of the first exemplary embodiment;

FIG. 16B is a view illustrating a syntax example of size information included in a size information NAL unit in the second modification of the first exemplary embodiment;

FIG. 16C is a view illustrating another syntax example of the size information included in the size information NAL unit in the second modification of the first exemplary embodiment;

FIG. 22A is a view illustrating a method for integrating the playback sections to produce one MP4 file in the second exemplary embodiment;

FIG. 27 is a view illustrating a method for storing data for export in a fourth exemplary embodiment;

FIG. 28A is a view illustrating an example of a play list for export in the fourth exemplary embodiment;

FIG. 28B is a view illustrating an example of a copy manifest file in the fourth exemplary embodiment;

FIG. 29A is a view illustrating an example of the file producing method when a plurality of versions of main story content are stored in the fourth exemplary embodiment;

FIG. 29B is a view illustrating the copy manifest file when the MP4 file is produced in a playback path of a director's cut edition in the fourth exemplary embodiment;

FIG. 30 is a view illustrating another example of the file producing method when the plurality of versions of the main story content are stored in the fourth exemplary embodiment;

FIG. 33 is a block diagram illustrating a file producing device in a first modification of the fourth exemplary embodiment;

FIG. 34 is a view illustrating an example when the MP4 file is produced while divided into a plurality of pieces in the first modification of the fourth exemplary embodiment;

FIG. 38 is a view illustrating a play list example in which a size of the elementary stream is indicated in the play list for export in a third modification of the fourth exemplary embodiment;

FIG. 39 is a view illustrating a play list example in which information on a gap generated in an audio connection portion between play items is indicated in a fourth modification of the fourth exemplary embodiment;

FIG. 40A is a view illustrating an example of a method for producing an audio gap in the export in a fifth modification of the fourth exemplary embodiment;

FIG. 40B is a view illustrating a play list example in which a frame that needs to be deleted is indicated in producing the gap in the fifth modification of the fourth exemplary embodiment;

DETAILED DESCRIPTION

Underlying Knowledge Forming Basis of the Present Disclosure

The inventor found that the following problem arises in the file producing method of PTL 1 described in "BACKGROUND ART".

In the file producing method of PTL 1, after the content multiplexed by the MPEG2-TS is returned to streams such as a video stream, an audio stream, and a caption stream once, it is necessary to convert the file format of the content into the MP4. Generally a commercial content distributed as the optical disk is encrypted. Accordingly, in the conversion, it is necessary to convert the file format after decryption, and then it is necessary to perform re-encryption. A structure of an MPEG2-TS content will be described in detail below.

Figure 1:
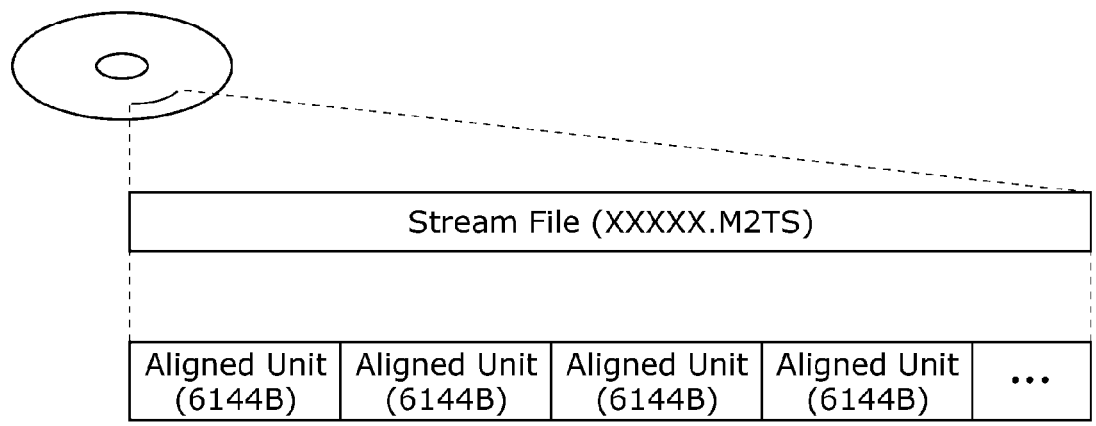
FIG. 1 is a view schematically illustrating an example of a structure of an MPEG2-TS content stored in an optical disk.

FIG. 1 is a view schematically illustrating an example of the structure of the MPEG2-TS content stored in an optical disk. A stream file is stored in the optical disk as the content. In the example of FIG. 1, only one stream file is stored in the optical disk. Alternatively, a plurality of stream files may be stored in the optical disk. At this point, the stream file is recorded with a file name of XXXXX.M2TS. A number is described in XXXXX. In the case that a plurality of pieces of content are stored, the pieces of content can individually be managed by the number.

The stream file is sectioned into a plurality of units each of which is called an aligned unit having 6144 bytes. The aligned unit is a unit of the encryption. A data amount of the stream file is not necessarily a multiple number of 6144 bytes. In the case that the data amount of the stream file is not a multiple number of 6144 bytes, desirably the data amount is set to a multiple number of 6144 bytes by a method for storing null data in an end of the content.

Figure 2:
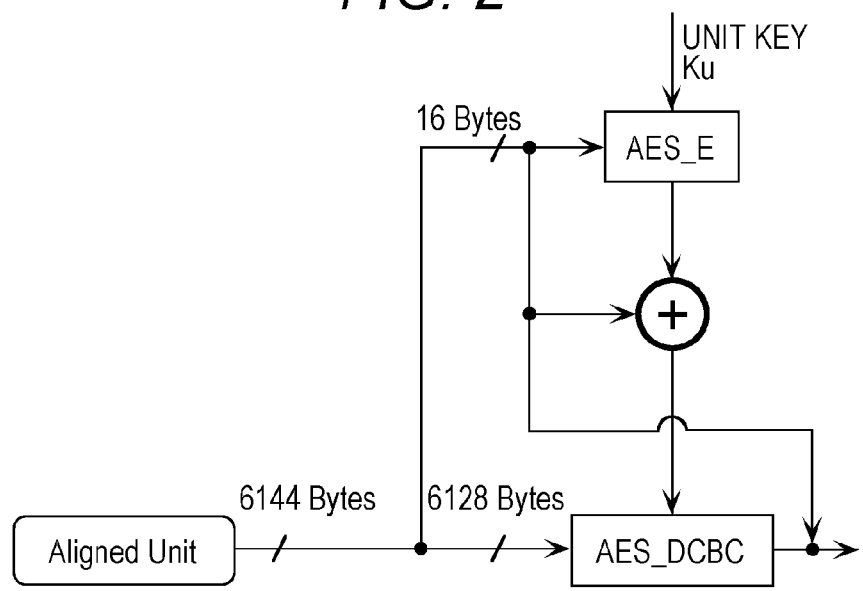
FIG. 2 is a view illustrating a method for decrypting an aligned unit.

FIG. 2 is a view illustrating an aligned unit decrypting method.

The content on the optical disk is encrypted using unit key Ku of data. In the encryption, the 6144-byte data included in the aligned unit is separated into leading 16-byte data and remaining 6128-byte data, and the remaining 6128-byte data is encrypted.

In decrypting the aligned unit, AES_E encrypts the leading 16-byte data by an AES (Advanced Encryption Standard) encryption system in which unit key Ku is used. Then, exclusive OR of data obtained by the encryption and the leading 16-byte data is calculated. Using a calculation result of the exclusive OR as a key, AES_DCBC decrypts the remaining 6128-byte data in an AES-CBC (Cipher Block Chaining) mode. The leading 16-byte data is added to plain text data obtained by the decryption. As a result, a 6144-byte plain text corresponding to the aligned unit is obtained.

Figure 3:
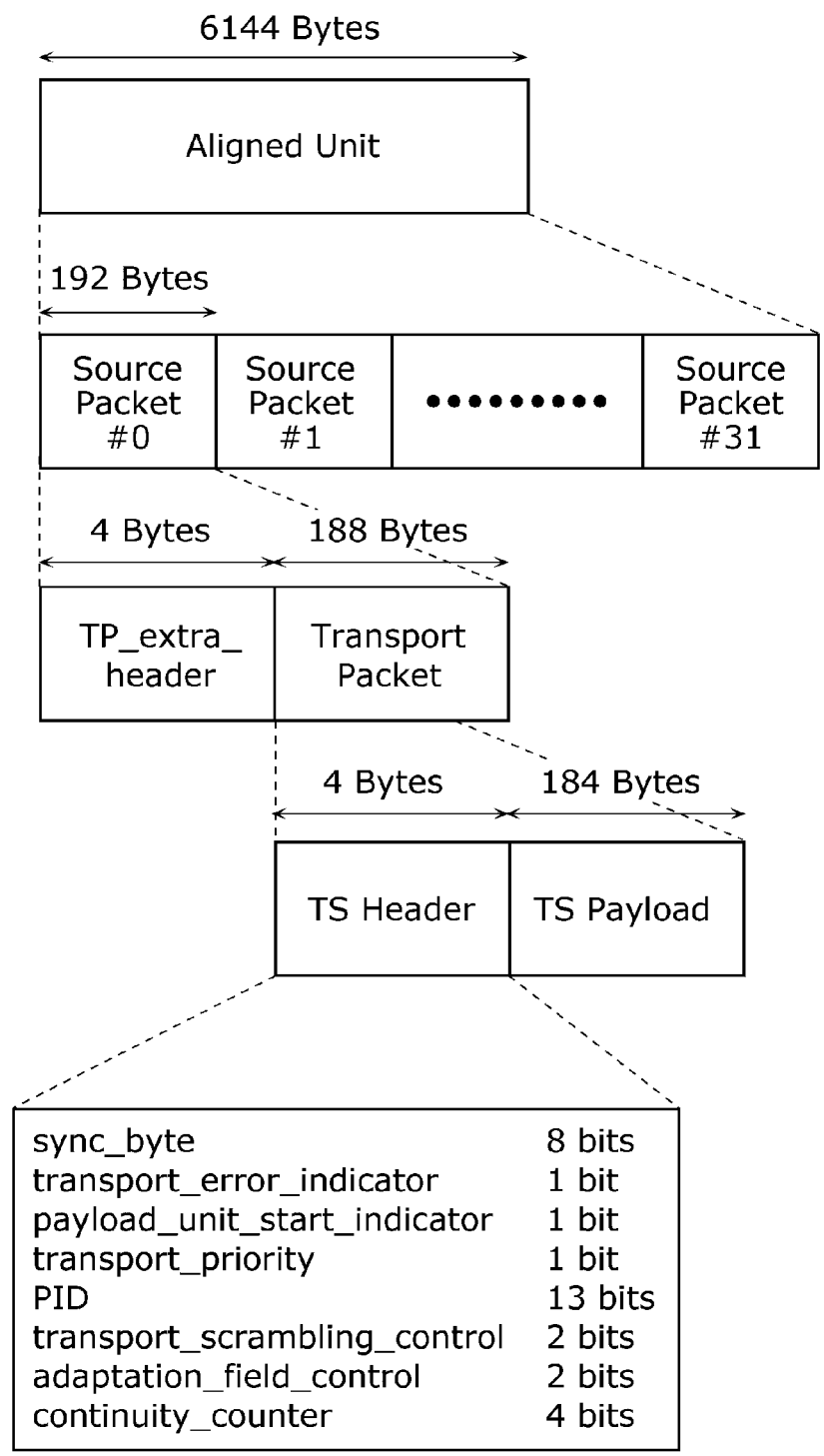
FIG. 3 is a view illustrating an internal structure of the aligned unit in a plain text state.

FIG. 3 is a view illustrating an internal structure of the aligned unit in a plain text state.

Each aligned unit is constructed with 32 192-byte source packets. Each source packet is constructed with a TP_extra_header of a 4-byte header and a 188-byte transport packet of a TS packet. The 188-byte transport packet is constructed with a 4-byte TS header and a 184-byte TS payload. Information indicating an attribute of the TS payload is described in the TS header. Specifically, the TS header is constructed with a sync_byte (8 bits), a transport_error_indicator (1 bit), a payload_unit_start_indicator (1 bit), a transport_priority (1 bit), a PID (13 bits), a transport_scrambling_control (2 bits), an adaptation_field_control (2 bits), and a continuity_counter (4 bits). At this point, the PID is information identifying a type of an elementary stream stored in the TS payload, for example, video or audio. Even in a plurality of kinds of audio, the kind of audio of the elementary stream can be identified by the PID.

FIG. 4 is a view illustrating a method for producing the actual elementary stream from the plurality of TS payloads. A PES_Header and the elementary stream are constructed by connecting the plurality of TS payloads to which the identical PID is assigned. In the plurality of TS payloads, the initial TS payload is configured to include the PES_Header. A PES (Packetized Elementary Stream) or a PES packet is constructed with the PES_Header and at least part of the elementary stream.

Thus, the MPEG2-TS file (stream file) is encrypted in each aligned unit. Accordingly, in order to convert the MPEG2-TS file into the MP4 file, the decryption is performed, and the re-encryption is performed. There is a problem in that it takes a long time for conversion device such as a smartphone and a tablet to perform the decryption and the encryption. There is also a security problem because the plain text content is temporarily produced.

To solve the problems, a file producing method according to one aspect of the present disclosure for producing the MP4 file, the method includes: acquiring an original file constructed in a file format different from the MP4; acquiring a difference file including data not included in the original file; acquiring a procedure file indicating a procedure for producing the MP4 file; and producing the MP4 file by a combination of the data included in the difference file and the data included in the original file according to the procedure indicated by the procedure file. For example, the original file constructed in an MPEG2-TS file format is acquired.

The MP4 file is produced by a combination of the data included in the difference file and the data included in the original file according to a predetermined procedure. Accordingly, the MP4 file can easily be produced without returning the original file constructed in the MPEG2-TS file format or the like to the stream such as the video stream and the audio stream. Even if the original file is encrypted, it is not necessary to decrypt and re-encrypt the original file. Accordingly, a processing load necessary for the production of the MP4 file can be suppressed.

The original file, the difference file, and the procedure file may be acquired by reading the original file, the difference file, and the procedure file from the optical disk.

Therefore, all the files necessary for the production of the MP4 file are acquired from one optical disk, so that time and effort for searching the files can be saved to more easily produce the MP4 file.

Each range of the plurality of portions included in the difference file and each range of the plurality of portions included in the original file may be described in the procedure file such that the range of the portion included in the difference file and the range of the portion included in the original file are alternately arrayed, and the MP4 file may be produced by a combination of the portions indicated by the ranges in the order described in the procedure file.

Therefore, because each portion included in the MP4 file is sequentially produced from a leading side of the MP4 file but not reversely, the MP4 file can more easily be produced.

Each range of the plurality of portions included in the difference file may be described in the procedure file according to a data size, and each range of the plurality of portions included in the original file may be described in the procedure file according to a start position of the portion and the data size.

Therefore, based on the description of the procedure file, the proper portions can be combined by copying or acquiring the proper portions from the difference file and the original file. The data size of the procedure file can be suppressed because the start position is not used in the description of the range of the portion included in the difference file.

The data size of the MP4 file may be described in the procedure file, and whether a free space necessary for the recording of the MP4 file exists in the medium may further be determined based on the data size of the MP4 file described in the procedure file in the file producing method.

Therefore, because whether the free space necessary for the recording of the MP4 file exists in the medium is determined, the production of the MP4 file can be canceled in advance when the free space does not exist. That is, generation of an error can be prevented before happens.

An attribute of the MP4 file may be described in the procedure file, and the attribute described in the procedure file may further be read in the file producing method.

Therefore, when the attribute of the MP4 file is read from the procedure file before the production of the MP4 file, whether the desired MP4 file is produced can be determined in advance.

A buffer size necessary for the playback of the MP4 file may be described in the procedure file, and the buffer size described in the procedure file may further be read in the file producing method.

Therefore, when the buffer size necessary for the playback of the MP4 file is read from the procedure file, whether the MP4 file can be played back can easily be determined without analyzing the MP4 file.

A first file name that is of a name of the original file and a second file name that is of a name of the difference file may be described in the procedure file, and further the file having the first file name described in the procedure file may be specified as the original file while the file having the second file name described in the procedure file may be specified as the difference file in the file producing method.

Therefore, the original file and difference file used to produce the MP4 file can properly be acquired.

In the production of the MP4 file, MP4-compatible header information that is of the data included in the difference file may be combined with the data included in the original file.

Therefore, the MP4 file having the proper MP4 header information can easily be produced.

The original file in the plain text state may be acquired in the acquisition of the original file, and the produced MP4 file may be encrypted in the production of the MP4 file.

Therefore, when the original file is deleted after the conversion into the MP4, confidentiality of the data included in the original file can be ensured while the data is left as the MP4 file.

In the production of the MP4 file, the MP4 file portion corresponding to the portion constituting the original file may be produced and encrypted every time the portion constituting the original file is acquired, and the original file portion corresponding to the portion constituting the MP4 file may be deleted every time the portion constituting the MP4 file is encrypted.

Therefore, all the pieces of data included in the plain text original file can be prevented from being stored in a storage area even temporarily, and the confidentiality of the data can securely be ensured.

The continuous playback of the two streams is not considered in the file producing method of PTL 1. In the file producing method of PTL 1, it is also not considered that playback times of parts of the two streams overlap each other. Accordingly, the MP4 file suitable for the overlap playback can hardly be produced.

To solve the problems, a file producing method according to one aspect of the present disclosure for producing the MP4 file, the method includes: producing one MP4 file by integrating the two streams in order to continuously play back the two streams; and storing information indicating the sections in which playback times of the two stream overlap each other in the produced MP4 file. For example, in the integration of the two streams, the two streams each of which is at least a part of the original file constructed in the MP4 file format are integrated. For example, in the integration of the two streams, the two streams each of which includes audio data are integrated.

Therefore, information indicating the overlap section is stored in the MP4 file. A playback device playing back the MP4 file can easily specify the data of the overlap section from the MP4 file using the information. As a result, the playback device can properly play back the pieces of data of the overlap section by combining the pieces of data. That is, the MP4 file suitable for the overlap playback can be produced.

In the case that the section exists across a plurality of samples included in one of the two streams, the two streams may be integrated after at least one of the plurality of samples is deleted.

Therefore, the sample is deleted, so that the overlap section can be shortened. As a result, a load of special processing of the playback device can be reduced with respect to the overlap section.

Time information indicating a time length of the section may be stored in the MP4 file as the information.

Therefore, the playback device playing back the MP4 file can easily specify the time length of the overlap section using the information. As a result, the playback device can properly play back the data within the specified time length by combining the pieces of data of the overlap section.

The time information may be stored in traf of moof in the MP4 file.

Therefore, the playback device can properly acquire the stored time information.

In the file producing method, the information may be acquired from the device or optical disk retaining the information.

Therefore, the information can easily be stored in the MP4 file without producing information indicating the overlap section.

A playback method according to one aspect of the present disclosure for playing back the MP4 file, the method includes: extracting information indicating the two sections in which the playback times overlap each other in a playback target content from the MP4 file; specifying the two sections in the content based on the extracted information; and combining and outputting decryption results of the pieces of data of the two sections.

Therefore, the playback device can easily specify the data of the overlap section from the MP4 file. As a result, the playback device can properly play back the data of the overlap section.

In a recording medium according to one aspect of the present disclosure, the MP4 file is recorded. In the recording medium, the MP4 file includes a content that is read and played back by a computer and information indicating the two sections in which the playback times overlap each other in the content.

Therefore, the playback device that reads the MP4 file from the recording medium to play back the MP4 file can easily specify the pieces of data of the two sections from the MP4 file using the information. As a result, the playback device can properly play back the pieces of data of the two sections by combining the pieces of data.

In the file producing method of PTL 1, in producing the MP4 file from the elementary stream using the play list, it is necessary to specify the elementary stream by performing a calculation using the play list information. For this reason, a load of the calculation processing of specifying the elementary stream is generated.

To solve the problem, a file producing method according to one aspect of the present disclosure for producing an MP4 file from an elementary stream, the method includes: acquiring a play list including identification information indicating each of a plurality of elementary streams; selecting an elementary stream indicated by predetermined identification information included in the acquired play list; and producing the MP4 file by converting data included in the elementary stream into an MP4 file format based on a manifest file corresponding to the selected elementary stream, the manifest file being necessary for the conversion of a file format based on a predetermined rule.

Therefore, the data included in the elementary stream selected from the play list can be converted into the MP4 file format based on the manifest file corresponding to the elementary stream. For example, the use of the manifest file specifies the elementary stream indicated by the predetermined identification information of the play list without the calculation, so that the processing load can be suppressed.

The play list may further include section information indicating a partial section of the elementary stream indicated by the predetermined identification information, the partial section of the elementary stream indicated by the section information may be selected in the selection, and the selected section of the elementary stream may be converted into the MP4 file format in the conversion.

Therefore, the data of the section in the elementary stream selected from the play list can be converted into the MP4 file format based on the manifest file corresponding to the elementary stream. The use of the manifest file specifies the elementary stream section indicated by the section information of the play list without the calculation, so that the processing load can be suppressed.

The section information may be indicated by clock time information indicating a clock time of decryption or display of the elementary stream, the manifest file may be information in which the clock time and a position in the elementary stream are correlated with each other, in the conversion, a position of the section in the elementary stream may be specified from the manifest file, the position of the section corresponding to clock time information indicated by the section information of the play list, the specified section of the elementary stream may be extracted, and the specified section of the elementary stream may be converted into the MP4 file format.

Therefore, the clock time of the decryption or display and the position in the elementary stream are previously correlated with each other in the manifest file, so that the position of the section of the elementary stream can easily be specified from the section information indicated in the play list. Therefore, the processing load can be suppressed.

The play list may include first identification information indicating a first elementary stream and second identification information indicating a second elementary stream as the predetermined identification information and first section information indicating a first section of the first elementary stream and second section information indicating a second section of the second elementary stream as the section information, in the selection, the first section indicated by the first section information in the first elementary stream indicated by the first identification information and the second section indicated by the second section information in the second elementary stream indicated by the second identification information may be selected from the acquired play list, and in the conversion, data including the selected first section of the first elementary stream and the selected second section of the second elementary stream may be converted into the MP4 file format.

Therefore, the two sections can easily be specified even if the sections of the two elementary streams are selected by the play list. Therefore, the processing load can be suppressed.

In the conversion, the selected first section of the first elementary stream may be extracted based on a first manifest file corresponding to the first elementary stream, the selected second section of the second elementary stream may be extracted based on a second manifest file corresponding to the second elementary stream, and data including the extracted first section and the extracted second section may be converted into the MP4 file format.

Therefore, even if the sections of the two elementary streams are selected by the play list, the two sections can easily be specified because the manifest files corresponding to the two elementary streams are used. Therefore, the processing load can be suppressed.

In the conversion, an audio MP4 file corresponding to the elementary stream may further be acquired, a video elementary stream corresponding to the selected elementary stream may be extracted based on the manifest file corresponding to the elementary stream, and the MP4 file may be produced using the extracted video elementary stream and the selected audio MP4 file.

Therefore, it is not necessary to produce the audio MP4 file by conversion from the elementary stream, so that the processing load can be suppressed.

In the selection, a menu for receiving input from a user may be produced, the input to the produced menu may be received, and an elementary stream may be selected from a play list determined according to the received input to the menu.

Therefore, a user's intention can be reflected on the play list.

A file producing device according to one aspect of the present disclosure that produces an MP4 file from an elementary stream, the device includes: an acquisition part that acquires a play list including identification information indicating each of a plurality of elementary streams; a selector that selects the elementary stream indicated by predetermined identification information included in the acquired play list; and a producing part that produces the MP4 file by converting data included in the elementary stream into an MP4 file format based on a manifest file corresponding to the selected elementary stream, the manifest file being necessary for the conversion of a file format based on a predetermined rule.

In a recording medium according to one aspect of the present disclosure, a plurality of MPEG2-TS files, a play list including identification information indicating each of a plurality of elementary streams included in the plurality of MPEG2-TS files, and a manifest file corresponding to a selected elementary stream, the manifest file being necessary for conversion of a file format based on a predetermined rule are recorded.

Hereinafter, exemplary embodiments will specifically be described with reference to the drawings.

The following exemplary embodiments illustrate the comprehensive or specific examples. A numerical value, a shape, a material, a component, a disposed position and a connection form of the component, a step, and step order in the following exemplary embodiments are described only by way of example, but not restrict the disclosure. In the components of the following exemplary embodiments, the component that is not described in the independent claim indicating the highest concept is illustrated as an optional component.

First Exemplary Embodiment

FIG. 5 is a block diagram illustrating a configuration of a file producing device in a first exemplary embodiment.

File producing device 10 of the first exemplary embodiment is an MP4 file producing device, and includes original file acquisition part 11, difference file acquisition part 12, procedure file acquisition part 13, and producing part 14. Original file acquisition part 11 acquires the original file constructed in a file format different from the MP4. Difference file acquisition part 12 acquires the difference file including data that is not included in the original file. Procedure file acquisition part 13 acquires the procedure file indicating the procedure for producing the MP4 file. Producing part 14 produces the MP4 file by the combination of the data included in the difference file and the data included in the original file according to the procedure indicated by the procedure file. In other words, producing part 14 converts the original file into the MP4 file.

Processing operation of file producing device 10 will be described in detail below.

Figure 6:
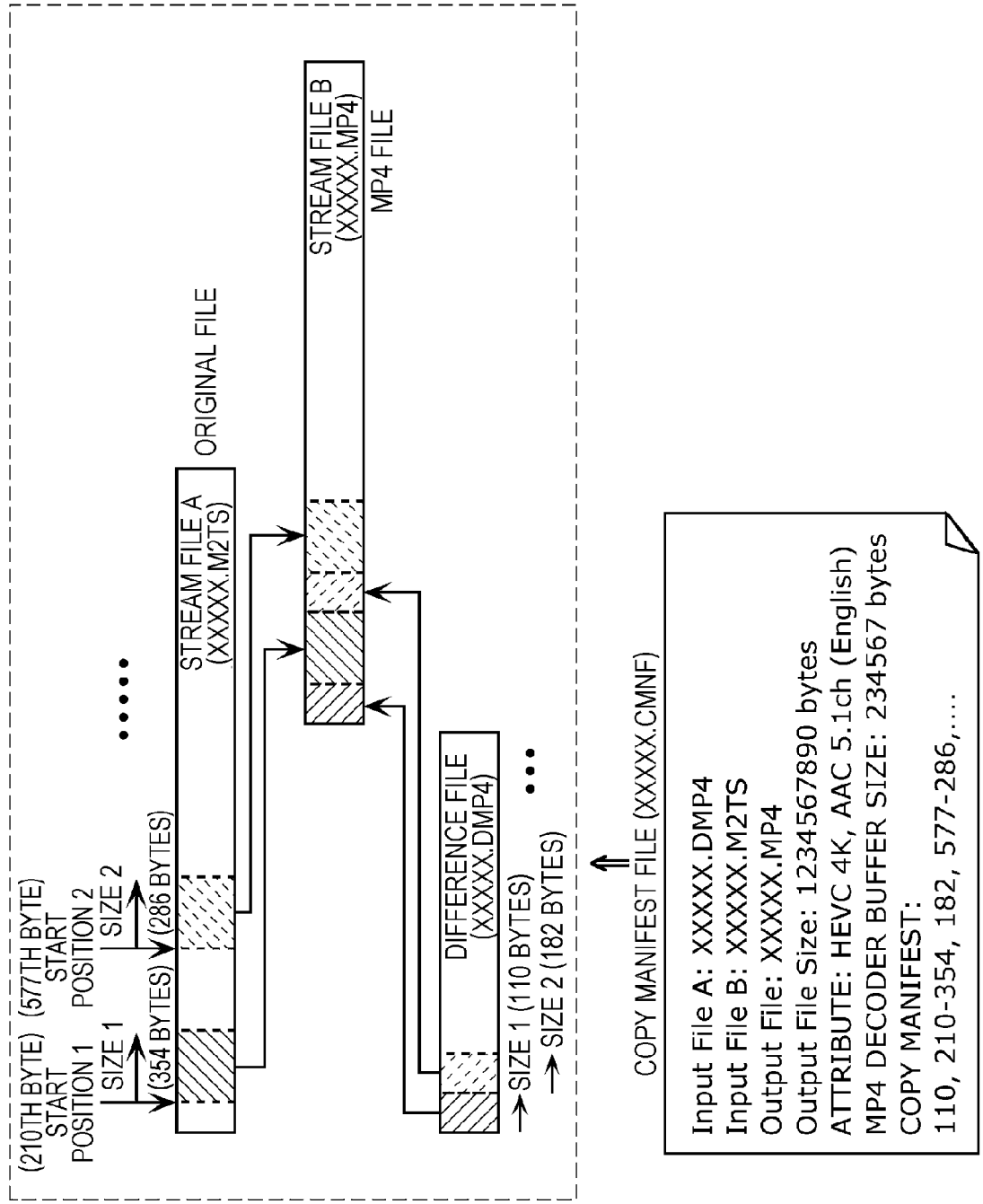
FIG. 6 is a view illustrating a method for producing an MP4 stream file from an MPEG2-TS stream file, a difference file, and a copy manifest file in the first exemplary embodiment.

FIG. 6 is a view illustrating a method for producing the MP4 stream file from the MPEG2-TS stream file, the difference file, and the copy manifest file.

In the first exemplary embodiment, for example, stream file A (XXXXX.M2TS) of the original file, the copy manifest file (XXXXX.CMNF) of the procedure file, and the difference file (XXXXX.DMP4) are recorded in the optical disk (for example, a Blu-ray (registered trademark) disc). How to process the original file to convert the original file into the MP4 file is described in the copy manifest file (XXXXX.CMNF). The data necessary for the conversion into the MP4 file is stored in the difference file XXXXX.DMP4).

In converting MPEG2-TS stream file A (XXXXX.M2TS), producing part 14 produces stream file B (XXXXX.MP4) of the MP4 file by alternately combining the data of stream file A (XXXXX.M2TS) and the data of the difference file (XXXXX.DMP4) according to the description of the copy manifest file (XXXXX.CMNF). In other words, producing part 14 converts stream file A (XXXXX.M2TS) into stream file B XXXXX.MP4).

Therefore, the original file can be converted without restoring the audio or video elementary stream (for example, an HE-AAC or MPEG-4 AVC stream). When the original file is encrypted, the original file can easily be converted into the MP4 file without decrypting the original file.

The copy manifest file (XXXXX.CMNF) includes "Input File A", "Input File B", "Output File", "Output File Size", "ATTRIBUTE", "MP4 DECODER BUFFER SIZE", and "COPY MANIFEST". "Input File A" and "Input File B" indicate the file names of the two input files. The conversion processing is allowed to start from the copy of the leading portion of the file indicated by "Input File A". "Output File" indicates the output file, namely, the file name of the produced MP4 file. "Output File Size" indicates the data size of the output MP4 file. The data size is described with byte precision. Whether a sufficient free space exists in the medium in which the output MP4 file is recorded can be confirmed in advance of the conversion processing by checking the data size. "ATTRIBUTE" indicates the attribute of each file, specifically, the type of the file produced by the conversion of the elementary stream. In the example of FIG. 6, "ATTRIBUTE" indicates that the converted MP4 file includes 4K video compressed by HEVC (High Efficiency Video Coding) and 5.1-ch English audio compressed by AAC (Advanced Audio Coding). Therefore, the type of the converted file that is obtained by the conversion according to the copy manifest file can previously be confirmed before the conversion processing. "ATTRIBUTE" may indicate a data structure of the MP4 file or an MP4 brand (namely, kind) stored in ftyp of the MP4 file.

"MP4 DECODER BUFFER SIZE" indicates the minimum buffer size necessary for the playback of converted stream file B (XXXXX.MP4) that is of the output MP4 file. The buffer size depends on which multiplexing rule is used to multiplex the video and audio in the MP4 file of converted stream file B. In addition to the buffer size, "MP4 DECODER BUFFER SIZE" may indicate which decoder resource (a memory capacity or a data transfer rate) is required to play back converted stream file B.

"COPY MANIFEST" indicates a range of each portion of the file indicated by "Input File A" and a range of each portion of the file indicated by "Input File B". Each portion is sequentially copied and pasted in order to produce the MP4 file indicated by "Output File". The range of each portion is indicated by the copy start position and the copy size or only the copy size. "COPY MANIFEST" indicates a range of each portion of the file such that the portion of the file indicated by "Input File A" and the portion of the file indicated by "Input File B" are alternately copied and pasted in a repetitive manner.

The difference file (XXXXX.DMP4) is copied and pasted in each portion of the assigned size from the head of the difference file. In "COPY MANIFEST", it is not necessary to assign a copy start position in order to indicate each portion of the difference file (XXXXX.DMP4). That is, the range of each portion of the difference file is indicated only by the copy size (data size) with no use of the copy start position.

On the other hand, stream file A (XXXXX.M2TS) includes the data unnecessary for converted stream file B (XXXXX.MP4). Accordingly, in "COPY MANIFEST", the range of each portion is indicated by the copy start position and the copy size in order to indicate each portion of stream file A that is of the original file. The copy start position is a byte position from the head of the file, and the copy size is the data size in units of bytes.

Producing part 14 alternately copies and pastes the portion included in the original file and the portion included in the difference file, which are indicated by "COPY MANIFEST", in the repetitive manner according to the copy manifest file. That is, producing part 14 repeats the alternate combination of the portion included in the original file and the portion included in the difference file, which are indicated by "COPY MANIFEST", in the repetitive manner. Therefore, the MP4 file of converted stream file B is produced.

According to the copy manifest file, the identical converted stream file B (XXXXX.MP4) can be produced with any device to convert the original file. That is, the converted stream file B is easily played back without a trouble using any device.

File producing device 10 may acquire the difference file (XXXXX.DMP4) and the copy manifest file (XXXXX.CMNF) from the optical disk such as the Blu-ray disc, or acquire both or one of the difference file (XXXXX.DMP4) and the copy manifest file (XXXXX.CMNF) through the Internet. In this case, various options can be presented to a user without need for any change in file producing device 10, and for example, such options allow the user to convert the original file into the file in the latest file format or into another MP4 file including the video and audio.

File producing device 10 may perform the conversion with stream file A of the original file encrypted, or file producing device 10 may perform the conversion into the MP4 file after the decryption of the original file, and re-encrypt the produced MP4 file. The file stream (XXXXX.M2TS) of the original file may be a plain text. Because the difference file is constructed with the header information, it is not necessary to encrypt the difference file. However, in the case that stream file A (XXXXX.M2TS) of the original file or stream file B (XXXXX.MP4) of the MP4 file is the plain text, sometimes operation to expand the whole file in the memory or operation to temporarily store the whole file in the hard disk is not permitted from the viewpoint of security.

Accordingly, file producing device 10 may sequentially delete the area where the conversion into the MP4 file is ended in stream file A (XXXXX.M2TS) of the plain text original file. Every time a portion of the movie fragment included in the MP4 file or a predetermined number of MP4 samples is produced, file producing device 10 may sequentially encrypt the portion when encrypting stream file B (XXXXX.MP4) of the MP4 file. The copied data area does not change irrespective of the encryption when an encryption system in which the data size does not change before and after the encryption is used.

The copy manifest file may indicate whether stream file A (XXXXX.M2TS) of the original file is encrypted. Alternatively, the copy manifest file may indicate whether the multiplexed coded data is converted into stream file A while kept encrypted or the encrypted coded data is converted into the plain text, converted into the MP4 file, and re-encrypted.

Figure 7:
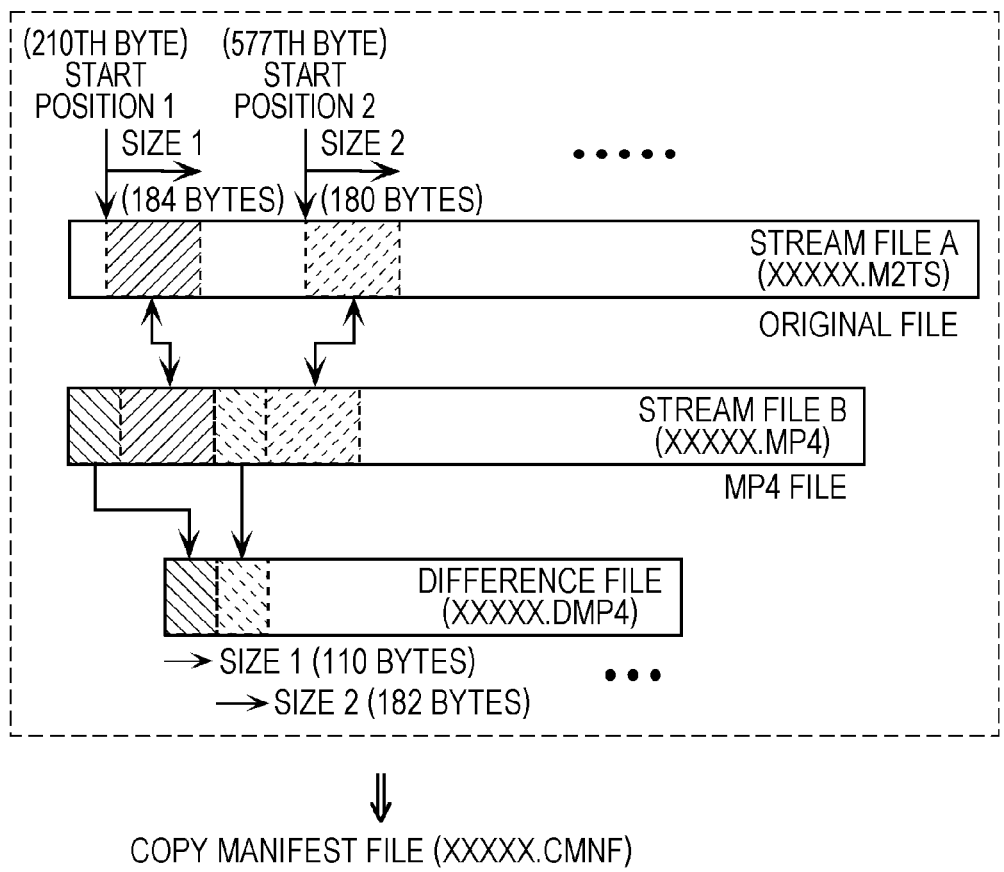
FIG. 7 is a view illustrating a method for producing the difference file and the copy manifest file in the first exemplary embodiment.

FIG. 7 is a view illustrating a method for producing the difference file and the copy manifest file.

The difference file (XXXXX.DMP4) and the copy manifest file (XXXXX.CMNF) can be produced as follows. At an authoring stage, stream file A (XXXXX.M2TS) of the original file is subjected to the format conversion to produce converted stream file B (XXXXX.MP4) of the MP4 file. Then, at least one portion of each of stream file A of the original file and stream file B is searched such that the portions include the pieces of data matched with each other. At this point, the search is performed such that the data size of each portion is maximized. Then, remaining portions except for the searched portion included in stream file B are coupled in the order included in stream file B, thereby producing the difference file. At this point, a correlation result of the files is recorded in the copy manifest file as "COPY MANIFEST".

The data included in stream file A and the data included in stream file B are sequentially acquired rearward from the head of each of the files, and compared to each other, thereby performing the search. The comparison is performed without returning to the opposite direction. Therefore, the conversion processing (copy processing) can be performed sequentially, that is, as one piece of continuous processing, and speed enhancement and memory saving can be achieved.

When the video and the audio are multiplexed by the MPEG2-TS, sometimes a predetermined PTS (Presentation TimeStamp) picture included in the video is multiplexed earlier in time compared with the same PTS frame as the predetermined PTS included in the audio such that data of a large-code-amount picture such as an I picture does not cause underflow. On the other hand, the video and the audio are multiplexed by the MP4 such that the PTS of the video leading picture in the movie fragment and the PTS of the audio leading frame are matched with each other or come close to each other.

When stream file A differs from stream file B in the audio, video, or text multiplexing unit, sometimes the conversion processing cannot be sequentially performed. As a result, sometimes the conversion is performed while a read or write pointer is sequentially moved back and forth. Accordingly, whether the conversion processing can be performed as one piece of continuous processing may be registered in the copy manifest file, or the maximum data size by which the pointer needs to be moved back may be registered in the copy manifest file for cases where the conversion processing cannot be performed as one piece of continuous processing.

When the portions including the pieces of data matched with each other are searched in units of small pieces of data with respect to stream file A and stream file B, the data size of the copy manifest file is enlarged or the conversion processing becomes troublesome. For this reason, a specific threshold may be provided. For example, only the portions in which the pieces of data having at least 8 bytes are matched with each other are registered in the copy manifest file. Even if each of the remaining portions in stream file B except the portion including the matched data having at least 8 bytes includes the data less than 8 bytes that are matched with those of the data of stream file A, the pieces of data included in the remaining portions are stored in the difference file. The threshold may be described in the copy manifest file like "MIN COPY SIZE: 8 bytes".

The MPEG-2TS file may be converted into the MP4 file using not the difference file but the copy manifest file indicating a multiplexing unit in the MP4 file. For example, in the MP4, the audio, video, and text are multiplexed as the movie fragments having different texts. At this point, each DTS of the leading and final audio frames and video pictures of the movie fragment or a byte offset value from the head of the MPEG-2TS file may be registered in the decryption order together with the identification information on the medium. The registration order of the movie fragment is the same as appearance order of the movie fragment in the MP4 file.

Figure 8:
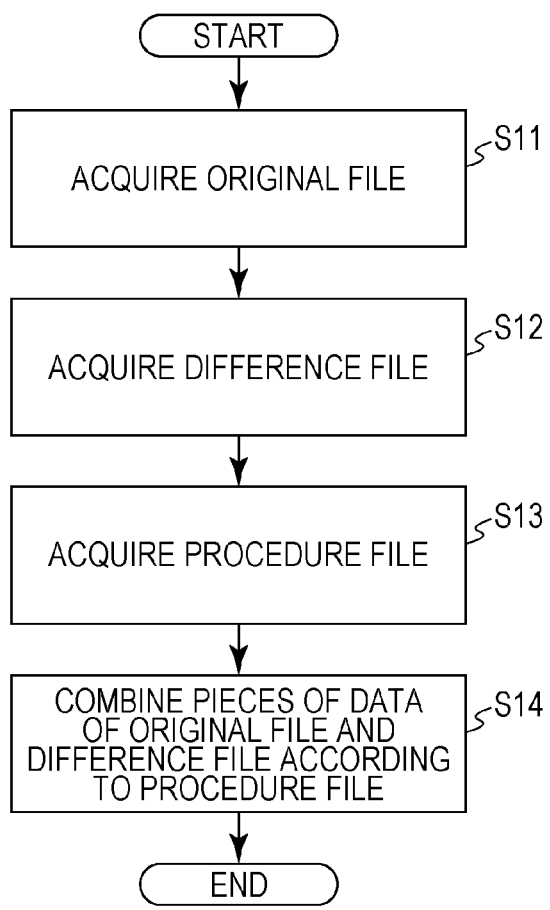
FIG. 8 is a flowchart illustrating a file producing method in the first exemplary embodiment.

FIG. 8 is a flowchart illustrating a file producing method of the first exemplary embodiment.

The file producing method of the first exemplary embodiment is one in which file producing device 10 produces the MP4 file. In the file producing method, original file acquisition part 11 of file producing device 10 acquires the original file constructed in a file format different from the MP4 (Step S11). Difference file acquisition part 12 acquires the difference file including data that is not included in the original file (Step S12). Procedure file acquisition part 13 acquires the procedure file indicating the procedure for producing the MP4 file (Step S13). Producing part 14 produces the MP4 file by the combination of the data included in the difference file and the data included in the original file according to the procedure indicated by the procedure file (Step S14). For example, in Step S11, original file acquisition part 11 acquires the original file constructed in an MPEG2-TS file format.

The MP4 file is produced by a combination of the data included in the difference file and the data included in the original file according to a predetermined procedure. Accordingly, the MP4 file can easily be produced without returning the original file constructed in the MPEG2-TS file format or the like to the stream such as the video stream and the audio stream. Even if the original file is encrypted, it is not necessary to decrypt and re-encrypt the original file. Accordingly, a processing load necessary for the production of the MP4 file can be suppressed.

In Steps S11 to S13, original file acquisition part 11, difference file acquisition part 12, and procedure file acquisition part 13 acquire the original file, the difference file, the procedure file by reading the original file, the difference file, the procedure file from the optical disk, respectively. Therefore, all the files necessary for the production of the MP4 file are acquired from one optical disk, so that time and effort for searching the files can be saved to more easily produce the MP4 file.

The ranges of the plurality of portions included in the difference file and the ranges of the plurality of portions included in the original file are described in the procedure file such that the ranges of the portions included in the difference file and the ranges of the portions included in the original file are alternately arrayed. In Step S14, producing part 14 produces the MP4 file by combining the portions indicated by the ranges in the order of the ranges described in the procedure file. Therefore, because each portion included in the MP4 file is sequentially produced from a leading side of the MP4 file but not reversely, the MP4 file can more easily be produced.

Each of the ranges of the plurality of portions included in the difference file is described in the procedure file by the data size. On the other hand, each of the ranges of the plurality of portions included in the original file is described in the procedure file by the start position of the portion and the data size. Therefore, based on the description of the procedure file, the proper portions can be combined by copying or acquiring the proper portions from the difference file and the original file. The data size of the procedure file can be suppressed because the start position is not used in the description of the range of the portion included in the difference file.

The data size of the MP4 file is described in the procedure file. In Step S14, producing part 14 may determine whether the free space necessary for the recording of the MP4 file exists in the medium based on the data size of the MP4 file described in the procedure file. Therefore, because whether the free space necessary for the recording of the MP4 file exists in the medium is determined, the production of the MP4 file can be canceled in advance when the free space does not exist. That is, generation of an error can be prevented before happens.

An attribute of the MP4 file is described in the procedure file. File producing device 10 may further read the attribute described in the procedure file.

Therefore, when the attribute of the MP4 file is read from the procedure file before the production of the MP4 file, whether the desired MP4 file is produced can be determined in advance.

A buffer size necessary for the playback of the MP4 file is described in the procedure file. File producing device 10 may further read the buffer size described in the procedure file. Therefore, when the buffer size necessary for the playback of the MP4 file is read from the procedure file, whether the MP4 file can be played back can easily be determined without analyzing the MP4 file.

The first file name that is of the name of the original file and the second file name that is of the name of the difference file are described in the procedure file. File producing device 10 may specify the file having the first file name described in the procedure file as the original file, and may specify the file having the second file name described in the procedure file as the difference file. Therefore, the original file and difference file used to produce the MP4 file can properly be acquired.

In Step S14, producing part 14 combines the MP4-compatible header information of the data included in the difference file with the data included in the original file. Therefore, the MP4 file having the proper MP4 header information can easily be produced.

Original file acquisition part 11 may acquire the original file in the plain text state in Step S11, and producing part 14 may encrypt the produced MP4 file in Step S14. Therefore, when the original file is deleted after the conversion into the MP4, confidentiality of the data included in the original file can be ensured while the data is left as the MP4 file.

In Step S14, producing part 14 may produce and encrypt the MP4 file portion corresponding to the portion constituting the original file every time the portion constituting the original file is acquired, and may delete the original file portion corresponding to the portion constituting the MP4 file every time the portion constituting the MP4 file is encrypted. Therefore, all the pieces of data included in the plain text original file can be prevented from being stored in a storage area even temporarily, and the confidentiality of the data can securely be ensured.

First Modification of First Exemplary Embodiment

In the first exemplary embodiment, the MP4 file is produced using the difference file and the copy manifest file. Alternatively, the MP4 file may be produced with no use of the difference file and the copy manifest file. In a file producing method of a first modification of the first exemplary embodiment, an MPEG2-TS stream file constructed with a plurality of source packets having plain text headers is converted into an MP4 stream file using a counter. Therefore, the MP4 stream file is produced. The MPEG2-TS stream file is the original file, and the MP4 stream file is the MP4 file.

FIG. 9 is a view illustrating a file producing method in the first modification of the first exemplary embodiment.

As described above, the MPEG2-TS stream file (namely, the content) is constructed with the plurality of source packets. In FIG. 9, the source packet is abbreviated to SP.

In each source packet included in the MPEG2-TS stream file of the first modification of the first exemplary embodiment, only the TS payload is encrypted in the data included in the source packet. That is, in the data included in the source packet, the TS_extra_header and TS header are not encrypted, but the plain text.

An AES-CTR (CounTeR) mode is used in the encryption. In the AES-CTR mode, the encryption and the decryption are performed using a value of a counter. As illustrated in FIG. 9, the plurality of TS payloads including the pieces of video data are encrypted using a value of a video counter (AES Counter for Video), and the plurality of TS payloads including the pieces of audio data are encrypted using a value of an audio counter (AES Counter for Audio). The video counter counts only the data of the video source packet such that a count value increases according to an arrow in FIG. 9. The audio counter counts only the data of the audio source packet such that a count value increases according to an arrow in FIG. 9. The detailed encryption in the AES-CTR mode is described later.

The file producing device can easily convert the MPEG2-TS stream file into the MP4 stream file by taking out only the TS payload in each of the plurality of source packets included in the MPEG2-TS stream file.

Figure 10A:
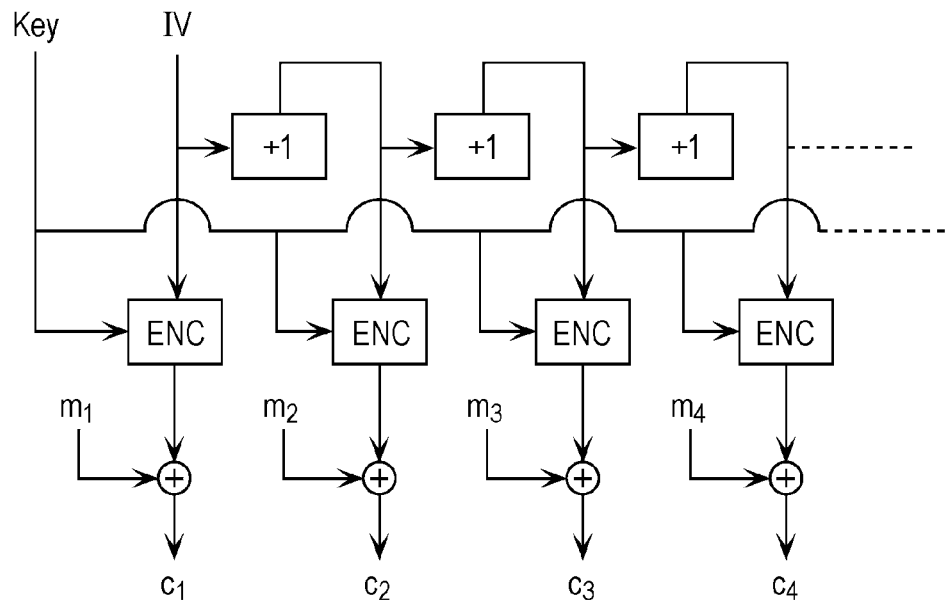
FIG. 10A is a view illustrating data encryption in an AES-CTR mode in the first modification of the first exemplary embodiment.

FIG. 10A is a view illustrating the data encryption in the AES-CTR mode.

A key and an IV (Initial Vector) of an initial value are used in the encryption. The IV is encrypted using the key. Cryptogram c1 corresponding to the leading 16 bytes (m1 in FIG. 10A) of encryption target data is produced by a calculation of exclusive OR of the value obtained by the encryption and the leading 16 bytes of the encryption target data. The same processing as the processing performed on the leading 16 bytes is performed on next 16-byte (m2 in FIG. 10A) data (block) included in the encryption target data after the IV is updated like IV=IV+1. Therefore, cryptogram c2 corresponding to the next 16-byte data is produced. The updated IV is the count value, and the video counter and audio counter in FIG. 9 perform the calculation of IV=IV+1.

The cryptogram the can be produced for the long data of at least 16 bytes by the continuously performing the processing. In the case that a length of the encryption target data is not a multiple number of 16 bytes, the cryptogram is produced by calculating exclusive OR in units of bits in the final block.

Figure 10B:
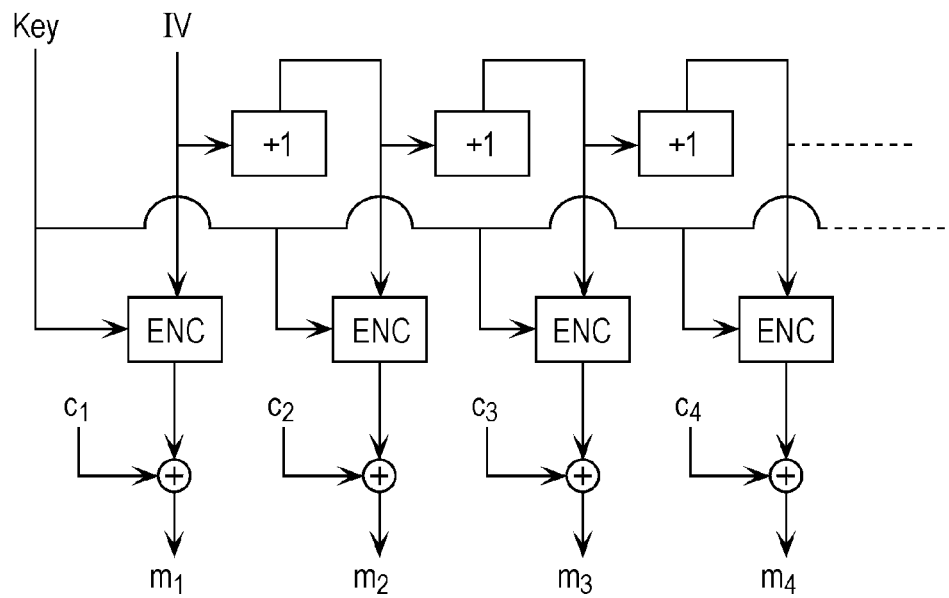
FIG. 10B is a view illustrating data decryption in the AES-CTR mode in the first modification of the first exemplary embodiment.

FIG. 10B is a view illustrating the data decryption in the AES-CTR mode.

In the decryption, the same processing as the encryption is performed on a decryption target data. That is, the processing of encrypting the IV is also performed using the key in the decryption.

Thus, the file producing method of the first modification of the first exemplary embodiment for producing the MP4 file, the method includes: acquiring the original file constructed with the plurality of packets; acquiring only the remaining encrypted payload portion except for the header information in the plain text state in every packet included in the original file; and producing the MP4 file by the combination of the remaining encrypted payload portions. For example, the original file constructed in an MPEG2-TS file format is acquired. Therefore, the MP4 file can easily be produced without returning the original file constructed in the MPEG2-TS file format or the like to the stream such as the video stream and the audio stream. It is not necessary to decrypt and re-encrypt the original file. Accordingly, a processing load necessary for the production of the MP4 file can be suppressed.

In the plurality of packets included in the original file, the payload of each of the plurality of packets including the video data is encrypted using the count value of a first counter for video, and the payload of each of the plurality of packets including the audio data is encrypted using the count value of a second counter for audio different from the first counter. The first counter counts only the data included in each of the plurality of packets corresponding to the video toward the end from the head of the original file, and the second counter counts only the data included in each of the plurality of packets corresponding to the audio toward the end from the head of the original file. Therefore, the video elementary constructed by the combination of the payloads of the plurality of packets corresponding to the video can easily be decrypted in the MP4 file because the first counter is used as a counter dedicated to the video. Similarly, the audio elementary constructed by the combination of the payloads of the plurality of packets corresponding to the audio can easily be decrypted in the MP4 file because the second counter is used as the counter dedicated to the audio.

The original file is constructed with the plurality of aligned units, and each of the plurality of aligned units is constructed with the plurality of source packets. The plurality of packets included in the original file are the plurality of source packets included in each of the plurality of aligned units. The payload is the TS payload, and the header information is constructed with the TP_extra_header and the TS header.

Second Modification of First Exemplary Embodiment

In the first exemplary embodiment, the MP4 file is produced using the difference file and the copy manifest file. Alternatively, the MP4 file may be produced with no use of the difference file and the copy manifest file. In a file producing method of a second modification of the first exemplary embodiment, the MPEG2-TS stream file including auxiliary information is converted into the MP4 stream file using the auxiliary information. Therefore, the MP4 stream file is produced.

Because the MPEG2-TS and the MP4 differ from each other in a part of the method for multiplexing the data of the access unit, the access unit is separated into a plurality of portions to individually store the portions when the MPEG2-TS data is stored in the MP4 file. Basically, the access unit in the MPEG2-TS includes initialization information necessary for the decryption of the video picture or the audio frame and the coded data of the picture or the frame. On the other hand, the access unit (in the MP4, called a sample or an MP4 sample) in the MP4 file is constructed only with the coded data of the picture or the frame, the initialization information necessary for the decryption is separately stored as the MP4 file header information separately from the coded data.

The auxiliary information decreasing a conversion-related processing amount in converting the multiplexed coded data into the MP4 file by MPEG2-TS and a multiplexing format conversion method in which the auxiliary information is used will be described below. Particularly, in the case that the coded data is encrypted, the processing amount increases when the re-encryption is performed after decryption. In the second modification of the first exemplary embodiment, the conversion into the MP4 file can be performed only by copying the data without decrypting the coded data.

The MPEG2-TS stream file of the pre-conversion original file may be another TS (Transport Stream). That is, the original file may be not only the TS specified by the MPEG-2 system but also the TS (for example, the TS used in the Blu-ray disc or video distribution) in which the header information having a predetermined number of bytes is added to the TS packet. The MP4 file produced by the conversion may be the MP4 file in which the movie fragment is used or the MP4 file in which the movie fragment is not used. The format of the file produced by the conversion may be CFF (Common File Format) of DECE (Digital Entertainment Content Ecosystem) extended based on the MP4 or MPEG-DASH (Dynamic Adaptive Streaming over HTTP). Hereinafter, the original file is described as the transport stream.

Figure 11:
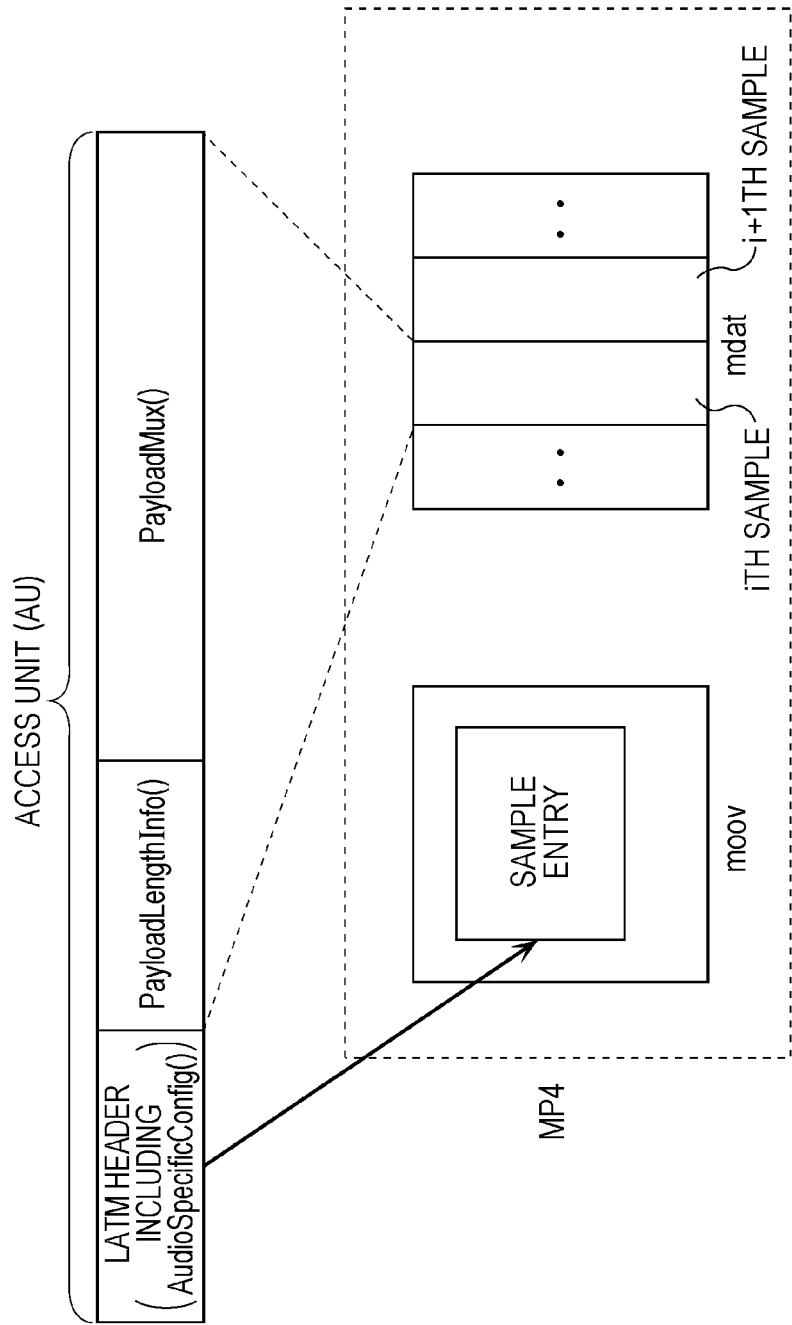
FIG. 11 is a view illustrating an example in which an MPEG-4 AAC access unit stored in a transport stream is stored in an MP4 file in a second modification of the first exemplary embodiment.

FIG. 11 is a view illustrating an example in which an MPEG-4 AAC access unit stored in the transport stream is stored in the MP4 file.

The MPEG-4 AAC access unit in the transport stream is constructed with three kinds of data, namely, an LATM (Low Overhead Audio Transport Multiplex) header, PayloadLengthInfo( ), and PayloadMux( ). The LATM header includes the initialization information, such as a number of channels and a sampling frequency, which is necessary for the decryption of the MPEG-4 AAC coded data (also referred to as AAC data). More particularly, the initialization information is stored in AudioSpecificConfig( ) of the LATM header. The size of PayloadMux( ) is stored in PayloadLengthInfo( ), and the AAC data is stored in PayloadMux( ).

When the data of the access unit is stored in the MP4 file, AudioSpecificConfig( ) of the LATM header is stored in a sample entry of stsd in moov of the MP4 file. PayloadLengthInfo( ) and PayloadMux( ) are stored in mdat as sample data. The sample data is one stored in the sample. The sample data in the mdat is referred to from the moov, or the sample data in the mdat is referred to from the moof in the case that the movie fragment is used. In the MPEG-2 AAC, not the LATM header but an ADTS (Audio Data Transport Stream) header is used, and the access unit is constructed with the ADTS header and the AAC data (called raw_data_block( )). At this point, the ADTS header is separated from the access unit, and at least adts_fixed_header( ) in the data included in the ADTS header is stored in the sample entry. The AAC data is stored in the mdat as the sample data.

Figure 12:
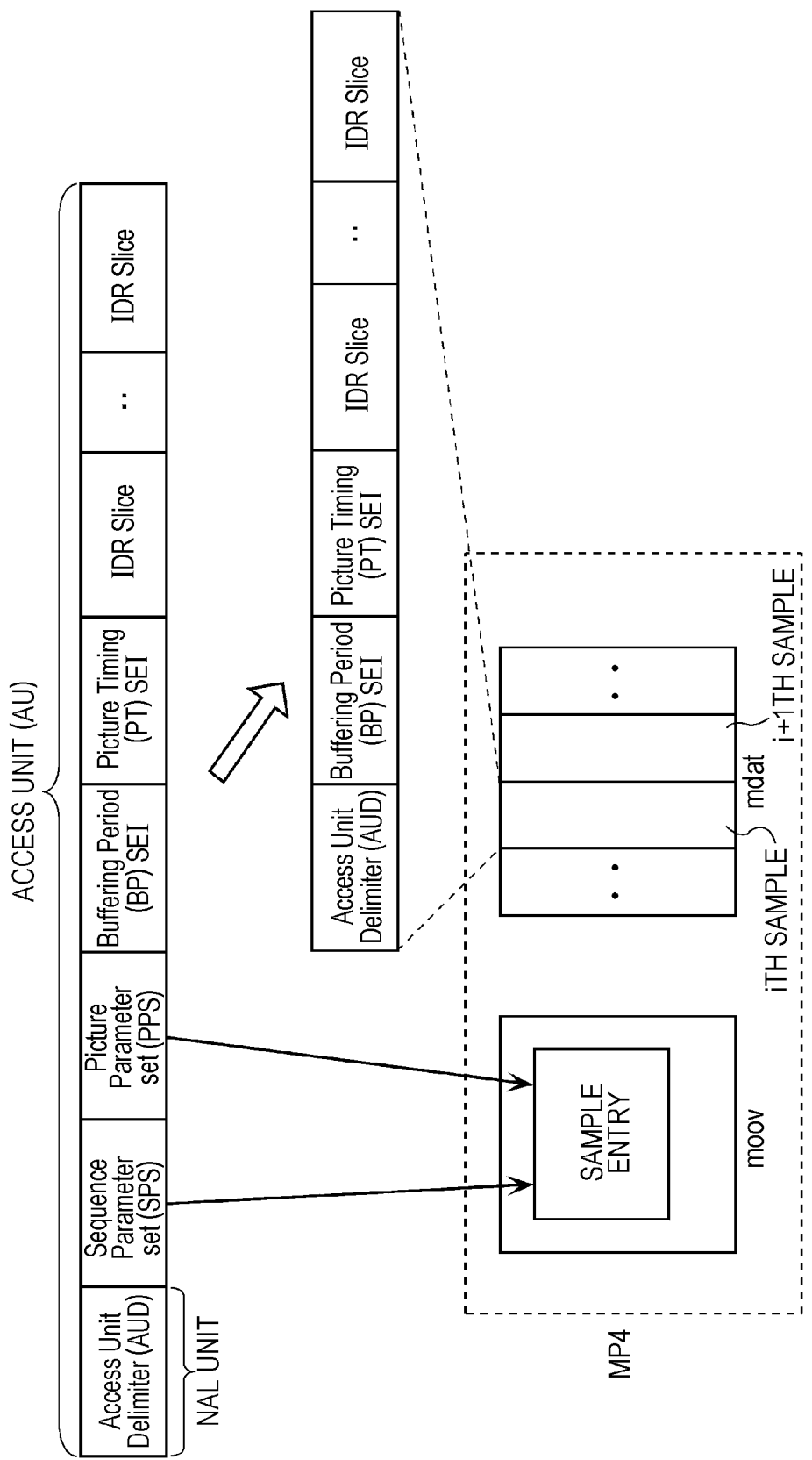
FIG. 12 is a view illustrating an example in which an MPEG-4 AVC access unit stored in the transport stream is stored in the MP4 file in the second modification of the first exemplary embodiment.

FIG. 12 is a view illustrating an example in which an MPEG-4 AVC (Advanced Video Coding) access unit stored in the transport stream is stored in the MP4 file.

Similarly to the MPEG-4 AAC, the initialization information, such as a sequence parameter set (SPS) and picture parameter set (PPS), which is necessary for the decryption, is stored as a part of the access unit in the transport stream. On the other hand, in the MP4 file, the initialization information is stored as header information on the MP4 file. The access unit in FIG. 12 constitutes an IDR (Instantaneous Decoder Refresh) picture. An NAL (Network Adaptation Layer) unit of each of the SPS and PPS is stored in the sample entry of the stsd in the moov of the MP4 file while separated from the access unit. Other pieces of data included in the access unit are stored in the mdat as the sample data.

A mode in which the initialization information such as the SPS and the PPS is included in the MPEG-4 AVC sample data can be selected in the MP4. The mode is indicated by the identification information of the sample entry. In the case that the identification information is "avc1" or "avc2", the initialization information is prohibited from being included in the sample data. On the other hand, in the case that the identification information is "avc3" or "avc4", the initialization information is permitted to be included in the sample data. In the case that the identification information in the MP4 file is set to "avc1" or "avc2" in converting the transport stream into the MP4 file, the NAL units of the SPS and PPS or the NAL unit of FillerData used in stuffing is deleted from the data stored in the mdat from the access unit of the transport stream. In the case that the identification information is set to "avc3" or "avc4", the NAL unit of the SPS or PPS does not need to be deleted. Accordingly, whether the SPS and the PPS are deleted may be switched according to a setting value of the identification information in the MP4 file.

Similarly to the MPEG-4 AVC, the data of HEVC (High Efficiency Video Coding) that is of a next-generation video coding system is constructed with the NAL unit, and has the initialization information such as the SPS and the PPS. The initialization information may be included in the sample data when the HEVC data is stored in the MP4 file. Accordingly, in converting the transport stream into the MP4 file, whether the initialization information is deleted in the data that is stored in the mdat from the access unit of the transport stream may be determined according to the kind of the coding system, and processed according to a determination result.

As described above, the LATM header is separated from the access unit when the MPEG-4 AAC coding data is stored in the MP4 file. Only the PayloadLengthInfo( ) and PayloadMux( ) are stored in the mdat as the sample data. Hereinafter, PayloadLengthInfo( ) and PayloadMux( ) are collectively referred to as an LATM payload.

In the second modification of the first exemplary embodiment, the LATM header and the LATM payload are stored in individual TS packets when the data of the MPEG-4 AAC access unit is stored in the plurality of TS packets. Therefore, the LATM header can easily be separated.

Figure 13:
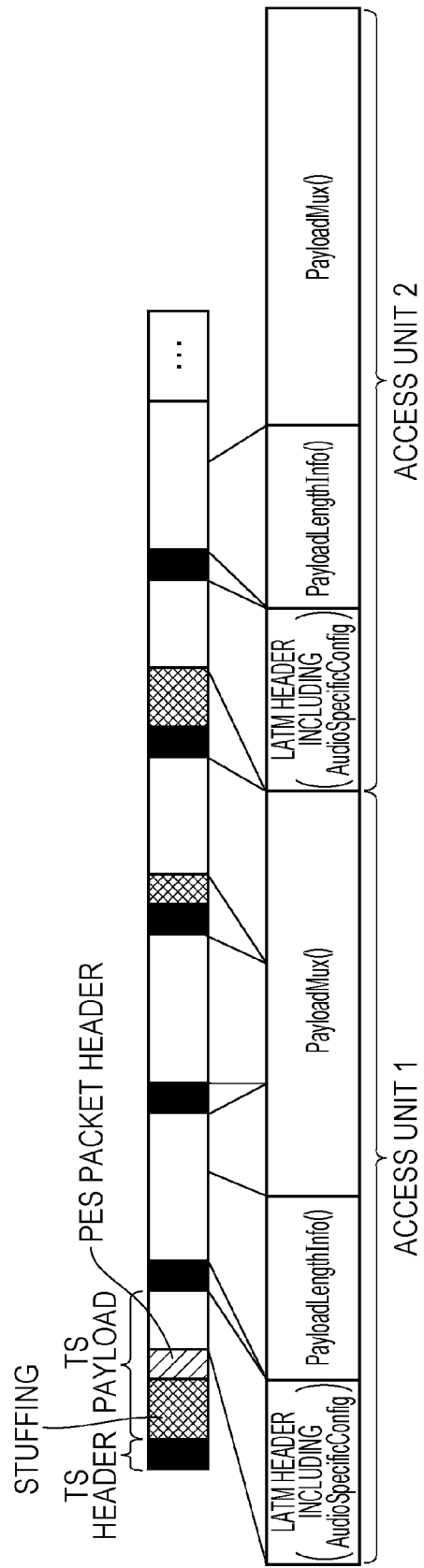
FIG. 13A is a view illustrating an example in which an LATM header and an LATM payload are stored in a TS packet in the second modification of the first exemplary embodiment.
FIG. 13B is a view illustrating a syntax example of an AU_info table in the second modification of the first exemplary embodiment.
FIG. 13C is a view illustrating another syntax example of the AU_info table in the second modification of the first exemplary embodiment.

FIG. 13A is a view illustrating an example in which the LATM header and the LATM payload are stored in the TS packets. The stuffing is performed as needed such that the pieces of data of the LATM header and the LATM payload are not mixed in the payload of the identical TS packet. For example, the LATM header of access unit 1 is stored in the payload of the leading TS packet. At this point, the stuffing is performed on the remaining area of the TS payload when the size of the LATM header is less than the size of the TS payload. Although the PES packet is not illustrated in the example of FIG. 13A, actually the data of the access unit is stored in the payload of the PES packet, and the data of the PES packet is stored in the payload of the TS packet.

A method for distinguishing the TS packet in which the LATM header is stored from the TS packet in which the LATM payload is stored will be described below. When one access unit is stored as one PES packet, the payload_unit_start_indicator of the TS header is set to 1 in the TS packet including the leading data of the PES packet. Whether the LATM header is included in the TS packet can be determined based on the value of the payload_unit_start_indicator if the LATM header is surely included in the payload of the TS packet in which the payload_unit_start_indicator is set to 1. When a plurality of access units are stored in one PES packet, an AU_info table of the auxiliary information may be disposed at the head of the payload of the PES packet. The AU_info table includes the number of access units included in the payload of the PES packet and the sizes of the LATM header and LATM payload in each access unit.

FIG. 13B is a view illustrating a syntax example of the AU_info table.

The AU_info table includes "AU_info_identification_code", "number_of_AU" indicating the number of access units, and "size_of_LengthInfo" indicating the sizes of the LATM header and LATM payload of the access unit. "AU_info_identification_code" is an intrinsic bit string of the AU_info table. Whether the AU_info table exists can be determined by searching "AU_info_identification_code". Alternatively, like a box structure of the MP4, the AU_info table may have a data structure in which the data size of the box and the type of the box are combined. However, "AU_info_identification_code" may be eliminated when the existence of the AU_info table is signaled by a descriptor in the transport stream or auxiliary data, which is used in the conversion into the MP4 file while prepared separately from the transport stream. The AU_info table may be used when one access unit is stored in one PES packet.

A technique of specifying the data separated for the purpose of the conversion into the MP4 file by indicating the size or a data offset of each constituent in the access unit may be applied to the MPEG-4 AVC coded data. That is, when the MPEG-4 AVC coded data is stored in the MP4 file, the technique may be applied in order to separate the NAL units of the SPS and PPS from each other.

FIG. 13C is a view illustrating a syntax example of the AU_info table individually indicating whether a constituent of the access unit needs to be removed from the sample data of the MP4 file.

The AU_info table includes "AU_info_identification_code", "number_of_data_unit", "size_of_data_unit", and "conversion_mode". "number_of_data_unit" indicates a number of data units included in the access unit. "size_of_data_unit" indicates a size of the data unit. "conversion_mode" is a conversion mode indicating how to deal with the data unit during the conversion into the MP4 file. When "conversion_mode" is set to 0, "conversion_mode" indicates that the data unit is copied as the sample data of the MP4 file. When "conversion_mode" is set to 1, "conversion_mode" indicates that the data unit is excluded from the sample data, namely, that the data unit is not copied as the sample data.

When "conversion_mode" is set to 1, "conversion_mode" may indicate how to deal with the excluded data unit. For example, "conversion_mode" indicates that the data unit is stored in the sample entry after excluded from the sample data.

The plurality of pieces of information on the data units are stored in ascending order. For example, in the case that one access unit of the MPEG-4 AVC is stored as one PES packet, the data unit corresponds to the NAL unit, and the number of NAL units constituting the access unit is indicated by "num_of_data_unit". "conversion_mode" is set to 1 with respect to the NAL unit of each of the SPS and the PPS. The LATM header and the LATM payload may be considered to be a data unit. In this case, "conversion_mode" is set to 1 with respect to the data unit corresponding to the LATM header, which allows the AU_info table to be applied to the MPEG-4 AAC. In the case that the plurality of access units are stored in the PES packet, "number_of_data_unit" indicates the total number of data units included in all the access units in the PES packet.

The AU_info table may be stored in "adaptation_field" of the header (TS header in FIG. 3) of the TS packet including a start portion of the PES packet. The AU_info table may be stored as a part of the NAL unit in the MPEG-4 AVC or HEVC or the coded data of SEI (Supplemental Enhancement Information). When the AU_info table is stored as a part of the coded data, the AU_info table can be stored in each access unit or random access. In the case that the AU_info table is stored in the TS packet or the PES packet, the AU_info table may be stored in each PES packet, or the AU_info table may be stored only in the PES packet including the access unit that becomes the head in the decryption order of the random access unit. In the case that the AU_info table is stored for each random access unit, information on all the access units constituting the random access unit is stored in the AU_info table.

Figure 14:
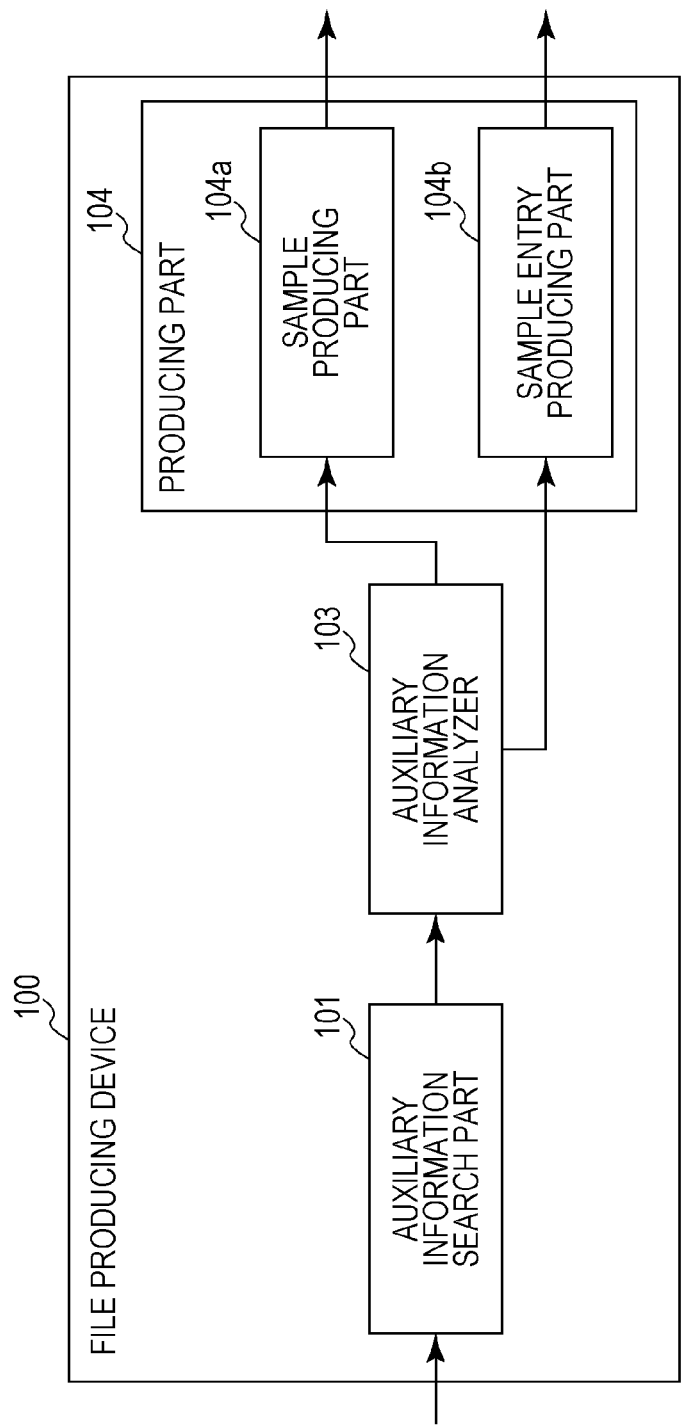
FIG. 14 is a block diagram illustrating a configuration of a file producing device in the second modification of the first exemplary embodiment.

FIG. 14 is a block diagram illustrating a configuration of a file producing device of the second modification of the first exemplary embodiment.

File producing device 100 of the second modification of the first exemplary embodiment produces the MP4 file by converting the transport stream including the AU_info table into the MP4 file. File producing device 100 includes auxiliary information search part 101, auxiliary information analyzer 103, and producing part 104. Auxiliary information search part 101 searches the AU_info table of the auxiliary information from the transport stream. Auxiliary information analyzer 103 determines whether the AU_info table exists based on a search result. When determining that the AU_info table exists, auxiliary information analyzer 103 analyzes the AU_info table. Producing part 104 produces the MP4 file based on an analysis result of auxiliary information analyzer 103.

Specifically, producing part 104 includes sample producing part 104a and sample entry producing part 104b. Sample producing part 104a stores the data of the LATM payload or NAL units other than the NAL units of the SPS and PPS in the mdat of the MP4 file as the sample data. Sample entry producing part 104b stores the data of the LATM header or the NAL units of the SPS or PPS in the sample entry of the stsd in the moov of the MP4 file.

Thus, file producing device 100 can easily convert the transport stream including the AU_info table into the MP4 file.

As described above, the MPEG2-TS and the MP4 differ from each other in a storage site of the initialization information necessary for the decryption during the storage of the audio or video coded data. The MPEG2-TS and the MP4 also differ from each other in a storage format of the NAL unit in the MPEG-4 AVC or the HEVC. Accordingly, it is necessary to convert the storage format in order to convert the transport stream into the MP4 file. The storage format of the NAL unit in the MPEG2-TS and the MP4 will be described below with reference to FIGS. 15A to 15C.

Figure 15A:
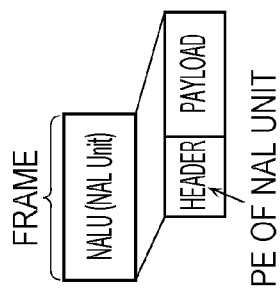
FIG. 15A is a view illustrating a schematic structure of an NAL unit in the second modification of the first exemplary embodiment.

FIG. 15A is a view illustrating a schematic structure of the NAL unit.

The NAL unit is constructed with the header and the payload. Type information indicating the type of the data stored in the payload is stored in the header.

Figure 15B:
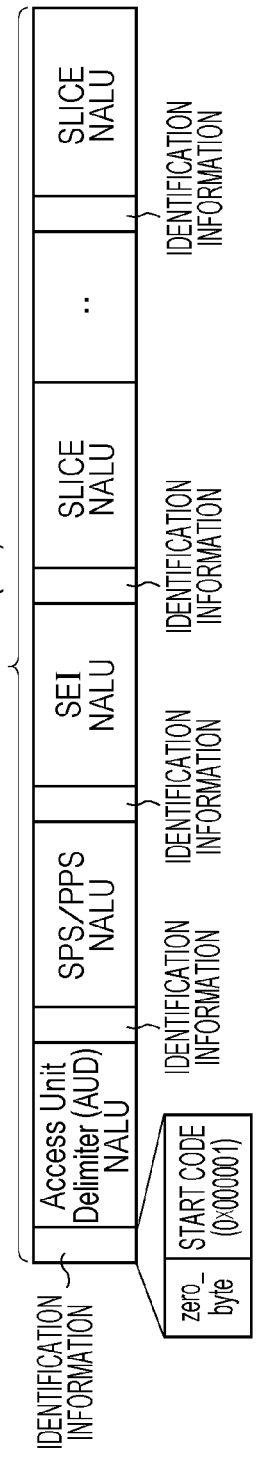
FIG. 15B is a view illustrating an example of a storage format of the NAL unit in MPEG2-TS in the second modification of the first exemplary embodiment.

FIG. 15B is a view illustrating an example of a storage format of the NAL unit in the MPEG2-TS. In the MPEG2-TS, an intrinsic bit string called a start code is added to the NAL unit as the identification information in order to identify a boundary of the NAL unit (hereinafter, the format of the identification information is referred to as a start code format). A decryption device and the like can separate the desired NAL unit by searching the start code and the type information stored in the header of the NAL unit.

Figure 15C:
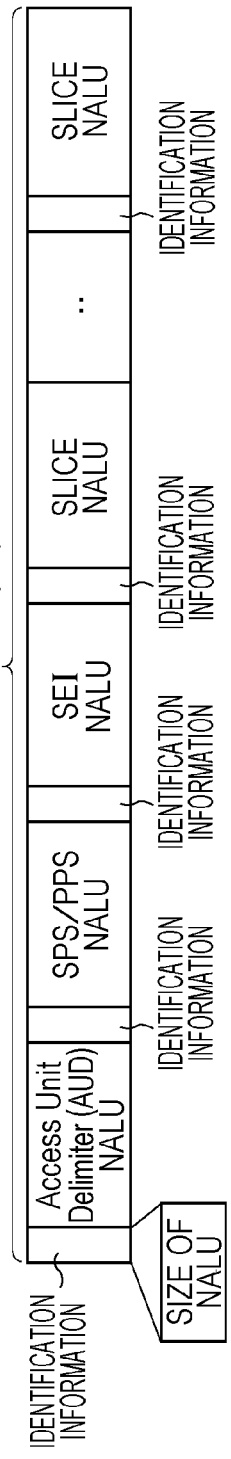
FIG. 15C is a view illustrating an example of the storage format of the NAL unit in MP4 in the second modification of the first exemplary embodiment.

FIG. 15C is a view illustrating an example of a storage format of the NAL unit in the MP4. In the MP4, a field indicating the data size of the NAL unit as the identification information is added to the NAL unit in order to identify the boundary of the NAL unit (hereinafter, the format of the identification information is referred to as an NAL size format). A field length of the field indicating the data size is stored in "AVCDecoderConfigurationRecord" of the sample entry. "AVCDecoderConfigurationRecord" is an area where the initialization information and the like are stored during the decryption. The decryption device and the like can separate the desired NAL unit based on the data size of the NAL unit.

As described above, the MPEG2-TS and the MP4 also differ from each other in that the format of the identification information indicating the boundary of the NAL unit is the start code format or the NAL size format. Accordingly, it is necessary to convert the identification information indicating the boundary of the NAL unit when the transport stream is converted into the MP4 file. Because the storage format of the NAL unit is specified in each coding system, the operation to perform the conversion into the MP4 file may be switched by referring to the audio or video coding system.

The data size of the NAL unit is required in the case that the data having the coding system of the NAL size format is dealt with during the conversion into the MP4 file. Desirably the data size of the NAL unit constituting the access unit is previously acquired. The start code is searched in the access unit of the start code format, and the boundary of the NAL unit is detected, which allows the processing amount to be decreased in deciding the data size of the NAL unit.

The size information indicating the data size of each NAL unit included in the access unit is stored in the head of the access unit in the transport stream of the second modification of the first exemplary embodiment.

FIG. 16A is a view illustrating a configuration example of the access unit in the transport stream of the second modification of the first exemplary embodiment. As illustrated in FIG. 16A, the size information indicating the data size of each NAL unit constituting the access unit multiplexed in the transport stream is stored in the head of the access unit. For example, the size information is stored in a newly-defined size information NAL unit. The type of the NAL unit includes a private NAL unit and a user data NAL unit. One of the private NAL unit and the user data NAL unit is selected, and the selected NAL unit is used as the size information NAL unit. It is not necessary to encrypt the size information. Therefore, the size information NAL unit is stored as the plain text.

FIG. 16B is a view illustrating a syntax example of size information included in the size information NAL unit. The size information includes "number_of_nalu" and "nal_size". "number_of_nalu" indicates the number of NAL units constituting the access unit, and "nal_size" indicates the data size of the NAL unit. Because the size information NAL unit is not stored in the MP4 file, the size information does not need to indicate the data size of the size information NAL unit itself. In the example of FIG. 16A, the size information NAL unit is disposed in front of NAL unit called an access unit delimiter (AUD) signaling the head of the access unit. Alternatively, the size information NAL unit may be disposed just behind the AUD. In the case that the size information NAL unit is disposed just behind the AUD, the size information on the size information NAL unit indicates the size of each NAL unit behind the AUD. Therefore, the size information does not indicate the data size of the AUD. However, because the data size of the AUD is fixed, file producing device 100 may previously store the data size of the AUD. Similarly to the AU_info table, the size information may be disposed at the head of the payload of the PES packet.

FIG. 16C is a view illustrating another syntax example of the size information included in the size information NAL unit.

As illustrated in FIG. 16A, in addition to the start code, sometimes a variable length code such as "zero_byte" is included in front of the NAL unit of the transport stream. Accordingly, as illustrated in FIG. 16C, the data size (prefix_size in FIG. 16C) of the identification information including the start code of the NAL unit may be stored in the size information. When the data size of the identification information is fixed, the data size of the identification information may be stored in an MPEG2-TS descriptor or auxiliary data during the conversion into the MP4 file. In the NAL size format, the field length of the field indicating the data size of the NAL unit after the conversion into the MP4 file may be indicated.

The identification information may be considered to be the data unit, and the content of "Nal_size_info" may be indicated by the AU_info table. At this point, multivalued "conversion_mode" may be used to add a mode to convert the data structure of the data unit in addition to the operation to delete the data unit and the operation to leave the data unit. The identification information identifying the kind of the data unit may be added to the AU_info table. For example, the type of the NAL unit such as the SPS NAL unit, the PPS NAL unit, and the slice NAL unit in the MPEG-4 AVC or HEVC can be distinguished by the identification information. The MPEG-4 AAC LATM header or LATM payload can also be distinguished. A field indicating whether the data unit is encrypted may separately be provided.

The data unit having different "conversion_mode" may be stored in a different TS packet. In the case that "conversion_mode" is set to 2, the data unit stored in the sample entry as the header information may be stored in the TS packet as the plain text.

Only the NAL unit of the slice data is encrypted, and others are expressed as the plain text. This is because, since the encryption is performed in units of TS packets, the plain text and the encrypted portion cannot be mixed in the payload of the TS packet, and additionally, since the AUD has the small data size, the stuffing increases to degrade multiplexing efficiency if the AUD is stored as the independent packet. The stuffing is required in the case the boundary of the encrypted slice NAL unit data is not aligned with a terminal end of the payload of the TS packet. In the case that the stuffing is performed, "adaptation_field" of the TS packet header is used, or a filler data NAL unit or a filler data SEI is inserted in the coded data. In the case that "adaptation_field" of the TS packet header is used, it is necessary to convert "adaptation_field" into the plain text. However, the load increases when the processing of encrypting the variable length area is switched. Accordingly, in performing the stuffing, desirably the boundary of the NAL unit data is aligned with the terminal end of the payload of the TS packet using the stuffing data structure in the coded data.

A user unregistered SEI may be inserted in an adaptation field of the TS packet or the access unit, and the size information may be stored in the SEI. In the conversion into the MP4 file, the start code format can be converted into the NAL size format based on the size information of the NAL unit stored by at least one of the methods. The information indicating whether the size information is stored may be stored using a descriptor in the MPEG2-TS.

Figure 17:
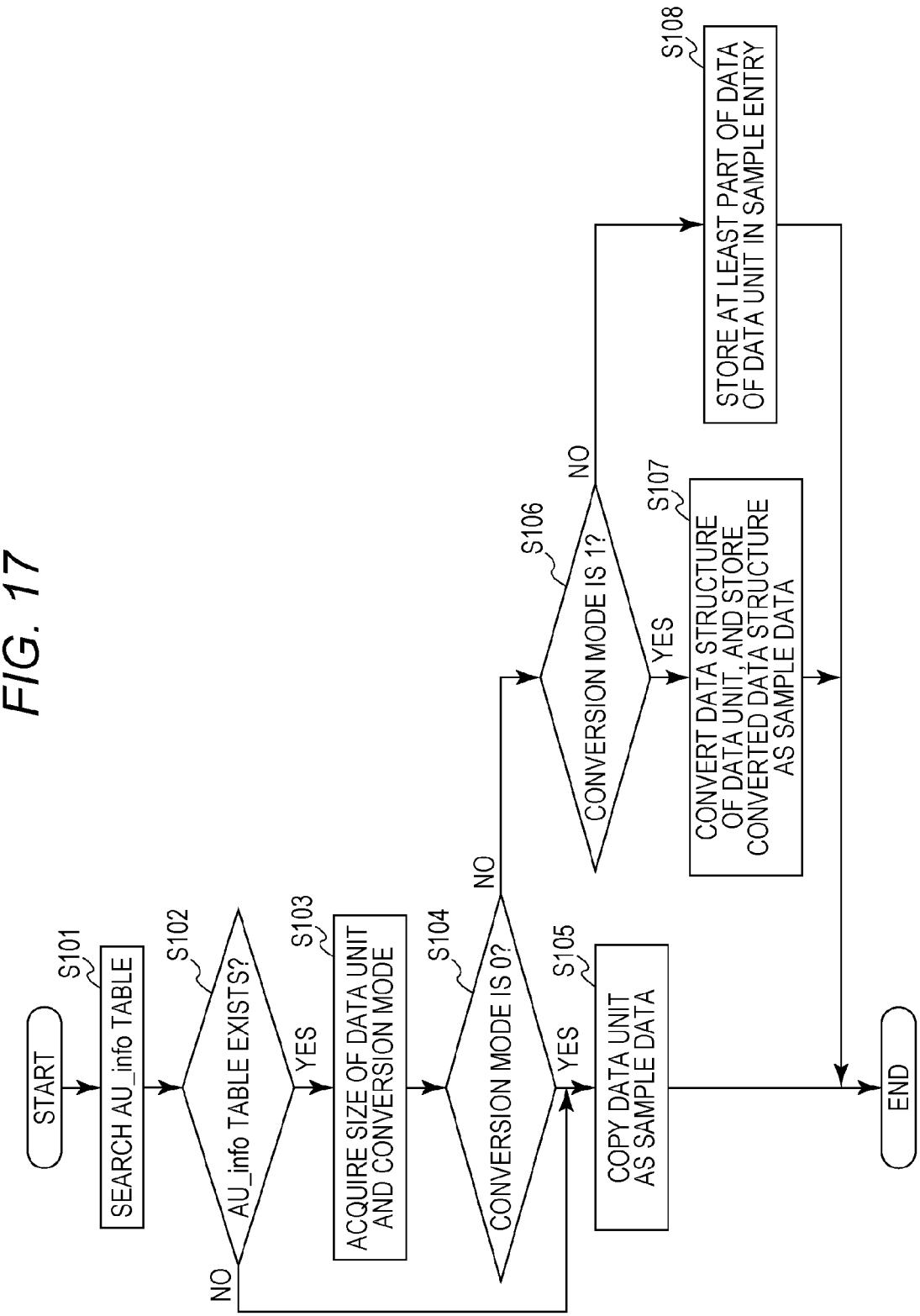
FIG. 17 is a flowchart illustrating an MP4 file producing processing operation performed by the file producing device in the second modification of the first exemplary embodiment.

FIG. 17 is a flowchart illustrating MP4 file producing processing operation performed by file producing device 100 of the second modification of the first exemplary embodiment. Specifically, the flowchart in FIG. 17 illustrates an example of processing operation to change the transport stream to the MP4 file by referring to the AU_info table in FIG. 13C.

Auxiliary information search part 101 of file producing device 100 searches the AU_info table disposed at the head of the payload of the PES packet (Step S101). Auxiliary information analyzer 103 determines whether the AU_info table exists based on the search result (Step S102). When determining that the AU_info table exits ("YES" in Step S102), auxiliary information analyzer 103 acquires the data size of each data unit and the conversion mode of each data unit, which are included in the AU_info table (Step S103). On the other hand, when the AU_info table does not exist ("NO" in Step S102), sample producing part 104a of producing part 104 regards the access unit separated from the PES packet as the data unit to copy and paste the data unit to the mdat as the sample data (Step S105). In the case that one access unit is stored in one PES packet, sample producing part 104a regards the payload of the PES packet as the data for one access unit, and separates the payload of the PES packet. In the case that the plurality of access units are stored in one PES packet, or in the case that the access unit is fragmented and stored in the PES packet, sample producing part 104a searches the boundary between the access units in the coded data, and separates the access units.

Then, auxiliary information analyzer 103 determines whether the conversion mode is set to 0 (Step S104). When the conversion mode is set to 0 ("YES" in Step S104), sample producing part 104a copies and pastes the data unit corresponding to the conversion mode to the mdat as the sample data (Step S105). On the other hand, when the conversion mode is not set to 0 ("NO" in Step S104), auxiliary information analyzer 103 determines whether the conversion mode is set to 1 (Step S106). When the conversion mode is set to 1 ("YES" in Step S106), sample producing part 104a converts the data structure of the data unit corresponding to the conversion mode, and stores the data unit having the converted data structure in the mdat as the sample data (Step S107). For example, sample producing part 104a converts the format of the identification information on the NAL unit boundary from the start code format to the NAL size format. On the other hand, when the conversion mode is set to not 1 but 2 ("NO" in Step S106), sample entry producing part 104b stores at least part of the data of the data unit in the sample entry without storing the data unit corresponding to the conversion mode in the mdat (Step S108). For example, sample entry producing part 104b stores the NAL units of the SPS and PPS of the MPEG-4 AVC in the sample entry. Alternatively, sample entry producing part 104b separates "AudioSpecificConfig( )" from the MPEG-4 AAC LATM header, and stores "AudioSpecificConfig( )" in the sample entry. In the data of the data unit, the portion stored in the sample entry is previously specified by the coding system, and auxiliary data specifying the portion stored in the sample entry may be indicated in the AU_info table.

Third Modification of First Exemplary Embodiment

An address, which is described in the copy manifest file of the first exemplary embodiment to indicate the copy start position of the stream file, does not need to be an absolute value from the head of the stream file. For example, the address indicating the copy start position may be a difference value from the address indicating the copy start position of the preceding entry.

The second entry included in stream file A in FIG. 7 is described as not (address of copy start position, copy size)= (577, 180), but (address of copy start position, copy size)= (367, 180). For example, the following three ways (modes 1 to 3) can be used as the method for describing the copy start position address and the copy size.

In mode 1, the data is alternately copied from the stream file and the difference file. For example, the range of the copied data is described as (address of copy start position, copy size), and a bit length of each field is (int32, int8).

In mode 2, the copy is skipped for the copy size of 0. Because the data can continuously be copied from the identical file, the data length of the address can be shortened compared with mode 1. For example, the range of the copied data is described as (address of copy start position, copy size), and the bit length of each field is (int16, int8).

In mode 3, the copy size is not explicitly indicated in mode 2, but the data to the end of the payload of the TS packet indicated by the address is copied. The field for the copy size is eliminated. A difference value of an index number of the TS packet in the stream file may be used instead of assigning the address. For example, the range of the copied data is described as (packet number, copy mode), and the bit length of each field is (int7, int1). The copy mode indicates whether the copy is skipped.

Figure 18:
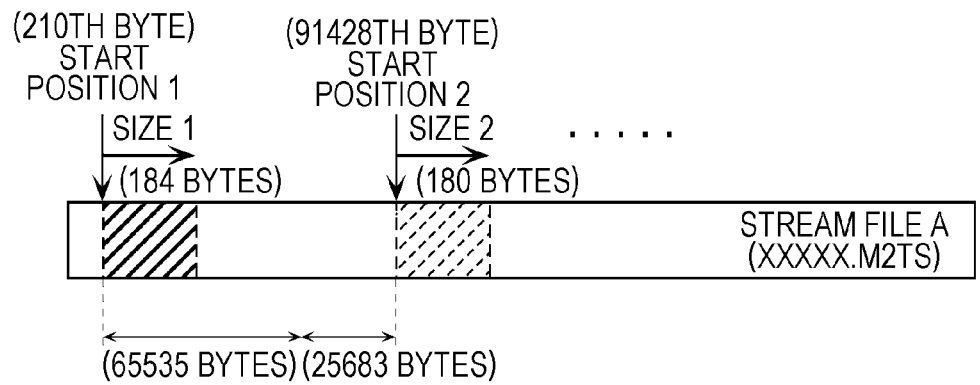
FIG. 18 is a view illustrating a specific example of addressing when mode 2 is used in a third modification of the first exemplary embodiment.

FIG. 18 is a view illustrating a specific example of addressing using mode 2.

As illustrated in FIG. 18, start position 1 and start position 2 that are of the copy start positions are located at 210th byte and 91428th byte. When the field length of the address difference value is set to 16 bits, the address difference value cannot be expressed by one entry because the field length has the maximum value of 65535. For this reason, the two entries of (65535, 0) and (25683, 180) are used in the case that a jump is made from start position 1 to start position 2. Therefore, 180-byte data can be acquired after the jump is made to start position 2.

Figure 19:
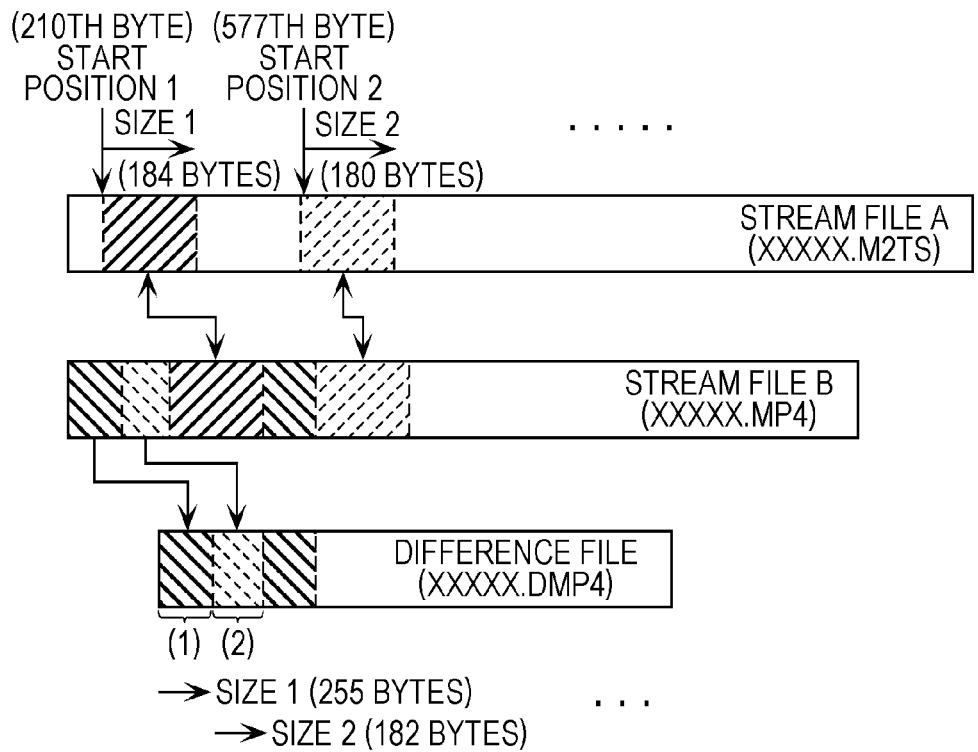
FIG. 19 is a view illustrating an example in which a continuous area exceeding an upper limit of a copy size is read in the third modification of the first exemplary embodiment.

FIG. 19 is a view illustrating an example in which a continuous area exceeding an upper limit of the copy size is read.

In this case, area 1 and area 2 in the difference file can continuously be copied like descriptions of (255), (0, 0), and (182).

The address indicating the copy start position or the copy size may be not a 1-byte unit but a 4-byte unit. In each entry, by separately providing identification information indicating which one of the difference file and the stream file is copied, the entries of the difference file and the stream file are not alternately described, but the entry of one of the difference file and the stream file may continuously be described.

The processing of copying the data from the MPEG2-TS file to produce the MP4 file is described above. Alternatively, the data may be copied based on the elementary stream that is separated from the payload of the PES packet multiplexed in the TS packet.

Figure 20:
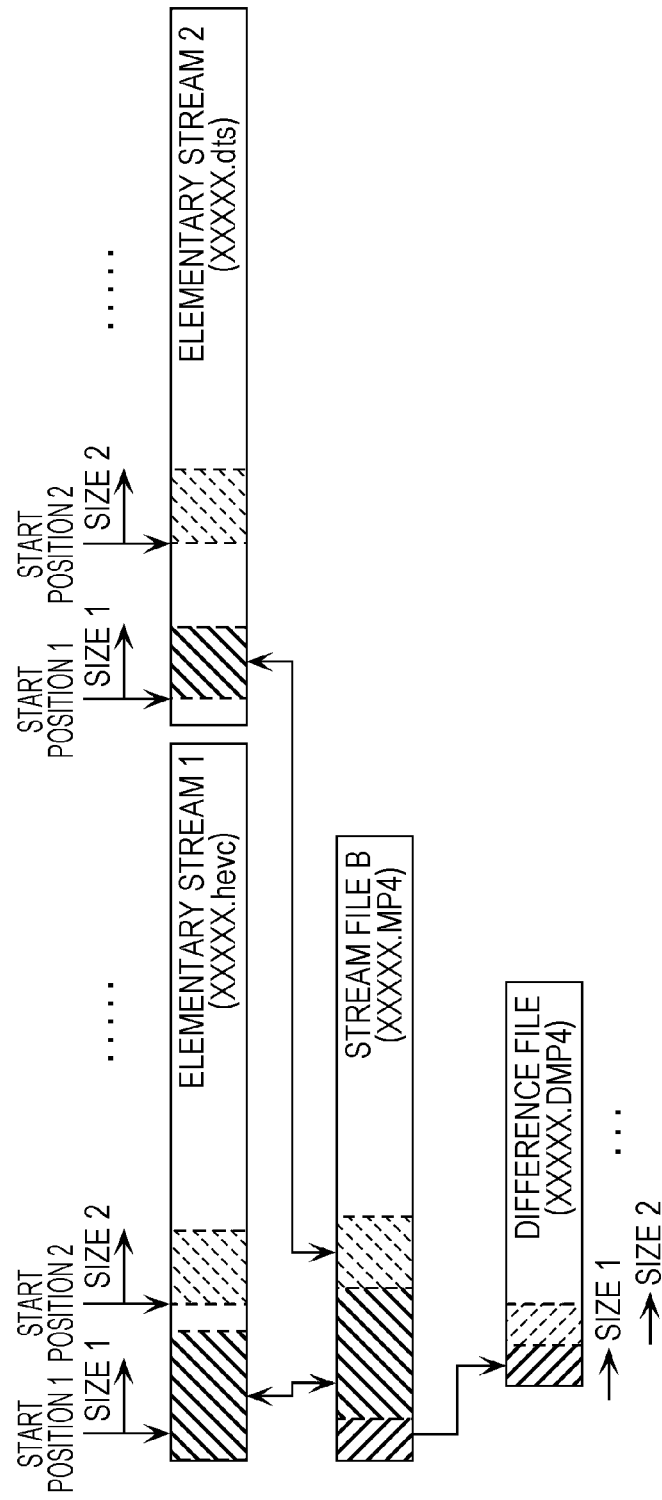
FIG. 20 is a view illustrating processing of copying data from the elementary stream to produce the MP4 file in the third modification of the first exemplary embodiment.

FIG. 20 is a view illustrating processing of copying the data from the elementary stream to produce the MP4 file.

In the MPEG2-TS file, copy information is required in each packet having 188 bytes or 192 bytes of time-stamped TS used in the Blu-ray disc (BD). Accordingly, in the high-bit-rate content, the number of TS packets increases to enlarge the size of the copy manifest file. Using the elementary stream separated from the MPEG2-TS file, the data can be copied in units of frames, or in units of NAL units in the HEVC or AVC. As a result, the number of entries included in "COPY MANIFEST" of the copy manifest file can be largely decreased. For example, in the case that the MPEG2-TS file in which the video is multiplexed has a size of 10 GB while the TS packet has a size of 192 bytes, the number of packets becomes 55924053, and the entries as many as the packets are required. On the other hand, the total number of frames becomes 216000 when the video has a playback time length of 2 hours and a frame rate of 30 Hz. Accordingly, in the case that the entry is produced in each frame, the number of entries can largely be decreased compared with the case that the entry is produced in each packet. Sometimes the MPEG2-TS file is doubly encrypted by AACS (Advanced Access Content System) and BD+, and the data is interleaved and re-disposed by BD+. In such cases, as long as the decryption is performed to separate the coded stream, the order of the data constituting the coded stream can uniquely be decided, so that the copy operation can be performed by the technique.

In the case that the data is copied from the elementary stream, because the plurality of elementary streams exist, pieces of the identification information of the plurality of elementary streams are required. In "COPY MANIFEST", the following description can be made according to mode 1 or mode 2. The address of the copy start position is indicated by the difference value from the preceding entry.

In mode 1, the entry is constructed with (file ID, address of copy start position, copy size). For example, the bit length of each field is (int4, int22 in 1-byte unit, int22). The file ID is identification information on the file including the copied data. For example, the file ID of 0 is allocated to the difference file, and a value of at least 1 is allocated to the file of the elementary stream. In the HEVC or AVC coded data having 4K resolution, one frame has a maximum size of about 4 MB when a minimum compression ratio is set to 4. In the case that the data is copied from the coded stream, the maximum value of the difference value of the address at the copy start position may be set to a maximum size of one frame, and 4 MB can be expressed by 22 bits. At this point, the copy size is set to 22 bits in order to express the maximum size of one frame.

In mode 2, the entry is constructed with (file ID, address of copy start position, copy size). For example, the bit length of each field is (int4, int12 in 1-byte unit, int16). In the AVC or HEVC, it is necessary to convert the header of the NAL unit from the start code format to the NAL size format, and it is necessary to copy the data in units of payloads of the NAL unit. Therefore, the field for the address of the copy start position is provided. In the case that the elementary stream in the TS can directly be copied, the field for the address of the copy start position may be eliminated. Alternatively, one entry may indicate the whole NAL unit, and the header of the NAL unit may be converted into the NAL size format after the copy. In this case, the address of the copy start position is unnecessary because the data can continuously be read.

Second Exemplary Embodiment

In the BD-ROM standard, the plurality of MPEG2-TS files can continuously be played back by referring to the play list, and a stream restriction condition such as the file boundary is also specified. For example, in the case that the plurality of files or playback sections are seamlessly connected, two audio playback sections of connection targets may overlap each other.

In the MP4, the plurality of MP4 files continuously played back using the play list can be assigned, and it is considered that the similar restriction condition can be added.

Figure 21:
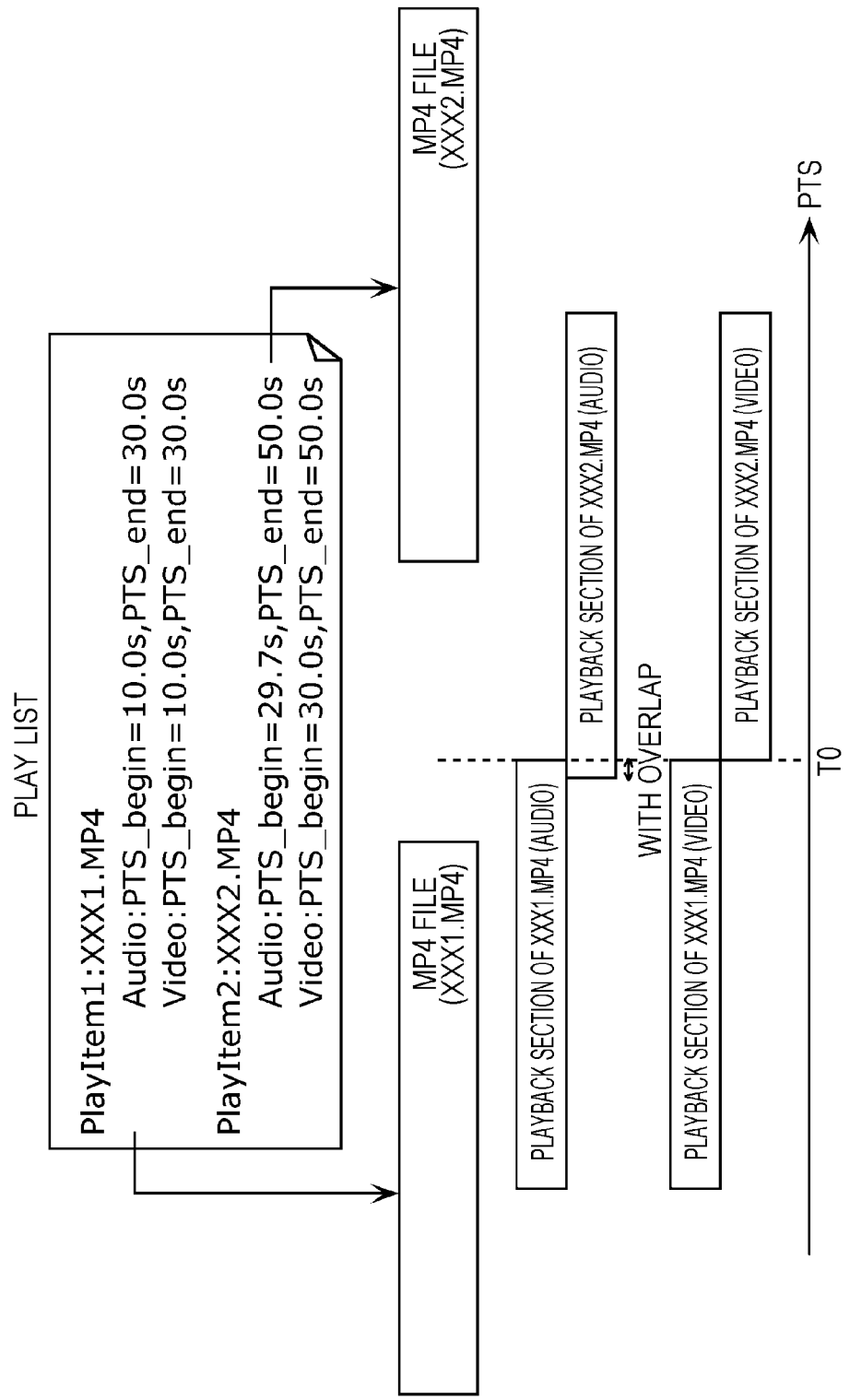
FIG. 21 is a view illustrating an example of audio and video playback sections of two MP4 files continuously played back in a second exemplary embodiment.

FIG. 21 is a view illustrating an example of the audio and video playback sections in the continuously-played-back two MP4 files. As illustrated in FIG. 21, the audio playback sections overlap each other. However, DTS (Decode Time-Stamp) or PTS in the MP4 cannot be expressed by an absolute clock time, but expressed by a relative clock time based on the DTS of the leading sample (=0) in the file. When two MP4 files ("XXX1.MP4" and "XXX2.MP4") in which the playback sections overlap each other are continuously played back, the leading sample of "XXX2.MP4" is played back immediately after the final sample of XXX1.MP4". As a result, the overlapped portions are continuously played back.

Therefore, in the second exemplary embodiment, information indicating whether the playback sections of "XXX1.MP4" and "XXX2.MP4" overlap each other or information indicating the overlapped playback section is stored in the play list or the MP4 file. In the example of FIG. 21, the PTS of the leading sample and the playback end clock time of the final sample in each of the audio and the video in the MP4 file referred to by a play item in the play list are described. The absolute clock time of the DTS or PTS of the leading sample in the MP4 file may be stored in the moov of the MP4 file. Alternatively, the absolute clock time of the DTS or PTS in the leading sample of the movie fragment or the leading sample of each track of the movie fragment may be stored in the moof or the traf.

For example, in "XXX1.MP4" and "XXX2.MP4", it is assured that the PTS is continued without the overlap and the gap in the playback section of the video. In this case, the information on the overlap may be indicated only for the audio or the text. Assuming that T0 is the PTS of the video leading sample of "XXX2.MP4", an offset value between T0 and the PTS of the audio leading sample of "XXX2.MP4" or an offset value between T0 and the playback end clock time of the audio final sample of "XXX1.MP4" may be stored. An offset value between the playback end clock time of the final audio sample of "XXX1.MP4" and the PTS of the leading sample of "XXX2.MP4" may be stored in "XXX2.MP4". A playback device selects or combines the output audio sample based on these pieces of information on the overlap. The video playback sections may overlap each other, or instead of the overlap of the audio or video playback sections, a gap may be provided.

In the example of FIG. 21, the plurality of files are continuously played back using the play list. In the second exemplary embodiment, the continuously-played-back playback sections may be integrated to produce one MP4 file.

FIG. 22A is a view illustrating a method for integrating the playback sections to produce one MP4 file.

In the second exemplary embodiment, for example, playback section 1 and playback section 2 are integrated to produce XXX3.MP4 as illustrated in FIG. 22A. For example, the audio of playback section 1 is constructed with 100 samples of sample 1-1 to sample 1-100. For example, the audio of playback section 2 is constructed with 100 samples of sample 2-1 to sample 2-100. The description is made below with the audio as an example.

Unless the overlap and a gap exist in playback section 1 and playback section 2, sample 2-1 to sample 2-100 are stored subsequently to sample 1-1 to sample 1-100 in the audio track of "XXX3.MP4", and the samples are sequentially played back. The case that the playback sections of sample 1-100 and sample 2-1 overlap each other will be described below. In the case that the playback sections (start clock time: PTS, end clock time: PTS+playback time length) of sample 1-100 and sample 2-1 are identical to each other, sample 2-1 is deleted to construct the audio track of "XXX3.MP4". Therefore, the overlap between the samples is eliminated. The same holds true for the case that the playback sections of the plurality of samples included in playback section 1 overlap the playback sections of the plurality of samples included in playback section 2.

On the other hand, in the case that the playback sections of sample 1-100 and sample 2-1 overlap each other while differing from each other, the overlap cannot be dealt with by deleting the sample.

Therefore, after both sample 1-100 and sample 2-1 are stored in the audio track of "XXX3.MP4", information indicating the overlapped playback section is stored. It is assumed that ΔT is a time length of the overlapped playback section. In this case, for example, the final sample of playback section 1 and the leading sample of playback section 2 are set as different movie fragments, and ΔT is stored in the traf of the moof. AT indicates that the playback section of ΔT from the head of the audio track in the movie fragment included in playback section 2 overlaps the playback section of the audio track of the preceding movie fragment.

In the case that the gap exists, a non-playback section corresponding to the gap section is produced by a function of an edit list in the MP4 or a setting of a duration-is-empty flag in the movie fragment.

The overlap section (overlapped playback section) or the gap section (the section in which the gap exists) may be indicated in meta-data of the MP4 header or an external file. The MP4 including the gap section is higher than the MP4 including the overlap section in affinity with the conventional MP4. Accordingly, when the MP4 file is produced by integrating the playback sections including the overlap sections, for example, the sample including at least a part of the overlap section is deleted in playback section 2 of FIG. 22A. At this point, in the case that the gap is generated, the non-playback section is produced. This method can be applied to not only the audio but also the video or the caption. Information indicating whether the deletion is required, information indicating the sample necessary to be deleted, and information indicating the time length of the gap caused by the deletion may be stored as auxiliary information of the copy manifest.

The playback device playing back the MP4 file plays back the audio data of the overlap section based on the information such as the overlap section included in the MP4 file. That is, when the audio data of the playback target is the data of the overlap section, for example, the playback device combines decryption results of the audio samples including the pieces of data of the playback sections overlapping each other. The playback device outputs the combined decryption result. In integrating the playback sections continuously played back, it is necessary to check whether the overlap section or the gap section exists in the integration target playback section. Therefore, the existence or non-existence of the overlap section and the information indicating the time length of the overlap section may be acquired from the optical disk or the Internet as the auxiliary information.

Figure 22B:
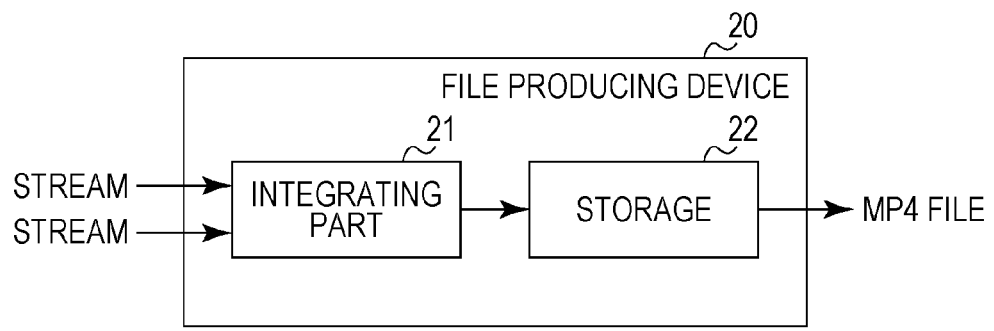
FIG. 22B is a block diagram illustrating a file producing device in the second exemplary embodiment.

FIG. 22B is a block diagram of a file producing device of the second exemplary embodiment.

File producing device 20 of the second exemplary embodiment is one producing the MP4 file, and includes integrating part 21 and storage 22. Integrating part 21 produces one MP4 file by integrating the two streams such that the two streams are continuously played back. Storage 22 stores the information indicating the section, in which playback times overlap each other in the two streams, in the produced MP4 file. For example, the two streams are playback section 1 and playback section 2 in FIG. 22A, and the produced MP4 file is the file of "XXX3.MP4" in FIG. 22A. For example, the section in which the playback times overlap each other in the two streams is a ΔT section in FIG. 22A.

Figure 22C:
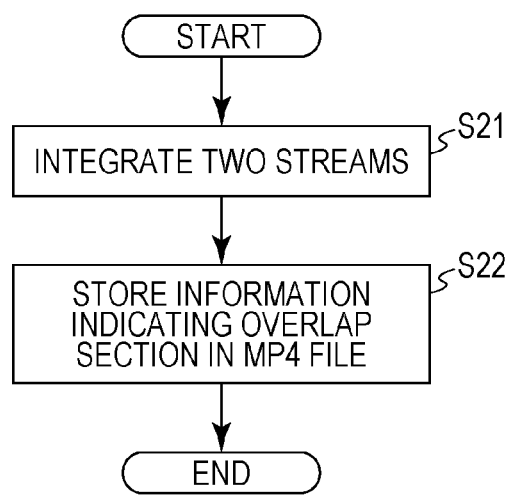
FIG. 22C is a flowchart illustrating a file producing method in the second exemplary embodiment.

FIG. 22C is a flowchart of a file producing method of the second exemplary embodiment.

The file producing method of the second exemplary embodiment is a method for producing the MP4 file, and includes Steps S21 and S22. In Step S21, one MP4 file is produced by the integration of the two streams such that the two streams are continuously played back. In Step S21, the information indicating the section in which playback times overlap each other in the two streams is stored in the produced MP4 file. At this point, the two streams each of which is at least a part of the original file constructed in the MP4 file format are integrated in Step S21. The two streams each of which includes audio data are integrated in Step S21.

Therefore, in the second exemplary embodiment, the information indicating the overlap section is stored in the MP4 file. A playback device playing back the MP4 file can easily specify the data of the overlap section from the MP4 file using the information. As a result, the playback device can properly play back the pieces of data of the overlap section by combining the pieces of data. That is, the MP4 file suitable for the overlap playback can be produced.

In Step S21, in the case that the section exists across the plurality of samples included in one of the two streams, the two streams are integrated after at least one of the plurality of samples is deleted. Therefore, the sample is deleted, so that the overlap section can be shortened. As a result, a load of special processing of the playback device can be reduced with respect to the overlap section.

In Step S22, the time information indicating the time length of the section is stored in the MP4 file as the information. The time information indicating ΔT is stored in the MP4 file. Therefore, the playback device playing back the MP4 file can easily specify the time length of the overlap section using the information. As a result, the playback device can properly play back the data within the specified time length by combining the pieces of data of the overlap section.

In Step S22, the time information is stored in the traf of the moof of the MP4 file. Therefore, the playback device can properly acquire the stored time information.

In the file producing method of the second exemplary embodiment, the information may be acquired from the device holding the information through a communication network such as the Internet. Alternatively, the information may be acquired from the optical disk in which the information is recorded. Therefore, the information can easily be stored in the MP4 file without producing information indicating the overlap section.

Figure 22D:
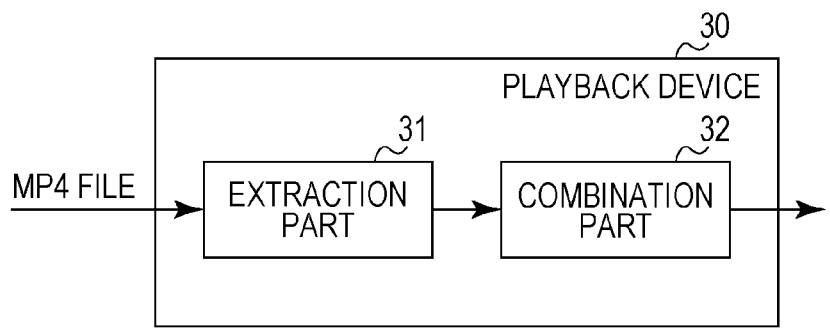
FIG. 22D is a block diagram illustrating a playback device in the second exemplary embodiment.

FIG. 22D is a block diagram of a playback device of the second exemplary embodiment.

Playback device 30 of the second exemplary embodiment is one playing back the MP4 file, and includes extraction part 31 and combination part 32. Extraction part 31 extracts the information indicating the two sections in which the playback times overlap each other in the content (for example, the audio track) of the playback target from the MP4 file. Combination part 32 specifies the two sections in the content based on the extracted information, and combines and outputs decryption results of the pieces of data of the two sections.

Figure 22E:
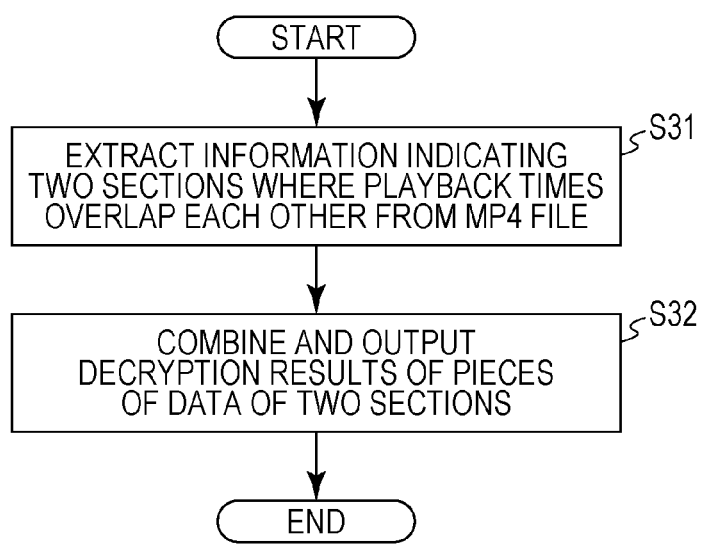
FIG. 22E is a flowchart illustrating a playback method in the second exemplary embodiment.

FIG. 22E is a flowchart of a playback method of the second exemplary embodiment.

The playback method of the second exemplary embodiment is a method for playing back the MP4 file, and includes Steps S31 and S32. In Step S31, the information indicating the two sections in which the playback times overlap each other in the content (for example, the audio track) of the playback target is extracted from the MP4 file. In Step S32, the two sections in the content are specified based on the extracted information, and the decryption results of the pieces of data of the two sections are combined and output.

Therefore, the playback device can easily specify the data of the overlap section from the MP4 file. As a result, the playback device can properly play back the data of the overlap section.

A recording medium of the second exemplary embodiment is one in which the MP4 file is recorded. The MP4 file includes the content (for example, audio track) that is read and played back by the computer and the information indicating the two sections in which the playback times overlap each other in the content. Therefore, the playback device that reads the MP4 file from the recording medium to play back the MP4 file can easily specify the pieces of data of the two sections from the MP4 file using the information. As a result, the playback device can properly play back the pieces of data of the sections by combining the pieces of data.

Third Exemplary Embodiment

Figure 23A:
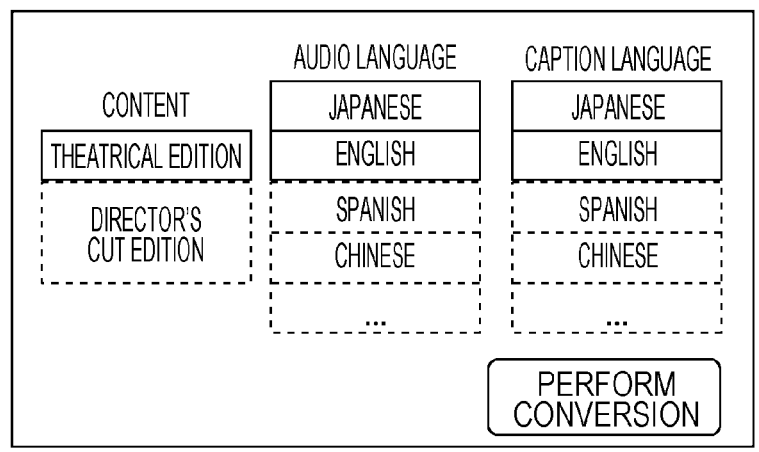
FIG. 23A is a view illustrating an example of a menu screen when the MP4 file is produced from content stored in an optical disk in a third exemplary embodiment.
Figure 23B:
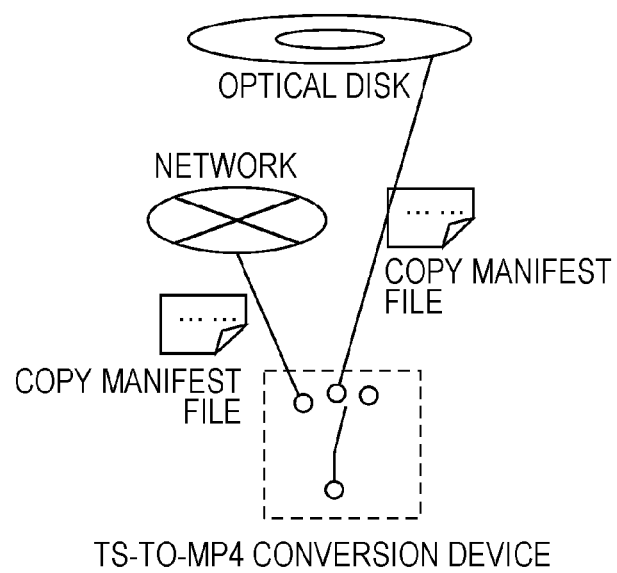
FIG. 23B is a view illustrating an MP4 file producing method using the optical disk and a network in the third exemplary embodiment.

FIG. 23A is a view illustrating an example of a menu screen when the MP4 file is produced from the content stored in the optical disk. FIG. 23B is a view illustrating an MP4 file producing method using the optical disk and a network.

The audio or caption of a plurality of languages is stored in the optical disk, and the language stored in the MP4 file can be selected in producing the MP4 file. In a third exemplary embodiment, Japanese and English are selected from Japanese, English, Spanish, and Chinese with respect to the audio and the caption. When the sample size of the audio or caption varies in each language, the content of the copy manifest file depends on the sample size. Therefore, the kinds of the copy manifest files increase in proportion to the number of combinations of the selected languages in the audio or caption. Accordingly, the pieces of audio and caption data of all the languages are always stored in the MP4 file, and the information indicating the language selected by the user is further stored, and the desired language of the user may be selected during the playback. Therefore, the copy manifest file is equalized irrespective of the selected language. Alternatively, the copy manifest files corresponding to the case that only one of the languages is stored and the case that all the languages are stored may be prepared. The audio coding system such as AAC and AC3 may be selectable according to the existence or non-existence of support in the device playing back the MP4 file. Alternatively, the pieces of audio data of all the coding systems may be stored in the MP4 file. In the case that the pieces of audio data of all the coding systems are stored, the coding system is selected based on the selection operation of the user or preset information on the playback device during the playback.

Alternatively, the audio and caption of all the languages may be stored to allow the user to select the language not during the production of the MP4 file but during the playback. As illustrated in FIG. 23B, when the copy manifest file can be acquired through the network, it is not necessary to store the copy manifest file in the optical disk. Particularly, it is effective to acquire the copy manifest file through the network in the case that the number of copy manifest files increases to be able to select any language. Only the copy manifest file corresponding to a default language combination may be stored in the optical disk, and the copy manifest files corresponding to other combinations may be downloaded from a server. The audio or caption of the language that can be acquired from the optical disk or through the network and the language of the audio or caption included in the MP4 file may be acquired, and the user may select and acquire the language that can be acquired from the outside in the languages not included in the MP4 file.

Alternatively, the audio list that can be acquired from the outside is stored in the MP4 file. In the case that the playback device cannot decrypt the coding system of the audio in the MP4 file during the playback of the MP4 file, the audio of the coding system supported by the playback device may be selected and acquired from the outside. At this point, the data acquired from the outside may be the coded data including only the caption or audio or the MP4 file. At this point, the video originally included in the MP4 file and the newly-acquired data are synchronously played back. The complete MP4 file including all the video, audio, and caption may be acquired from the outside.

The content stored in the optical disk may be not the MPEG2-TS file but the MP4 file. In this case, the data of the MP4 file stored in the optical disk may directly be copied or exported to the device-bound or media-bound recording medium or device without performing the conversion processing. The key used to encrypt the content may be changed during the copy or export. In a device such as a BD player, which produces the MP4 file, whether the content is stored in the optical disk in the MPEG2-TS format or the MP4 format may be determined based on the identification information on the data format, to thereby determine the necessity of the conversion into the MP4 file to produce the MP4 file. Alternatively, the information indicating the necessity of the conversion into the MP4 file may be indicated in the auxiliary information on the copy manifest file. Even if the content is stored in the optical disk in the MP4 format, the user may select the audio or caption of the specific language in the content or the type such as a theatrical edition or the director's cut edition. Based on a selection result, only the data selected from the MP4 file in the optical disk may be extracted to produce the MP4 file.

As described above with reference to FIG. 7, the file size can be reduced by indicating the information specifying the multiplexing unit of the output MP4 file in the copy manifest file, and it is effective in reducing the file size for the large number of copy manifest files. At this point, as the information indicating the copy manifest, the unit of the movie fragment can uniquely be decided in the MP4 file, and the information independent of the language can be used. For example, the information is the PTS or DTS of the sample constituting the head of the movie fragment or the identification information on the MPEG2-TS file in which the sample data is acquired. When the sample size of the MP4 file varies, the content of the box included in stbl of the moov or trun of the moof in the header information on the MP4 file also varies. For this reason, the header information on the MP4 file cannot be included in the copy manifest file that can commonly be used in different languages. Accordingly, during the conversion into the MP4 file, the unit of the movie fragment is decided based on the copy manifest file, and the header information on the MP4 file is produced based on the PTS or DTS in each sample or the sample size.

In acquiring the PTS or DTS in each sample or the sample size, it is necessary to search the boundary between the access units from the audio, video, or caption data that is multiplexed in the MPEG2-TS or not multiplexed but stored in another area. It is also necessary to perform the processing of analyzing the PES packet header. The necessary processing load is highly in the high-bit-rate video. Accordingly, for at least the video, the size of the NAL unit constituting the access unit (corresponding to the sample of the MP4 file) and the information on the PTS or DTS may be stored in the copy manifest.

Figure 24:
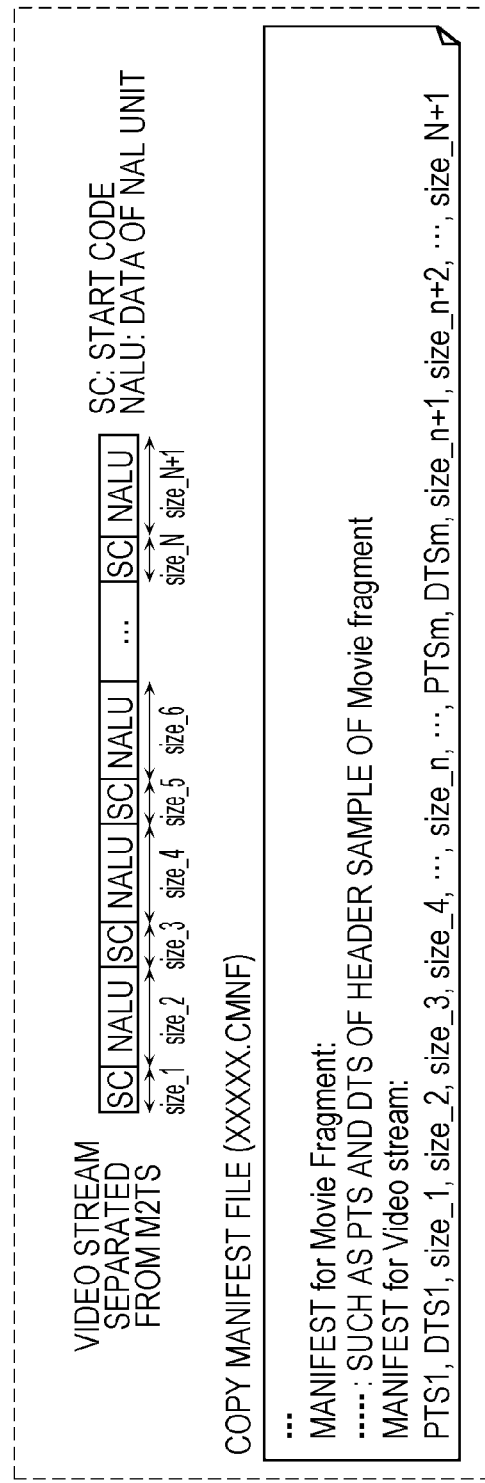
FIG. 24 is a view illustrating an example of a copy manifest indicating a size of the NAL unit and PTS and DTS in the third exemplary embodiment.

FIG. 24 is a view illustrating an example of the copy manifest indicating the size of the NAL unit and PTS and DTS.

The information indicating the size of each NAL unit constituting the access unit and the PTS and DTS is stored in the copy manifest in each access unit. These pieces of information can largely reduce the processing of searching the video stream. There is another advantage that the start code format of the MPEG2-TS can be converted into the NAL size format of the MP4 using the size information. In the size information, the size of the start code portion and the size of the NAL unit portion may separately be indicated. The byte length for the field indicating the size of the NAL unit may be identical to the byte length of the size portion in the NAL size format. Therefore, the start code format can be converted into the NAL size format by replacing the data of the start code portion with the data indicating the size of the NAL unit portion. The start code corresponds to the identification information in FIG. 15B, and includes "zero_byte".

Only a default value may be set in the case that the sizes of all the start code portions are identical. The PTS or the DTS may be expressed by not the value of the PTS or DTS of the MPEG2-TS PES header, but the data format used in the MP4 header. For example, a DTS difference value of the two samples that are consecutive in the decryption order can be indicated for the DTS, and a difference value between the DTS and the PTS can be indicated for the PTS. Time scales of these pieces of information may be converted into time scales in the MP4. The information indicating an absolute value of the PTS or DTS of the leading sample may be stored. The information identifying the NAL unit that is deleted during the conversion into the MP4 file may be added. In the case that the similar auxiliary information is stored with respect to the AAC coded stream, the pieces of header information such as the ADTS and the LATM are deleted from the sample data. However, only one of the total value of the sizes of the header information and payload data and the size of the payload data may be indicated when the sizes of the pieces of header information are fixed. Because the fixed frame rate is used in the audio, only a default value of the DTS information may be indicated.

When the audio coding system is changed, sometimes the playback time length is also changed in each sample. As a result, the PTS or DTS is changed in each sample, so that the copy manifest file may be prepared in each audio coding system.

In the case that the caption data is stored in the MP4 file, the caption data may collectively be stored at the end of the file.

Figure 25:
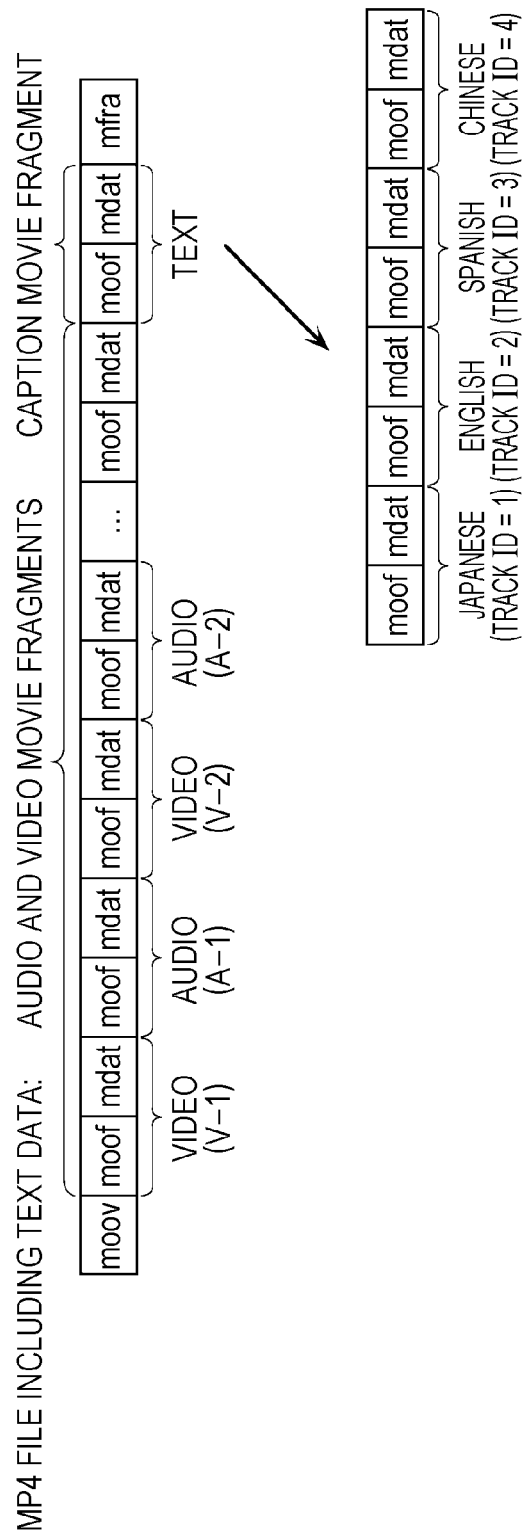
FIG. 25 is a view illustrating an example of caption data stored at an end of the MP4 file in the third exemplary embodiment.

FIG. 25 is a view illustrating an example of the caption data stored at the end of the MP4 file.

In this case, the movie fragment of AV (Advanced Video) data is identical even if the language of the caption data is changed. On the other hand, when the video or audio movie fragment and the caption movie fragment are interleaved and stored, it is necessary to change the content of the moof. This is because the position of the movie fragment of the AV data changes when the caption data size changes. The caption data size is smaller than the AV data size. Accordingly, the caption data of the whole content or the caption data included in the unit of the chapter into which the content is divided can be played back while collectively expanded in the memory. At this point, when the caption data is collectively stored at the end of the file, there is an advantage that the caption data is easy to acquire.

The caption data may be the caption data based on a text font or the image data in a PNG (Portable Network Graphics) format. For the image data, because the data size is larger than that in the text form, the trun may be produced in each unit of the chapter to enhance accessibility to the caption data included in a predetermined unit. Alternatively, according to the buffer size holding the text data during the playback, the trun may be produced such that the size of the caption data constituting the trun is less than or equal to the buffer size.

In storing the pieces of caption data of the plurality of languages, the caption data of a specific language can easily be acquired by storing respective languages in individual movie fragments. At this point, the information specifying the language stored in the movie fragment is required. For example, different languages may be dealt with as different tracks, and track IDs and the languages may be correlated with each other. The track ID is indicated by the box in the traf. The information correlating the track ID with the language may be stored in a meta-data storing box in the MP4, or described as the management information different from the MP4 file. The correlation between the language and the movie fragment can be applied to the audio.

The randomly accessible sample in the video, audio, or caption is indicated by mfra. In the case that the playback sections of the continuous video and audio movie fragments are matched with each other, only a video random access point may be indicated. In this case, an audio sample having an identical, immediately preceding or immediately subsequent PTS can be acquired from the subsequent movie fragment. For example, in FIG. 25, the PTS of the leading sample of video (V-1) and the PTS of the leading sample of audio (A-1) are matched with each other. On the other hand, in the case that the text is stored at the end of the file, it is necessary to indicate a random access point independently for the text.

The pieces of audio or caption data of all the languages in the content of the optical disk are stored in the MP4 file. In the case that the user selects the desired language during the production of the MP4 file, the random access point may be indicated in mfra with respect to only the track corresponding to the selected language.

In the content stored in the optical disk, it is considered that the video differs from the graphic in the resolution. For example, the video has the 4K resolution, and the graphic such as the caption has the 2K resolution in order to suppress the processing amount.

Figure 26:
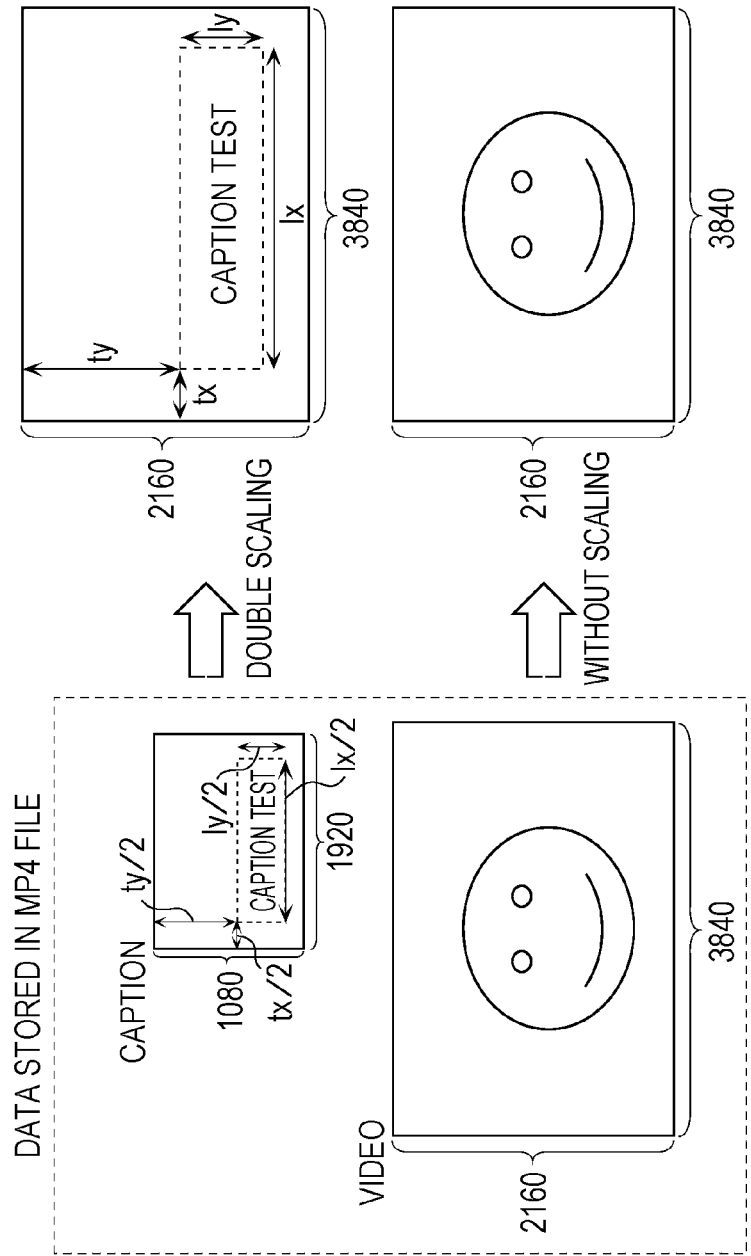
FIG. 26 is a view illustrating a case that a caption having 2K resolution is displayed while scaled to 4K resolution in the third exemplary embodiment.

FIG. 26 is a view illustrating the case that the caption having the 2K resolution is displayed while scaled to the 4K resolution. In displaying the caption, information assigning a display area of the caption is required together with the caption data and the resolution of the caption data. For example, a rectangular display area is assigned using the size and display position of the display area. For example, in the information indicating the resolution of the track, the caption track has the 2K resolution, and the video track has the 4K resolution. In an SMPTE (Society of Motion Picture and Television Engineers) or W3C (World Wide Web Consortium) timed text, the information on the display area may be described as a part of XML (extensible markup language) data constituting the timed text, or stored in the box indicating the meta-data of the MP4 file.

In playing back the MP4 file, the video and caption resolutions are acquired, and the caption is scaled and displayed so as to be matched with the video resolution in the case that the video and caption resolutions differ from each other. At this point, the image data is scaled up when the caption is the image data, and the size matched with the video resolution is selected when the caption is the text data. The display area is calculated and decided according to a coefficient of the scaling. The information indicating the display area after the scaling according to the video resolution may be stored.

Fourth Exemplary Embodiment

In producing the MP4 file, the audio, video, or caption data is acquired from the content stored in the optical disk, and multiplexed into one MP4 file, or a plurality of MP4 files can be produced in a DMP format. For example, the video MP4 is produced by separating the video elementary stream from M2TS data stored in the optical disk. The MP4 file including the audio and caption, which are stored separately from the M2TS, is acquired for the audio and the caption. The produced video MP4 file and the acquired MP4 file including the audio and caption are collected up and formed into the DMP format. At this point, the audio and caption MP4 file may be a file in which the audio and the caption are independent of each other or a file in which the audio and the caption are multiplexed. For the plurality of languages, the audio and the caption can be multiplexed in the identical MP4 file in each of the plurality of languages. During the export, an export target is decided by referring to the play list for export. The play list for export may previously be stored in the disk, or downloaded through the network.

FIG. 27 is a view illustrating a method for storing the data for export. FIG. 28A is a view illustrating an example the play list for export. FIG. 28B is a view illustrating an example of the copy manifest file. In the example, two M2TS files ("XXX1.M2TS" and "XXX2.M2TS") in each of which the AV is multiplexed and the MP4 file ("YYY1.MP4") in which audio for export is multiplexed are stored in the optical disk. Although not illustrated, the caption can be dealt with similarly to the audio.

Play list example 1 is constructed with two play items. The play items indicate that the video is acquired from "XXX1.M2TS" and "XXX2.M2TS", and the audio is acquired from "YYY1.MP4" and "YYY2.MP4", respectively. For the "YYY1.MP4" and "YYY2.MP4" files, the leading position of the file can be indicated by "start_adr", namely, a logical address in the optical disk. The logical address may be not explicitly indicated, but identified only by the file name. Alternatively, whether the data is multiplexed in the M2TS or stored as a file different from the M2TS may be indicated by "out_mux". The audio data is indicated by the MP4 track and "TrackID". In the case that the MP4 file is constructed with the single track like the DMP (hereinafter, referred to as single track MP4), a TrackID field may be eliminated. In the single-track MP4, the type of the medium, such as the audio, the video, and the caption, which is stored in the file may be identified based on the file name, or the language or the coding system may be indicated. As to the coding system, not the coding system itself but sound quality may be indicated for audio. For example, the lossless-compressed audio is indicated as high sound quality, and the audio compressed by the MPEG-2 or MPEG-4 AAC is indicated as medium sound quality.

In play list example 2, a case that the audio is stored as the MP4 file, and the videos indicated by play item 1 and play item 2 are provided as the continuous playback section in "YYY.MP4" is indicated. Play list example 3 is an example similar to play list example 2 but "YYY.MP4" is the single-track MP4, so that the TrackID field is eliminated.

The play list for export indicated in play list examples 1 to 3 may be distinguished from the play list used to play back the content of the optical disk by the file name. The play list for export and the play list used to play back the content of the optical disk may be stored in different directories of the file system.

In the exported MP4, PinP (Picture in Picture), multi-angle, 3D, sub-path, and browsable slide show may be prohibited, and whether a functional restriction is imposed may be indicated by the file name or meta-data managing a play list for export. In the case that a disabled function is included in the play list for export, the play list may be determined to be invalid and processed as an error so that the MP4 for export is not produced, for example.

The play list for export may be downloaded through the network, or the M2TS or MP4 data referred to in the play list for export may be downloaded through the network. In the case that M2TS or MP4 data is downloaded through the network, an IP address or a URL of a download destination may separately be indicated in the play list. Alternatively, in the case that pieces of the content used in the export are collectively stored in the identical directory of a server, the URL of the directory may be indicated by the meta-data related to the play list for export, and only the file name may be described in the play list. In acquiring the content, the file is downloaded after the URL indicated by the meta-data and the file name are coupled to each other to form a complete URL.

The copy manifest file includes information in which clock time information indicating a decryption or display clock time of the elementary stream corresponding to each of the two M2TS files ("XXX1.M2TS" and "XXX2.M2TS") is correlated with the positional information on the elementary stream. The correlated information is similar to the copy manifest file in FIG. 24.

FIG. 29A is a view illustrating an example of the file producing method when a plurality of versions of main story content are stored. FIG. 29B is a view illustrating the copy manifest file when the MP4 file is produced in a playback path of a director's cut edition.

Sometimes a plurality of versions, such as a director's cut edition and a theatrical edition, of main story content are stored in the optical disk such as the Blu-ray disc. For example, referring to FIG. 29A, playback sections (1), (2), and (4) are sequentially played back in the director's cut edition, while playback sections (1), (3), and (4) are sequentially played back in the theatrical edition. It is assumed that the audio for export is stored as a single track MP4.

As illustrated in FIG. 29B, a range of each portion of the file indicated by "Input File A", a range of each portion of the file indicated by "Input File B", a range of each portion of the file indicated by "Input File C" are indicated in the copy manifest file when a playback path of the director's cut edition is selected, and the range of each portion of the file is repeatedly converted into the MP4 files indicated by "Output File", "Output File Size", and "ATTRIBUTE".

During the export, the MP4 file is produced by coupling the elementary streams separated from the three M2TSs in the video, and the audio elementary streams are previously stored in one MP4 file. That is, the elementary streams corresponding to playback sections (1), (2), and (4) are continuously stored in the MP4 for the director's cut edition, and the elementary streams corresponding to playback sections (1), (2), and (4) are continuously stored in the MP4 for the theatrical edition. Thus, there is a merit that the audio overlap or gap is not generated in a connection portion of playback sections (2) and (4) or playback sections (3) and (4) by previously forming the audio elementary streams for export into one elementary stream. Therefore, the playback device does not need to perform the processing related to the audio overlap or gap.

FIG. 30 is a view illustrating another example of the file producing method when the plurality of versions of the main story content are stored.

In FIG. 29, the case that the audio for export is formed into one MP4 file. Alternatively, a plurality of MP4 files corresponding to the video playback sections may be stored as illustrated in FIG. 30. At this point, it is assumed that, although the audio overlap or gap is generated in the connection portion of the playback sections, the audio overlap or gap is processed by the method described above.

Figure 31:
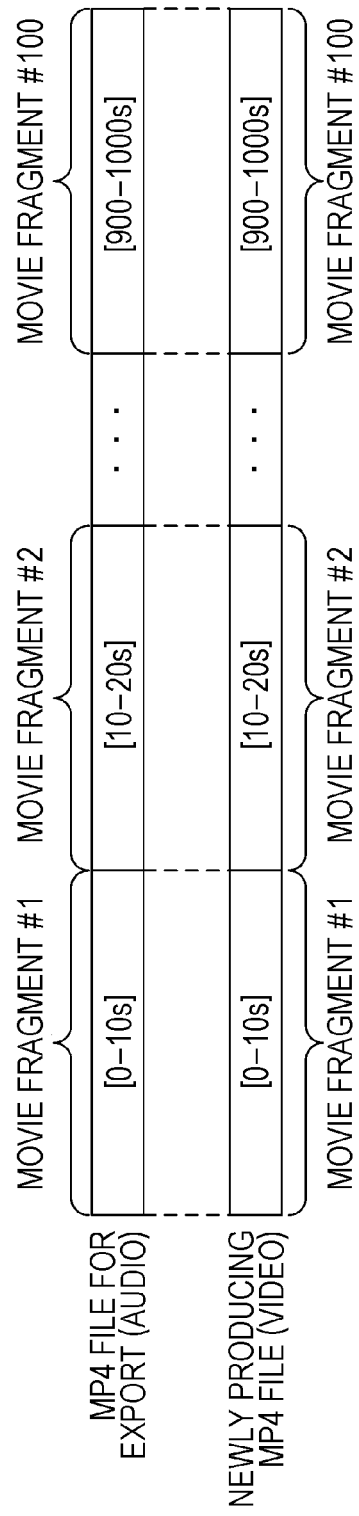
FIG. 31 is a view illustrating an example of a relationship between an audio MP4 file for export and a video MP4 file separated from M2TS in the fourth exemplary embodiment.

FIG. 31 is a view illustrating an example of a relationship between the audio MP4 file for export and the video MP4 file separated from the M2TS.

In the case that the content in the DMP format is produced, desirably the units of the movie fragments are matched with each other in the different mediums such as the audio, the video, and the caption. Generally, in the case that the playback is performed by getting random access in the middle of the content, the PTS at a random access point is decided based on a video random access point, and the audio and the caption are played back from a frame having a PTS identical to, immediately before, or immediately after the PTS at the video random access point. For the audio or the caption, in the case that the previously-stored single track MP4 file for export is used, the data of the MP4 file is exported with no change.

In the video MP4 file produced based on the video elementary stream separated from the M2TS, desirably the units of the movie fragment are produced so as to be matched with the audio or caption for export. That is, based on the elementary stream separated from the M2TS, desirably the video MP4 file is produced having the playback time corresponding to a playback time of the audio or caption MP4 file. Therefore, during the random access, the playback can be allowed to start from the movie fragment having the identical index number in each medium. It is assumed that the sample in which the DTS becomes the head in the movie fragment is the I picture in the MPEG-4 AVC or HEVC or the randomly accessible picture such as the IDR picture.

Figure 32A:
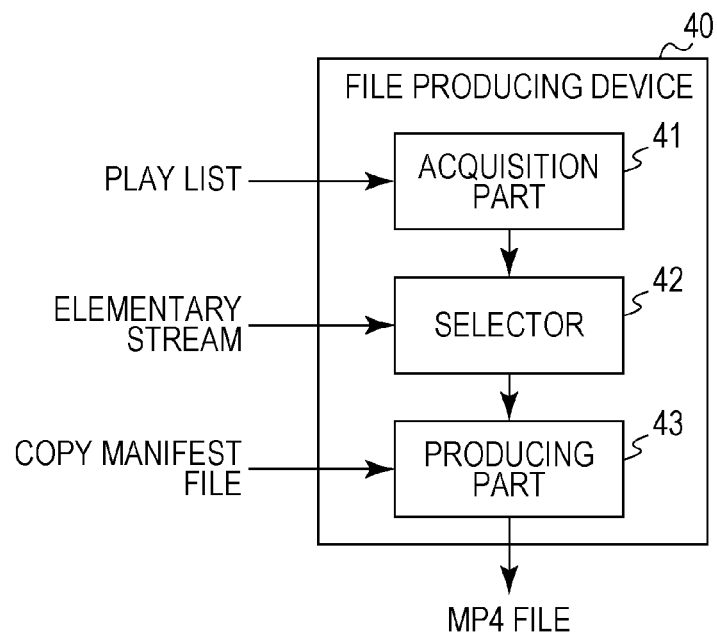
FIG. 32A is a block diagram illustrating a file producing device in the fourth exemplary embodiment.

FIG. 32A is a block diagram of a file producing device of the fourth exemplary embodiment.

File producing device 40 of the fourth exemplary embodiment is a file producing device producing the MP4 file from the elementary stream, and file producing device 40 includes acquisition part 41, selector 42, and producing part 43. Acquisition part 41 acquires the play list including the identification information indicating each of the plurality of elementary streams. Selector 42 selects the elementary stream indicated by predetermined identification information from the acquired play list. Producing part 43 produces the MP4 file by converting the data included in the elementary stream into the MP4 file format based on the manifest file, which is correlated with the selected elementary stream and is necessary for the conversion of the file format based on a predetermined rule. The predetermined identification information means the file name of the stream file, such as "XXX1.M2TS" and "XXX2.M2TS", which is illustrated in each play list example of FIG. 28.

At this point, the play list may further include section information indicating a part of the sections of the elementary stream indicated by the predetermined identification information. For example, the section information is indicated by the clock time information indicating the decryption or display clock time of the elementary stream like "PTS_begin=10.0 s, PTS_end=30.3 s" in FIG. 28A.

The play list may includes the first identification information indicating the first elementary stream and the second identification information indicating the second elementary stream as the predetermined identification information and the first section information indicating the first section of the first elementary stream and the second section information indicating the second section of the second elementary stream as the section information. Specifically, the elementary stream obtained from the stream file (XXX1.M2TS) in FIG. 27 corresponds to the first elementary stream, and the elementary stream obtained from the stream file (XXX2.M2TS) corresponds to the second elementary stream. As illustrated in FIG. 28A, "XXX1.M2TS" of play item 1 corresponds to the first identification information, and "XXX2.M2TS" of play item 2 corresponds to the second identification information. As illustrated in FIG. 28A, "PTS_begin=10.0 s, PTS_end=30.3 s" of play item 1 corresponds to the first section information, and to "PTS_begin=30.3 s, PTS_end=60.3 s" of play item 2.

The manifest file is the copy manifest file in FIG. 24 or 28B, and the information in which the decryption or display clock time and the position of the elementary stream are correlated with each other. The manifest files are correlated with the plurality of elementary streams on a one-on-one basis. For example, the manifest file may be correlated with the elementary stream by being provided with a file name corresponding to the file name of the elementary stream (M2TS file), or the manifest file and the elementary stream may be correlated with each other using a table.

Figure 32B:
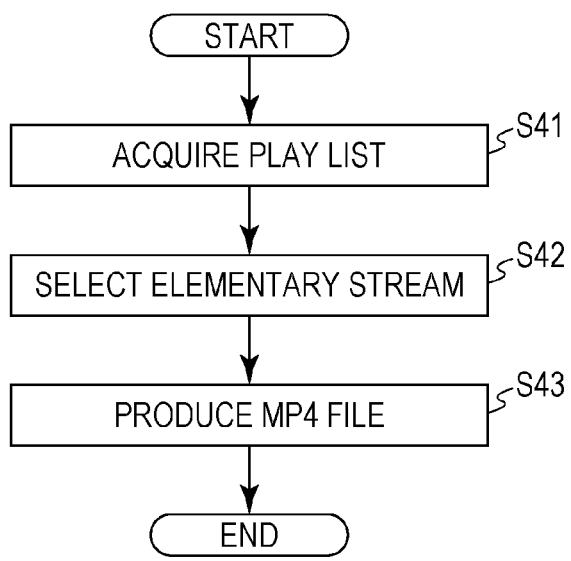
FIG. 32B is a flowchart illustrating a file producing method in the fourth exemplary embodiment.

FIG. 32B is a flowchart of a file producing method of the fourth exemplary embodiment.

The file producing method of the fourth exemplary embodiment is the file producing method for producing the MP4 file from the elementary stream, and the file producing method includes Steps S41, S42, and S43. In Step S41, the play list including the identification information indicating each of the plurality of elementary streams is acquired. In Step S42, the elementary stream indicated by predetermined identification information is selected from the acquired play list. In Step S43, the MP4 file is produced by converting the data included in the elementary stream into the MP4 file format based on the manifest file, which is correlated with the selected elementary stream and is necessary for the conversion of the file format based on the predetermined rule.

Therefore, in the fourth exemplary embodiment, the data included in the elementary stream selected from the play list can be converted into the MP4 file format based on the manifest file corresponding to the elementary stream. For example, the use of the manifest file specifies the elementary stream indicated by the predetermined identification information of the play list without the calculation, so that the processing load can be suppressed.

In the case that the play list includes the section information indicating a part of the elementary stream indicated by the predetermined identification information, the section of the elementary stream indicated by the section information may be selected in Step S42, and the selected section of the elementary stream may be converted into the MP4 file format in Step S43.

Therefore, in the fourth exemplary embodiment, the data of the section in the elementary stream selected from the play list can be converted into the MP4 file format based on the manifest file corresponding to the elementary stream. The use of the manifest file specifies the elementary stream section indicated by the section information of the play list without the calculation, so that the processing load can be suppressed.

In the case that the section information is indicated by the clock time information indicating the clock time of the decryption or display of the elementary stream while the manifest file is the information in which the clock time and the position in the elementary stream are correlated with each other, in Step S43, the position of the section in the elementary stream may be specified from the manifest file, the position of the section corresponding to clock time information indicated by the section information of the play list, the specified section of the elementary stream may be extracted, and the specified section of the elementary stream may be converted into the MP4 file format.

Therefore, in the fourth exemplary embodiment, the clock time of the decryption or display and the position in the elementary stream are previously correlated with each other in the manifest file, so that the position of the section of the elementary stream can easily be specified from the section information indicated in the play list. Therefore, the processing load can be suppressed.

In the case that the play list includes the first identification information indicating the first elementary stream and the second identification information indicating the second elementary stream as the predetermined identification information and the first section information indicating the first section of the first elementary stream and the second section information indicating the second section of the second elementary stream as the section information, in Step S42, the first section indicated by the first section information in the first elementary stream indicated by the first identification information and the second section indicated by the second section information in the second elementary stream indicated by the second identification information may be selected from the acquired play list, and in the conversion, data including the selected first section of the first elementary stream and the selected second section of the second elementary stream may be converted into the MP4 file format.

Therefore, in the fourth exemplary embodiment, the two sections can easily be specified even if the sections of the two elementary streams are selected by the play list. Therefore, the processing load can be suppressed.

In Step S43, the selected first section of the first elementary stream may be extracted based on the first manifest file corresponding to the first elementary stream, the selected second section of the second elementary stream may be extracted based on the second manifest file corresponding to the second elementary stream, and the data including the extracted first section and the extracted second section may be converted into the MP4 file format.

Therefore, in the fourth exemplary embodiment, even if the sections of the two elementary streams are selected by the play list, the two sections can easily be specified because the manifest files corresponding to the two elementary streams are used. Therefore, the processing load can be suppressed.

In the case that the stream file for export (audio MP4 file) exists as illustrated in FIG. 27, the audio MP4 file corresponding to the elementary stream may further be acquired in Step S42, and in Step S43, the video elementary stream corresponding to the elementary stream may be extracted based on the selected manifest file corresponding to the elementary stream, and the MP4 file may be produced using the extracted video elementary stream and the selected audio MP4 file.

Therefore, in the fourth exemplary embodiment, it is not necessary to produce the audio MP4 file by conversion from the elementary stream, so that the processing load can be suppressed.

First Modification of Fourth Exemplary Embodiment

FIG. 33 is a block diagram of a file producing device of a first modification of the fourth exemplary embodiment.

File producing device 200 includes play list analyzer 201, export target selector 202, M2TS separator 203, export file acquisition part 204, re-multiplexer 205, and copy manifest analyzer 206. File producing device 200 produces and outputs the MP4 including the audio, the video, or the caption based on the elementary stream separated from the M2TS and the single-track MP4 for export. The output MP4 may be in a format in which the elementary streams of a plurality of mediums are stored in one file or the DMP format.

Play list analyzer 201 corresponds to acquisition part 41 and selector 42 of file producing device 40, acquires the play list from the optical disk or through the network, and analyzes the acquired one or plurality of play lists for export.

Export target selector 202 corresponds to selector 42 of file producing device 40, produces a menu used by a user to select the content to be provided from the export target play list, the language setting in the content, or whether to export the caption data based on an analysis result of play list analyzer 201, receives input on the produced menu, and decides the export target play list based on a user's selection result (the play list decided in response to the received input on the menu).

Then the data in which the elementary stream constituting the content selected by the user is stored is decided. In the case that the elementary stream is stored in the M2TS, M2TS separator 203 separates the elementary stream based on the copy manifest information provided by copy manifest analyzer 206. In the case that the elementary stream is provided by the MP4 for export, export file acquisition part 204 acquires the MP4 file for export. In the case that the audio elementary stream is provided by the MP4 file for export, export file acquisition part 204 may acquire the MP4 file for export. Finally, re-multiplexer 205 produces an MP4 file for output using the elementary stream acquired from M2TS separator 203 and the MP4 file acquired from export file acquisition part 204. In the case that the plurality of mediums are stored in one MP4 file, an audio, video, or caption elementary stream is multiplexed in one MP4 file after separating the elementary streams from the MP4 data for export. In the case that the output is performed in the DMP format, the single-track MP4 is produced from the elementary stream output from the M2TS separation means, and the DMP content is produced by combining the single-track MP4 and the MP4 data for export output from the EXPT file acquisition means. At this point, it is assumed that the meta-data used to manage the plurality of MP4 files included in the DMP is separately produced. Re-multiplexer 205 may output the video, audio, and caption MP4 files as independent files without multiplexing the video, audio, and caption MP4 files.

M2TS separator 203, export file acquisition part 204, re-multiplexer 205, and copy manifest analyzer 206 correspond to producing part 43 of file producing device 40.

FIG. 34 is a view illustrating an example when the MP4 file is produced while divided into a plurality of pieces. Specifically, FIG. 34 illustrates an example in which the MP4 file having a size of 11.40 GB corresponding to the whole content is divided into three files each having a size of 4 GB or less in order to record the MP4 file in an SD card.

The MP4 file produced from the data such as M2TS is recorded in a recording device, such as a removable medium such as the SD card, the smartphone, and the HDD of the tablet, to which the MP4 file is taken out. At this point, an upper limit of the file size that can be dealt with is restricted depending on the file system of the recording device. For example, the upper limit of the file size is 4 GB for the SD card, and the upper limit of the file size is 32 GB for an SDHC card. Accordingly, in the case that the size of the MP4 file corresponding to the whole content exceeds the upper limit of the file system of the recording device, it is necessary to divide the MP4 file.

In the MP4 in which the movie fragment is used, desirably the movie fragments in which the playback sections are identical or close to each other in the audio, the video, or the caption are stored in the identical file. If the pieces of audio or video data having the identical playback sections are stored in different files, it is necessary to simultaneously access the pieces of data of the two MP4 files during the playback, and, depending on a data reading rate or a data seeking rate in the recording device, it is necessary to perform the playback after the data is excessively buffered compared with the playback from one file.

Accordingly, the MP4 file is produced such that the audio, video, or caption movie fragments in which the playback sections are identical or close to each other are included in an identical MP4 file, and such that the file size is less than or equal to 4 GB. Thus, the movie fragments each having a file size of 4 GB or less are stored in the identical file as many as possible, which allows the minimization of the number of produced files.

Because the audio or the caption has the data size smaller than that of the video, the audio or caption data can be buffered longer than the video. Accordingly, not all the movie fragments of different mediums but at least the video movie fragments having the identical playback sections may be stored in the identical file. For the medium except for the video, the data of the identical movie fragment may be prohibited from being divided into different files.

Figure 35:
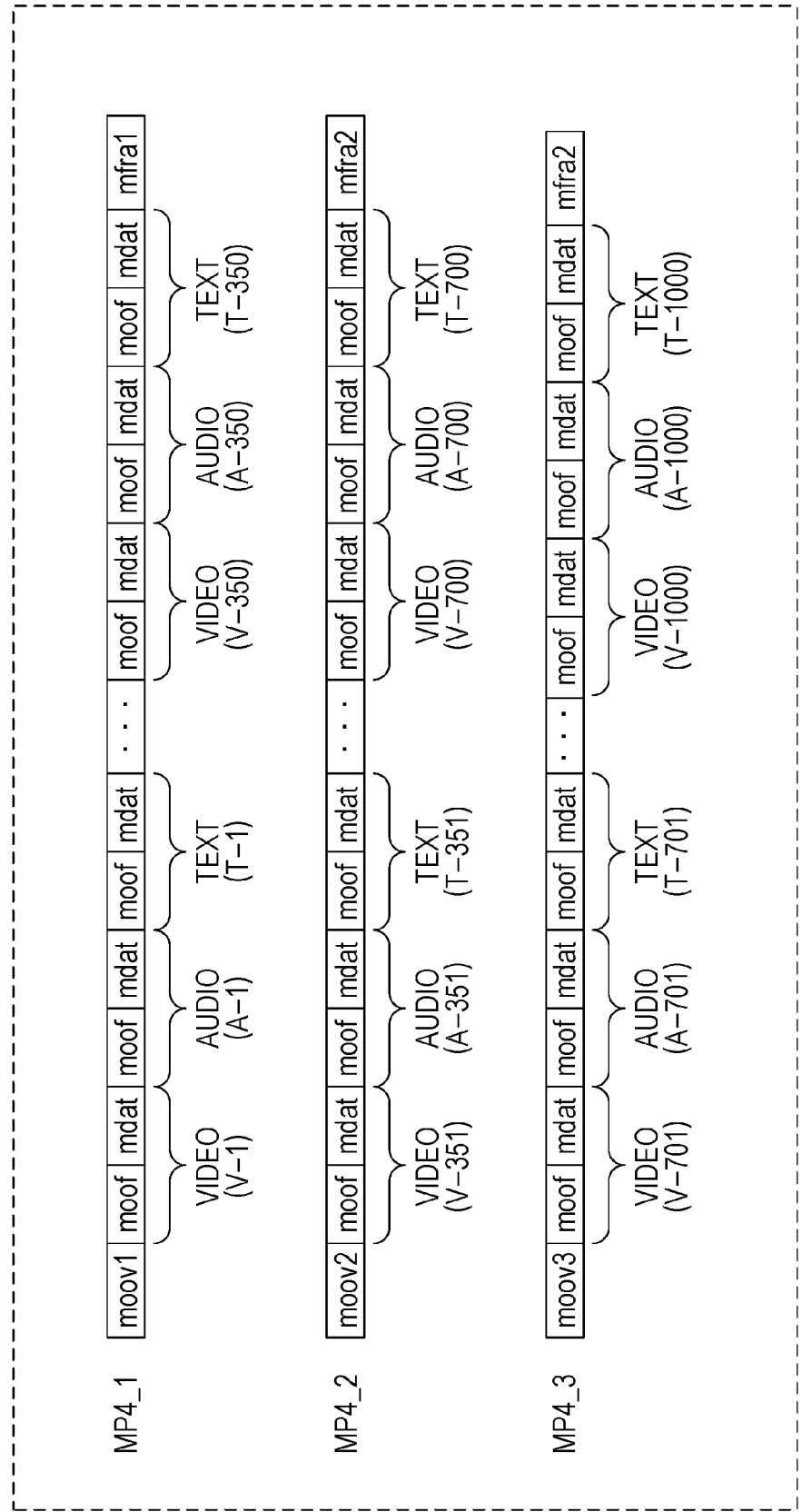
FIG. 35 is a view illustrating another example when the MP4 file is produced while divided into a plurality of pieces in the first modification of the fourth exemplary embodiment.

FIG. 35 is a view illustrating another example when the MP4 file is produced while divided into the plurality of pieces.

As illustrated in the example of FIG. 34, when the data of the original MP4 file is directly divided, the moov does not exist in the second and following files, so that it is necessary to refer to the first file in order to acquire the initialization information necessary for the decryption of each medium stored in "SampleEntry". Because the mfra is included only in the final file, it is necessary to refer to the mfra stored in the final MP4 file in the case that the MP4 file except for the final MP4 file is randomly accessed. Therefore, the complete playback can hardly be performed in each MP4 file. Accordingly, the moov or the mfra may be added to each file.

For the moov, it is not necessary to change the content of stsd because all the pieces of initialization information necessary for the whole content are included in "SampleEntry" of the original MP4 file. Basically the change is unnecessary with respect to other boxes. The playback time length of the whole file of each track is stored in tkhd or mvhd of each track. Accordingly, the playback time length may be changed so as to correspond to the playback time length of the converted MP4 file. Alternatively, in the case that some sort of auxiliary information indicates the file as being the divided file, the change of the playback time length may becomes unnecessary.

On the other hand, the content of the mfra may be changed such that the random access point in each MP4 file is indicated. The random access information of the mfra indicates an offset from the file head of the moov to which the sample constituting the random access point belongs. In the case that the content of the mfra is not changed, because the offset value is for the original MP4, the offset value does not become the offset value of the divided file. Accordingly, during the search of the random access point in the divided files, the total value of the sizes of MP4 files having the preceding playback order is added to the second and following files to provide a file offset value of the original MP4 file, to acquire the sample data constituting the random access point.

In the case that the size of the moov or mfra is updated in the original MP4 file due to the change in the content of the moov or mfra in each divided file, the file is divided such that the updated file size is equal to or less than the maximum size of the file system.

The sequence for playing back the divided files can be identified by the file name or management information on the content in which information indicating the file playback order is stored.

As illustrated in the example of FIG. 25, in the case that the caption data is collectively stored at the terminal end of the MP4 file without interleaving the caption data, the information identifying the divided file including the caption data is included in the management information on the content. During the playback, the caption data is acquired by accessing the divided file in which the caption data is stored. Generally, because the caption data has the small size, desirably all the pieces of caption data are included in the identical file. At this point, the initialization information used in the decryption of the caption data is stored in the moov similarly to the audio and the video.

During the generation of the MP4 file, it is necessary to previously acquire the upper limit of the file size of the file system that is of the output destination of the original MP4 file. In the case that the output destination is another device such as the tablet, communication is conducted with the device of the output destination. In the case that the output destination is the recording medium, such as the SD card and the HDD, which is connected to the identical device such as the Blu-ray disc player in which the optical disk exists, communication is conducted in the device based on some sort of communication means. Thus, the information indicating the maximum file size of the file system of the output destination or the information indicating whether the original MP4 file needs to be divided is acquired.

For example, in advance of the production of the MP4 file, an MP4 producing module mainly acquires the information indicating the maximum file size of the file system of the output destination recording medium by making an acquisition request for the information indicating the maximum file size. Alternatively, the output destination device is notified of the original MP4 file, and the output destination device transmits the information indicating the maximum file size to the MP4 producing module in the case that the file needs to be divided.

In the case that another device acquires the MP4 file through a communication network, a meta-file in which meta-information on the content such as the selectable language, an acquisition source of the MP4 file, or a URL of a management server of DRM (Digital Right Management) is described is acquired first, and the acquisition request for the MP4 file is made based on an analysis result of the meta-file. In such cases, the information indicating the maximum file size may be described in a message or a command of the acquisition request for the MP4 file.

The meta-file may be updatable. A default meta-file is acquired from the optical disk, and the updated meta-file is acquired through the network when the update is available. The URL of the management server that the playback device initially accesses is described in the meta-file, the management server determines whether the meta-file is latest based on a version number of the meta-file in the optical disk, and the playback device can be notified of the acquisition source of the latest meta-file unless the meta-file is latest. Sometimes the acquisition source of the DRM or content described in the default meta-file or the content varies depending on a country or a region. In such cases, similarly to the update of the meta-file, the management server can process the acquisition source of the DRM or content or the content based on the identification information of the country or region where the playback device exists. The same holds true for the case that the update content of the meta-file varies depending on the country or region.

Figure 36:
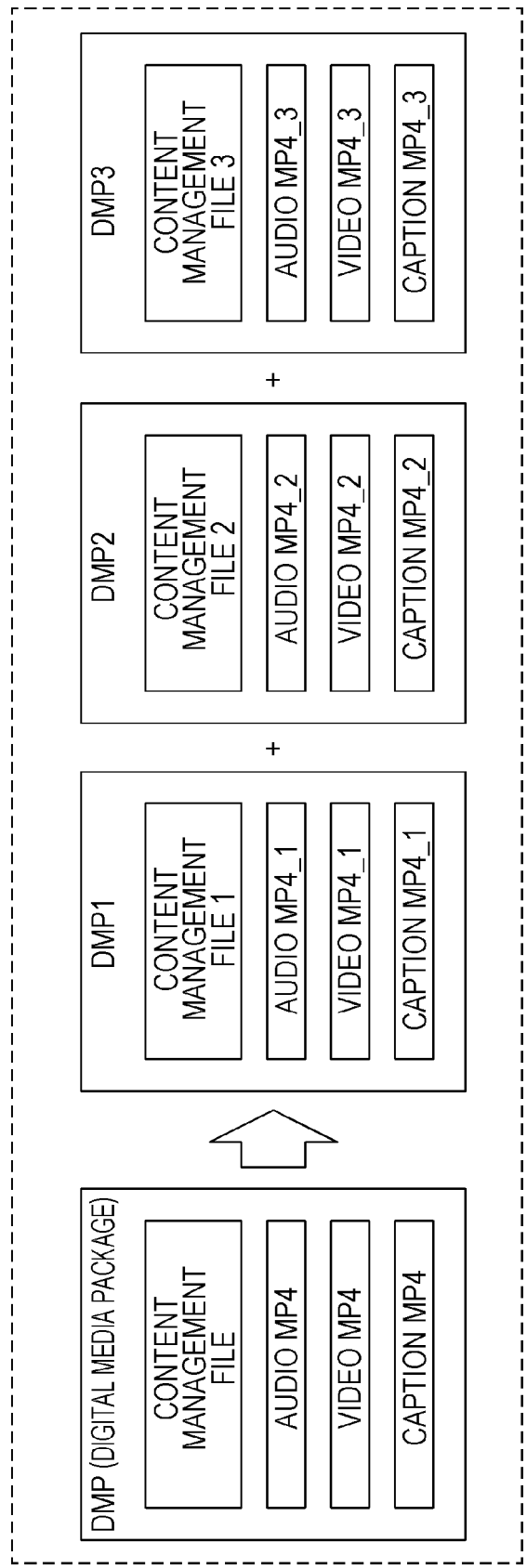
FIG. 36 is a view illustrating still another example when the MP4 file is produced while divided into a plurality of pieces in the first modification of the fourth exemplary embodiment.

FIG. 36 is a view illustrating still another example when the MP4 file is produced while divided into the plurality of pieces.

In producing the MP4 file, generally the pieces of data of different mediums such as the audio, the video, and the caption are multiplexed in the identical file. However, there is also a format in which the MP4 file is independently formed for each medium as illustrated in FIG. 36. The format in FIG. 36 is called a DMP (Digital Media Package), and pieces of media data acquired from the plurality of MP4 files are synchronously played back. In the DMP, the MP4 file and the management file of the content are archived in a ZIP format, and it is necessary to divide the archived file in the case that the archived file exceeds the maximum file size of the file system of the output destination. The archived file is similarly divided by the division method described in FIGS. 34 and 35. That is, the archived file is divided such that the playback sections of the MP4 files of the mediums constituting the identical DMP are identical or close to each other. In addition, in the MP4 of each medium, one movie fragment is prohibited from being stored across a plurality of DMPs. The same holds true in dealing with the moov of mfra. Because the audio or the caption has the data sizes smaller than that of the video, only the video may be divided into the plurality of files, and all the pieces of data of the audio and caption may be stored in the leading divided file.

As to the content of the content management file, attribute information on the whole content can be stored in content management file stored in the divided leading DMP. The identification information on the divided subsequent DMP file and the information indicating the playback order may be stored in the content management file stored in the leading DMP. In the content management file of the subsequent DMP, the archive information on the file in the DMP or the identification information on the DMP is described, but the information on the whole content does not need to be described. Data of a single DMP may be divided into a plurality of files instead of the plurality of DMPs produced.

In the DMP, as illustrated in FIGS. 21 and 22, the continuous playback can be performed by referring to the MP4 file constituting the plurality of playback sections from the play list. One file exists as each of the connection destination and the connection source when the plurality of mediums are multiplexed in the identical file. On the other hand, in the DMP, the plurality of files exist as each of the connection destination and the connection source, and the pieces of identification information on the plurality of files are described in the play list. The audio gap or overlap at the connection point of the continuously-played-back files is similarly dealt with by the processing described above.

Second Modification of Fourth Exemplary Embodiment

Figure 37:
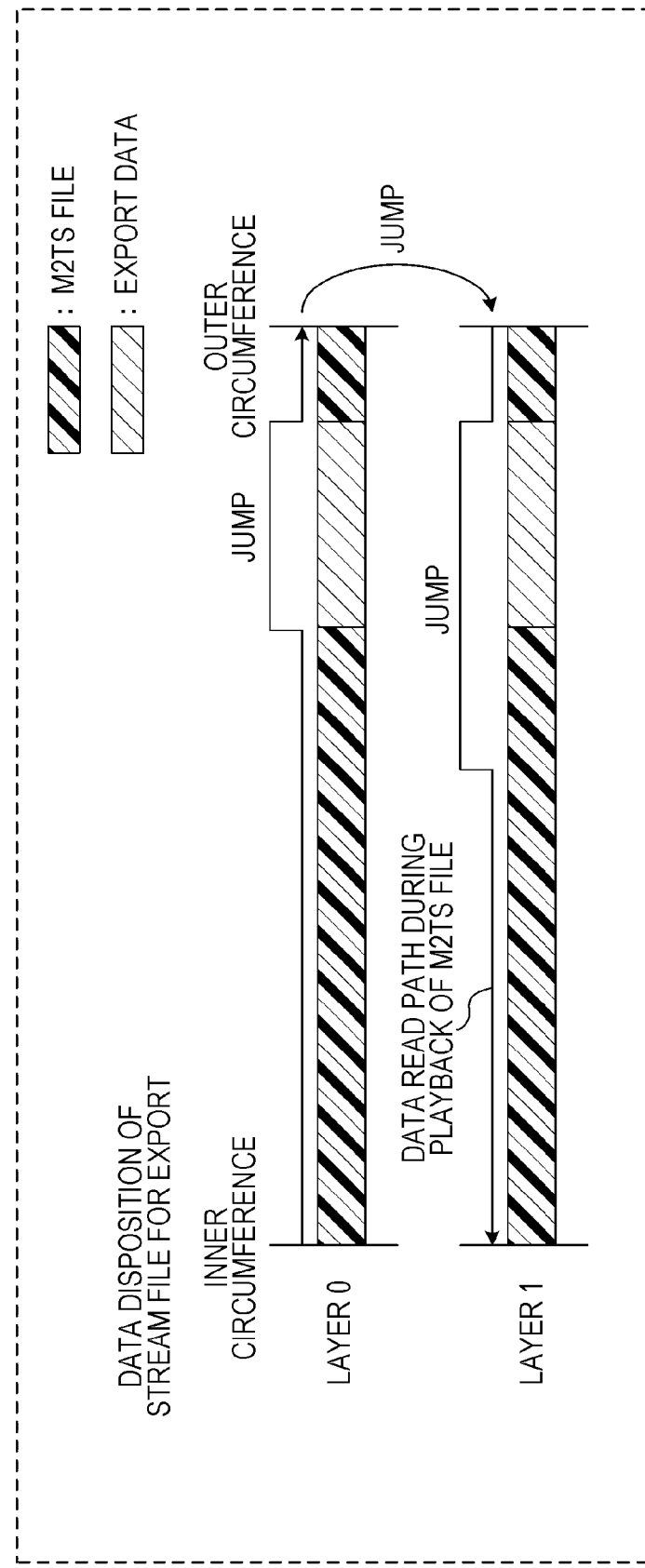
FIG. 37 is a view illustrating a storage position when data used in export is stored in the optical disk in a second modification of the fourth exemplary embodiment.

FIG. 37 is a view illustrating a storage position when the data, such as the MP4 for export, which is used in the export, is stored in the optical disk. Because desirably the data for export can be read and copied at high speed, the data for export is stored in a continuous area of an outer peripheral portion of the optical disk. On the other hand, in the M2TS, it is necessary that the sufficient data that can assure that the audio, video, or graphic data does not cause underflow when an jump is made between layers of the optical disk is disposed in an outer peripheral portion.

For example, assuming that T1 is a time necessary for the jump from layer 0 to layer 1, that T2 is a time the video data can be acquired since the jump to layer 1, and that R is a video bit rate, it is necessary to buffer the video data for at least R*(T1+T2) immediately before the jump from layer 0. Bit rate R may be a maximum value of the bit rate specified by a profile or a level of which the video is coded or an average bit rate of the actual coded data. As used herein, the average bit rate means an average rate of the section from DTS T_dec1 to DTS (Tdec1+T1+t2) on the assumption that T_dec1 is the video DTS corresponding to the clock time immediately before the jump.

In the area where the data for export is disposed, the jump is also generated during the playback of the M2TS. Accordingly, it is necessary to decide the storage area of the data for export such that the M2TS data does not cause underflow when the jump is made in the storage area of the data for export. Thus, the data for export is disposed in the area close to the outermost periphery as much as possible while preventing the M2TS data from causing underflow with certainty during the jump playback.

For the MP4 for export, desirably the identical file is stored in the identical layer.

Third Modification of Fourth Exemplary Embodiment

FIG. 38 is a view illustrating a play list example in which the size of the elementary stream is indicated in the play list for export.

In play list example 1 illustrated in part (a) of FIG. 38, the size of the elementary stream multiplexed in the M2TS or MP4 is indicated. During the export, whether the sufficient free space for the exported MP4 exists in the recording medium of the export destination can be determined because the exported MP4 data size can roughly be calculated based on the size of the elementary stream. In the case that the header data of the exported MP4 is included in the copy manifest, because the header size of the MP4 can be decided, the data size of the exported MP4 can be decided together with the size of the elementary stream.

Play list example 2 illustrated in part (b) of FIG. 38 indicates a sum of the sizes in a basic portion and an extending portion and only the size of the basic portion in the case that the audio is constructed with the basic portion and the extending portion (such as the extension for the lossless compression), and the size of the output data can be decided when the only the basic portion, only the extending portion, or the basic portion and the extending portion are exported. The third modification can be applied to not only the audio but also the case that the video is coded by the layer structure.

Fourth Modification of Fourth Exemplary Embodiment

FIG. 39 is a view illustrating a play list example in which information on a gap generated in an audio connection portion between play items is indicated. Referring to FIG. 39, when "connection_condition" is "seamless_w_gap", the video is seamlessly connected in the connection of the play items, and the gap is generated in the audio. In the case that the gap exists, a gap time length can be indicated by "gap_duration".

In the MP4, it is necessary to provide the audio gap during the coupling of the plurality of files. Whether the gap exists is determined by the pieces of information, the gap time length is acquired when the gap exists, and the gap time length in the coupling portion of the MP4 file can be set to the header information on the MP4.

In the content of the optical disk, because only the audio overlap is permitted between the play items, the mode corresponding to "seamless_w_gap" is an export-only mode.

Fifth Modification of Fourth Exemplary Embodiment

FIG. 40A is a view illustrating an example of a method for producing the audio gap during the export. In the case that the playback sections of the audio frame become discontinuous in the seamless connection portion of the M2TS stream, the audio playback sections are overlapped with each other between the play items. When the two audio streams in which the overlaps are generated are coupled to each other in the MP4, it is necessary to delete the audio frame in the connection portion to produce the gap.

In FIG. 40A, when audio 1 and audio 2 are coupled to each other, three frames (frame group A) from frame 98 to frame 100 of audio 1 are deleted, and the gap is produced between frame 97 of audio 1 and frame 0 of audio 2. At this point, during the export, desirably the frame that needs to be deleted during the production of the gap can be specified.

FIG. 40B is a view illustrating a play list example in which the frame that needs to be deleted is indicated in producing the gap. In the play list example of FIG. 40B, the PTS of the audio final frame referred to from play item 1 is indicated by "last_frame_pts" when play item 1 and play item 2 are coupled to each other. For example, assuming that the PTS of frame 97 of audio 1 in FIG. 40A is 30.1 s, "last_frame_pts" is set to 30.1 s. The frame to be deleted may be specified by the information other than the PTS such as the index number and the storage destination address of the frame that needs to be deleted.

The audio frame may be deleted such that the overlap exists (is left) between audio 1 and audio 2. That is, after the audio frame is deleted, the overlap may exist between the final frame of audio 1 and the leading frame of audio 2.

The gap time length may also be indicated like the play list example in FIG. 39.

In the above description, it is assumed that the auxiliary information used in the export is stored in the play list. Alternatively, the auxiliary information may be stored in the playback management meta-data different from the play list.

In the examples of FIGS. 40A and 40B, the three frames from frame 98 to frame 100 of audio 1 are deleted and the gap is produced between frame 97 of audio 1 and frame 0 of audio 2. Alternatively, the frame of audio 2 may be deleted to produce the gap between audio 1 and audio 2. For example, three frames (frame group B) from frame 0 to frame 2 of audio 2 in FIG. 40A may be deleted to produce the gap between frame 100 of audio 1 and frame 3 of audio 2. In this case, in the play list example of FIG. 40B, "first_frame_pts" indicating the PTS of the audio leading frame of play item 2 may be provided instead of "last_frame_pts" indicating the PTS of the audio final frame of play item 1, and "first_frame_pts" may be set to 30.4 s when the PTS of frame 3 of audio 2 is 30.4 s.

Sixth Modification of Fourth Exemplary Embodiment

Figure 41:
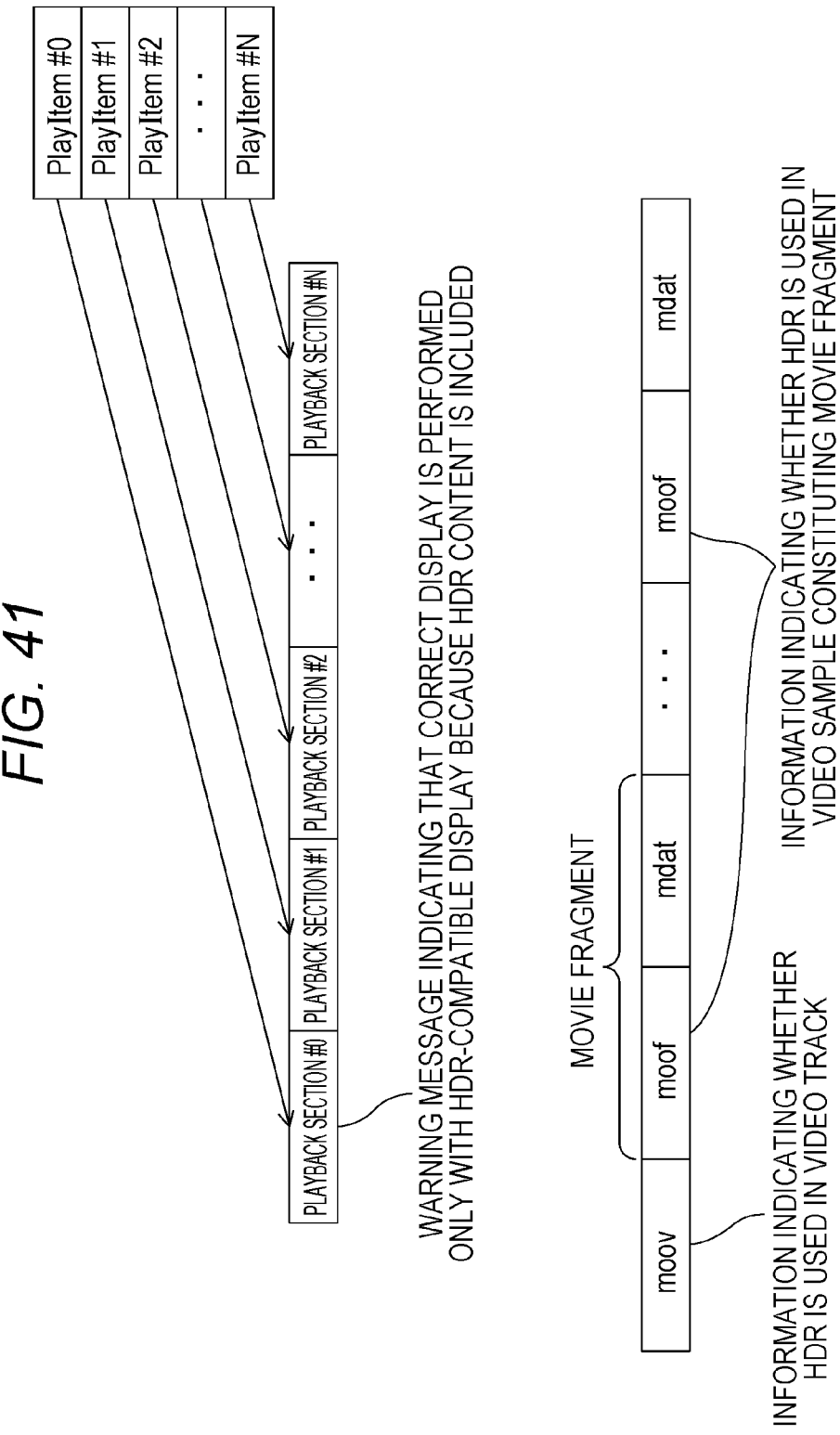
FIG. 41 is a view illustrating a storage example when video data including the luminance within a HDR (High Dynamic Range) luminance range is stored in the MP4 file in a sixth modification of the fourth exemplary embodiment.

FIG. 41 is a view illustrating a storage example when the video data including luminance of a high luminance area exceeding a luminance range used in BT.709 standard (SDR: Standard Dynamic Range) called a HDR (High Dynamic Range) is stored in the MP4 file.

A HDR-compatible display is required to play back the HDR content, and processing of mapping the HDR luminance range on the SDR luminance range is required to play back the HDR content with an SDR display. In a sixth modification of the fourth exemplary embodiment, content to provide a warning message indicating that the correct display is hardly performed without the HDR-compatible display due to the inclusion of the HDR content is stored in the 0-th play item that is initially played back in the play list for export.

Because the playback section corresponding to the 0-th play item is stored as the MP4 leading data in producing the MP4 during the export, the warning message is initially displayed during the playback of the MP4. The warning message may be constructed only with the caption. Alternatively, whether the HDR content is stored in the MP4 file may be signaled in the header information on the MP4. For example, whether the HDR is used in at least a part of the playback sections of the video track is indicated in the moov, and whether the HDR is used in the video sample constituting the movie fragment is indicated in the moof.

During the playback of the HDR content, a gamma curve is adjusted according to the maximum luminance of the display of the output destination using luminance information, such as peak luminance and a white-level luminance, which can be switched in units of streams or scenes. Accordingly, the luminance information may be stored as the header information on the MP4. In the case that the luminance information is fixed in the MP4 file, the luminance information may be set as the information in the moov. In the case that the luminance information is variable in the MP4 file, the luminance information may be set as the information in the moof. At this point, it is assumed that the luminance information is equalized in the movie fragment.

When the use or disuse of the HDR is switched, or when the luminance information is switched, the switching is conspicuous to provide discomfort to the user. Therefore, in the section continuously played back in the seamless way, the use or disuse of the HDR or the luminance information may be fixed. For example, in playing back the M2TS, information indicating that HDR-related information is fixed between the play items may be stored in the play list, and information indicating that HDR-related information is fixed in the video track may be stored in MP4.

The HDR-related information may be stored as the meta-data managing the MP4 file, instead of being directly stored in the MP4 file.

Seventh Modification of Fourth Exemplary Embodiment

Figure 42:
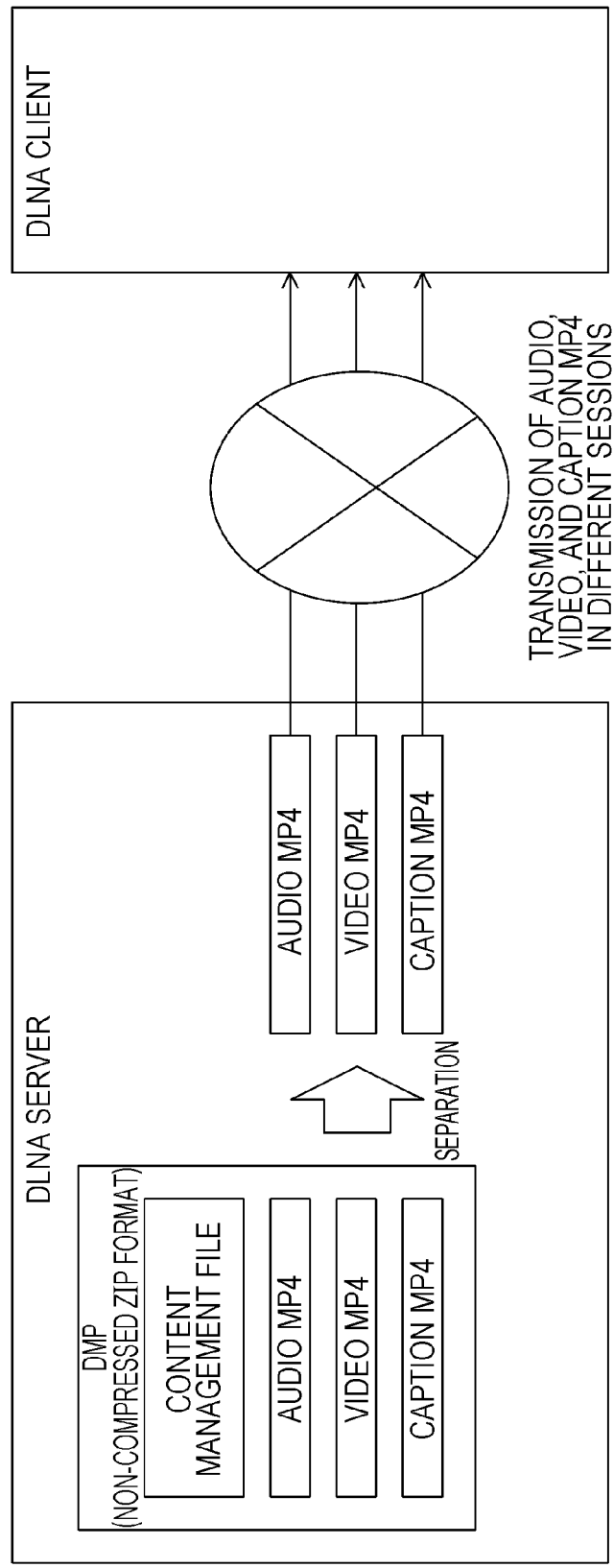
FIG. 42 is a view illustrating operation when exported DMP data is viewed with a mobile terminal based on the DLNA (Digital Living Network Alliance) standard in a seventh modification of the fourth exemplary embodiment.

FIG. 42 is a view illustrating the operation when the DMP data exported from the optical disk to an SD card or a portable hard disk is viewed with a mobile terminal such as a smartphone and a tablet based on the DLNA (Digital Living Network Alliance) standard.

When the DLNA standard is taken as an example, a recording medium in which the DMP data is stored acts as a DLNA server, and the smartphone or the tablet acts as a DLNA client. In viewing the content by the DLNA client, desirably the DMP data is played back not after completely downloaded but while being downloaded.

However, in the DMP data, the plurality of MP4 files are stored in a non-compressed ZIP format, but the pieces of data of the MP4 files are not interleaved with each other. Therefore, it is difficult that the audio, video, or caption data is synchronously played back while the DMP data is downloaded. Accordingly, in the DLNA server, the audio, video, and caption MP4 files are separated from the DMP, independent sessions for the MP4 files are established, and the sessions are sent to the DLNA client. In the DLNA client, the elementary streams are separated from the MP4 files of the plurality of mediums received as the plurality of independent sessions, and synchronously played back.

In the above exemplary embodiments and modifications, each component may be constructed with dedicated hardware, or constructed by executing a software program suitable for the component. Each component may be constructed by a program executing part such as a CPU and a processor which reads and executes a software program recorded in the recording medium such as a hard disk and a semiconductor memory. At this point, the software implementing the file producing device of the above exemplary embodiments and modifications causes a computer to perform each step included in the flowcharts in FIGS. 8, 17, 22B, 22D, and 32B.

Although the file producing device and playback device of one or a plurality of aspects are described based on the above exemplary embodiments and modifications, the present disclosure is not limited to the exemplary embodiments and modifications. It is noted that various changes of the exemplary embodiments and modifications conceivable by those skilled in the art and a combination of the components of the exemplary embodiments and modifications are also included in one or the plurality of aspects without departing from the scope of the present disclosure.

For example, in the first exemplary embodiment and the modifications thereof, the file constructed by the MPEG2-TS is used as the original file. Alternatively, the original file may be any file or transport stream other than the MPEG2-TS file as long as the original file is the file constructed in a file format except for the MP4.

In the second exemplary embodiment, playback section 1 and playback section 2 are integrated as illustrated in FIG. 22A. Each of playback sections 1 and 2 may be the movie fragment of the MP4 file or other streams than the movie fragment of the MP4 file.

The following cases may be included in the present disclosure.

(1) Specifically, each of the devices is a computer system constructed with a microprocessor, a ROM, a RAM, a hard disk unit, a display unit, a keyboard, a mouse, and the like. A computer program is stored in the RAM or hard disk unit. The microprocessor is operated according to the computer program, thereby implementing the function of each device. At this point, the computer program is constructed with a combination of a plurality of command codes that issue an instruction to the computer in order to achieve a predetermined function.

(2) A part of or all the components constituting each of the devices may be constructed by one system LSI (Large Scale Integration). The system LSI is a super multi-function LSI that is produced by integrating a plurality of components on one chip. Specifically, the system LSI is the computer system that is constructed while including a microprocessor, a ROM, and a RAM. A computer program is stored in the RAM. The microprocessor is operated according to the computer program, thereby implementing the function of system LSI.

(3) A part of or all the components constituting each of the devices may be constructed with an IC card that is detachably attached to each device or a single module. The IC card or the module is a computer system constructed with a microprocessor, a ROM, a RAM, and the like. The IC card or the module may include the super multi-function LSI. The microprocessor is operated according to the computer program, thereby implementing the function of the IC card or module. The IC card and the module may have a tamper-resistant property.

(4) The present disclosure may be the above methods. The present disclosure may be the computer program causing the computer to perform the methods or a digital signal constructed with the computer program.

The present disclosure may be one in which the computer program or the digital signal is recorded in a computer-readable recording medium such as a flexible disk, a hard disk, a CD-ROM, an MO, a DVD, a DVD-ROM, a DVD-RAM, a Blu-ray disc, and a semiconductor memory. The present disclosure may be the digital signal recorded in these recording mediums.

The present disclosure may be one that transmits the computer program or the digital signal through an electric communication line, a wireless or wired communication line, a network typified by the Internet, data broadcasting, and the like.

The present disclosure may be the computer system including the microprocessor and the memory, the computer program may be stored in the memory, and the microprocessor may be operated according to the computer program.

The present disclosure may be implemented by another independent computer system such that the program or the digital signal is transported while recorded in the recording medium, or such that the program or the digital signal is transported through the network.

(5) The exemplary embodiments and the modifications may be combined.

Although the data transmission system and data playback method of one or the plurality of aspects of the present disclosure are described above based on the exemplary embodiments, the present disclosure is not limited to the exemplary embodiments. It is noted that various changes of the exemplary embodiments conceivable by those skilled in the art and a combination of the components of the exemplary embodiments are also included in one or the plurality of aspects without departing from the scope of the present disclosure.

The present disclosure has the advantage that can suppress the processing load. For example, the present disclosure can be applied to devices that convert the file format from the MPEG2-TS into the MP4, and used in the devices such as a smartphone and a tablet.

What is claimed is:

1. A method comprising:
   acquiring a play list including identification information indicating each of a plurality of elementary streams;
   selecting an elementary stream indicated by predetermined identification information included in the acquired play list;
   acquiring a difference file including data that is not included in the selected elementary stream; and
   converting the selected elementary stream into an MP4 file format by combining data included in the difference file and data included in the selected elementary stream based on a manifest file corresponding to the selected elementary stream, the manifest file being necessary for the conversion of a file format based on a predetermined rule.

2. The file producing method according to claim 1, wherein, in the conversion, the data included in the selected elementary stream is converted into a data storage format in an MP4 file format,
   the play list further includes section information indicating a section of the elementary stream indicated by the predetermined identification information,
   the section of the elementary stream indicated by the section information is selected in the selection, and
   the selected section of the elementary stream is converted into the MP4 file format in the conversion.

3. The file producing method according to claim 2, wherein the section information is indicated by clock time information indicating a clock time of decode or display of the elementary stream, the manifest file is information in which the clock time and a position in the elementary stream are correlated with each other, in the conversion, a position of the section in the elementary stream is specified based on the manifest file, the position of the section corresponding to clock time information indicated by the section information of the play list, the section of the elementary stream is extracted at the specified position, and the extracted section of the elementary stream is converted into the MP4 file format.

4. The file producing method according to claim 2, wherein the play list includes:

first identification information indicating a first elementary stream and second identification information indicating a second elementary stream as the predetermined identification information; and first section information indicating a first section of the first elementary stream and second section information indicating a second section of the second elementary stream as the section information, in the selection, the first section indicated by the first section information in the first elementary stream indicated by the first identification information and the second section indicated by the second section information in the second elementary stream indicated by the second identification information are selected from the acquired play list, and in the conversion, data including the selected first section of the first elementary stream and the selected second section of the second elementary stream is converted into the MP4 file format.

5. The file producing method according to claim 4, wherein, in the conversion, the selected first section of the first elementary stream is extracted based on a first manifest file corresponding to the first elementary stream, the selected second section of the second elementary stream is extracted based on a second manifest file corresponding to the second elementary stream, and data including the extracted first section and the extracted second section is converted into the MP4 file format.

6. The file producing method according to claim 1, wherein, in the conversion, an audio MP4 file corresponding to the elementary stream is further acquired, a video elementary stream corresponding to the selected elementary stream is extracted based on the manifest file corresponding to the elementary stream, and the MP4 file is produced using the extracted video elementary stream and the selected audio MP4 file.

7. The file producing method according to claim 1, wherein, in the selection, a menu for receiving input from a user is produced, the input to the produced menu is received, and an elementary stream is selected from a play list determined according to the received input to the menu.

8. The file producing method according to claim 1, wherein the MP4 file is produced by alternately arraying the data included in the difference file and the data included in the elementary stream based on the manifest file.

9. The file producing method according to claim 8, wherein the manifest file includes a description expressed by a data size with respect to a range where the data included in the difference file is alternately arrayed, and the manifest file includes a description expressed by a start position and a data size with respect to a range where the data included in the elementary stream is alternately arrayed.

10. The file producing method according to claim 1, wherein, in the data included in the difference file, data combined with the data included in the elementary stream is data constituting MP4 header information.

11. A device comprising:

one or more memories; and circuitry which, in operation:

acquires a play list including identification information indicating each of a plurality of elementary streams;

selects an elementary stream indicated by predetermined identification information included in the acquired play list;

acquires a difference file including data that is not included in the selected elementary stream; and converts the selected elementary stream into an MP4 file format by combining data included in the difference file and data included in the selected elementary stream based on a manifest file corresponding to the selected elementary stream, the manifest file being necessary for the conversion of a file format based on a predetermined rule.

12. A non-transitory computer-readable recording medium in which a plurality of MPEG2-TS files, a play list including identification information indicating each of a plurality of elementary streams included in the plurality of MPEG2-TS files, a manifest file corresponding to a selected elementary stream, the manifest file being necessary for conversion of a file format based on a predetermined rule, and a difference file, including data that is not included in the selected elementary stream, are recorded, wherein the play list further includes section information indicating a section of the selected elementary stream, the section information is indicated by clock time information indicating a clock time of decode or display of the selected elementary stream, and the manifest file is information in which the clock time and a position in the selected elementary stream are correlated with each other.

13. The non-transitory computer-readable recording medium according to claim 12, wherein the manifest file includes a description expressed by a data size with respect to a range where the data included in the difference file is alternately arrayed, and the manifest file includes a description expressed by a start position and a data size with respect to a range where data included in the selected elementary stream is alternately arrayed.

* * * * *